United States Patent [19] [11] 4,378,190
Smith [45] Mar. 29, 1983

[54] REFUSE COMPACTION APPARATUS

[75] Inventor: Fred T. Smith, Palos Verdes Peninsula, Calif.

[73] Assignee: Sargent Industries, Inc., Century City, Calif.

[21] Appl. No.: 237,460

[22] Filed: Feb. 23, 1981

Related U.S. Application Data

[62] Division of Ser. No. 876,644, Feb. 10, 1978, abandoned.

[51] Int. Cl.³ .......................... B60P 1/00; B65D 6/36
[52] U.S. Cl. .............................. 414/525 R; 220/4 R; 220/71
[58] Field of Search .................. 220/4 R, 71, 72, 1 V; 414/525 R

[56] References Cited

U.S. PATENT DOCUMENTS

| | | | |
|---|---|---|---|
| 1,948,137 | 2/1934 | Simonds | 220/71 |
| 2,316,296 | 4/1943 | Simonds | 220/72 |
| 2,477,831 | 8/1949 | Schmitz | 220/71 |
| 2,952,922 | 9/1960 | Wenzl | 220/71 |
| 3,661,293 | 5/1972 | Gerhard | 220/71 |

*Primary Examiner*—George E. Lowrance
*Attorney, Agent, or Firm*—Ellsworth R. Roston; Charles H. Schwartz

[57] ABSTRACT

A refuse compaction apparatus including a hopper and a panel rotatably positioned for movement through the hopper. The panel has a body with a generally elliptical cross-sectional configuration and a high torque-transmitting capability. Drive means are connected to only one end of the panel with the drive means imparting a rotational force to the panel at said one end, which force is transmitted throughout the panel by the generally elliptically-shaped body.

A refuse compaction apparatus having a container for storing refuse under pressure and means for pressurizing refuse within the container. The container includes a first rigid frame positioned at one end and a second rigid frame positioned at the other end of the container. A plurality of longitudinal members interconnect the first and second frames and a plurality of flexible metal sheet members enclose the container with the sheet members being supported by the first and second frames and by the longitudinal members. The flexible sheet members are bowed outwardly from their points of support, such that the sheet members are placed in tension in resisting pressure within the storage container.

12 Claims, 23 Drawing Figures

FIG. 6
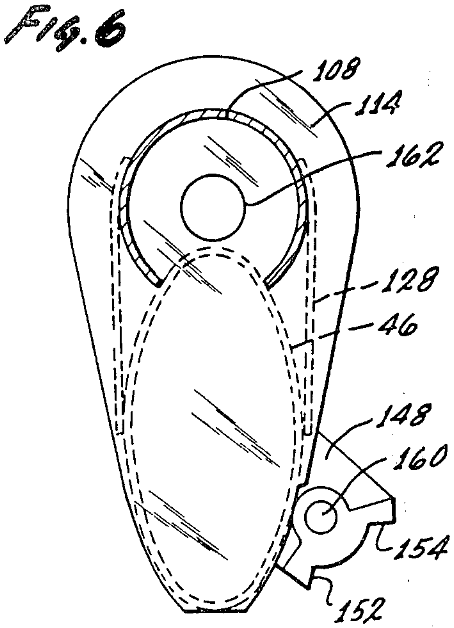
FIG. 7
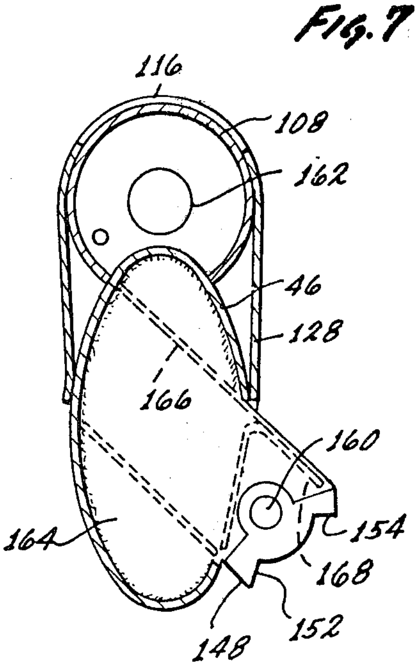
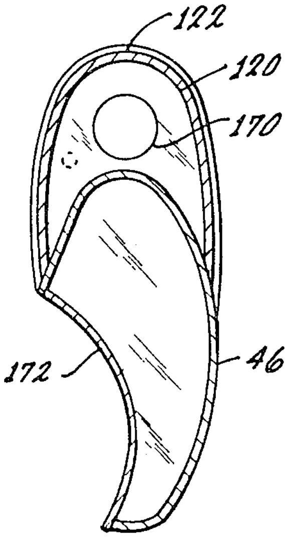
FIG. 8
FIG. 9
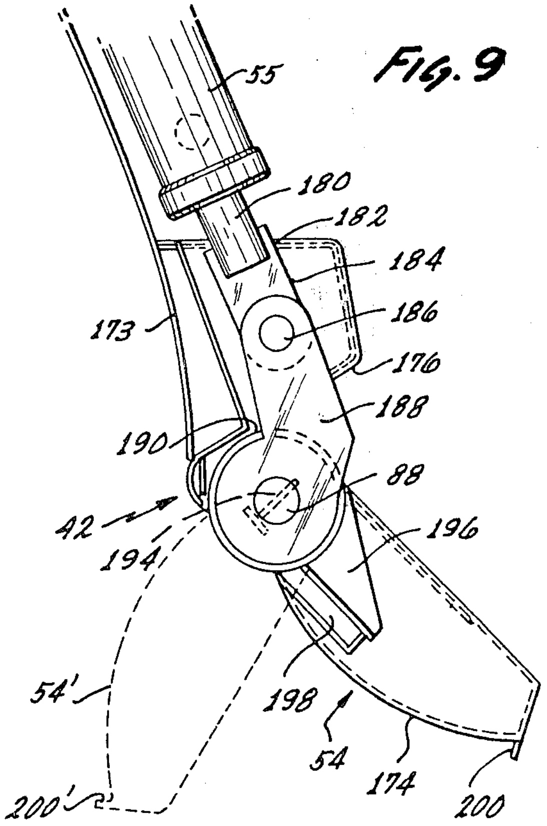

REFUSE COMPACTION APPARATUS

This is a division of application Ser. No. 876,644, filed Feb. 10, 1978, now abandoned.

BACKGROUND OF THE INVENTION

There is a direct correlation between the affluence and industrialization of a society and the quantity of refuse which is generated by that society. Thus, in the industrialized nations, the quantity of refuse which is generated may be many times that generated in a more primitive society.

In modern refuse collection apparatus, the refuse is compacted within a pressurized storage container. The storage container may, for example, be mounted on the frame of a truck with the tailgate rotatably secured to the rear of the container. Within the tailgate, there is generally a packing mechanism, with refuse being placed in a loading hopper in the tailgate and the packing mechanism forcing the refuse under high pressures into the storage container. By forcing the refuse into the storage container under high pressures, the refuse is compacted so that a relatively large quantity of refuse may be carried within the storage container. This permits the refuse collection apparatus to function for a long period of time before it becomes necessary to empty the storage container. The time spent in driving to a landfill or refuse transfer point to empty the storage container is time lost from the primary function of the apparatus in picking up the refuse at a home or a business and placing the refuse in a compacted form which is convenient for its disposal. Accordingly, it is essential to the function of a refuse collection apparatus that the quantity of refuse carried within the refuse container be maximized.

To maximize the quantity of refuse which may be packed under pressure within the refuse storage container, it has previously been necessary to construct the apparatus of heavy structural members to provide great strength. This has resulted in the refuse compaction apparatus being relatively large and heavy. These requirements have increased the costs of refuse compaction apparatus and have made the apparatus a high consumer of energy for operation. Additionally, the weight of previous refuse collection apparatus may be injurious to street surfaces over which the apparatus is driven.

In addition to being relatively heavy and expensive, previous refuse collection apparatus has been relatively complicated. In previous apparatus, it has generally been necessary to place hydraulic cylinders on either side of the tailgate to drive the packing mechanism in forcing the refuse from the loading hopper into the refuse storage container. The weight and expense of the hydraulic cylinders have, thus, contributed to the overall weight and expense of the refuse collection apparatus. Additionally, to control a plurality of hydraulic cylinders to insure that the driving forces applied to each end of the packing mechanism are synchronized has required the use of complex hydraulic circuitry. This may reduce the reliability of the refuse collection apparatus, since the reliability of a complex mechanism is generallyinversely proportional to the complexity of the mechanism.

In view of the above problems, it would be desirable if a refuse compaction apparatus could be provided which would be lighter than previous apparatus and which would consume a smaller quantity of energy for operation. Such an apparatus would also be cheaper because of the use of lighter and less expensive structural members used in its construction. These would be considerable advantages in view of the ever-increasing cost of energy in the form of oil, gasoline and other fossil fuels for operation of industrial equipment. Additionally, by being lighter than previous collection apparatus, such an apparatus would be less injurious to the public streets in its operation.

In addition to providing a refuse compaction apparatus which would be cheaper and lighter, it would be desirable to provide an apparatus which would be simpler in its construction, and, therefore, more reliable and less likely to break down. Desirably, such an apparatus would provide a mechanical interconnection between the hydraulic motors used to drive the packing mechanism. This would serve to eliminate the previous problems of synchronizing the movement of hydraulic cylinders to drive the packing mechanism by means of a complex hydraulic circuit. Also, it would be desirable if such a refuse compaction apparatus could function by driving the packing mechanism from only one end, since this would tend to avoid the many problems which may result from the use of duplicate drive cylinders positioned at either end of the packing mechanism, which cylinders must be synchronized in their movements.

In addition, it would be desirable if a refuse compaction apparatus could be provided in which the refuse could be subjected to very high pressures before being placed within the refuse storage container. This would permit the retention of highly compacted refuse within the storage container at reduced pressures. The storage container could then be made lighter while still performing its function of containing a maximum quantity of refuse to reduce the amount of lost time required to periodically empty the container.

SUMMARY OF THE INVENTION

In providing a solution to the aforementioned problems, the present invention provides a refuse compaction apparatus which is relatively light in weight, is relatively inexpensive, and is also less complex than previous refuse compaction apparatus. Accordingly, the refuse compaction apparatus of the invention is admirably suited for meeting the complex problems posed by the contradictory demands of providing efficient and uniform compaction of refuse at high pressures, while reducing the weight and complexity of the apparatus and the energy required for its operation.

One aspect of the invention concerns a refuse compacting apparatus in which a passage having a narrowed throat is positioned between a container for storing refuse under pressure and a loading hopper. Refuse compacting means may be positioned to sweep through the hopper to compact refuse and to move the refuse from the loading hopper into the storage container. As the refuse is moved through the passage by the refuse compacting means, the refuse may be squeezed and subjected to very high localized pressures within the narrowed throat as the refuse passes through the narrowed throat.

A movable ejection panel may be positioned within the storage container, with the panel being movable from a position adjacent the passage when the container is empty to a position displaced from the passage when the container is full. Means may be provided to control the movement of the ejection panel away from the passage in response to the pressure of refuse which is exerted against the panel. Thus, as refuse is moved into the container from the passage, the refuse may be packed against the panel until the pressure of refuse against the ejection panel exceeds a predetermined level with the panel then being moved an incremental distance to a new position to reduce the pressure of refuse against the panel. Additional refuse may then be packed against the ejection panel in its new position until the pressure against the panel exceeds the predetermined level with the panel being again moved an incremental distance to a new position, etc., such that the alternate packing of refuse and moving of the ejection panel is continued until the storage container is uniformly filled with refuse.

The passage leading from the loading hopper into the refuse container may include a surface at the enlarged opening from the passage into the storage container which surface imparts movement of the refuse that is directed toward the panel. Additionally, the pressure exerted on the refuse passing through the narrowed throat within the passage may greatly exceed the pressure which is exerted by refuse against the ejection panel and the interior of the refuse storage container. Accordingly, the high localized pressures which may be exerted on refuse as it passes through the narrowed throat within the passage need not be transmitted to the interior of the storage container.

It is desirable that the pressures of the refuse directed through the narrowed throat of the passage be regulated. If the pressures exerted on the refuse in the narrowed throat are excessive, the movement of the refuse through the narrowed throat of the passage tends to become blocked. On the other hand, if the pressures exerted on the refuse in the narrowed throat are not sufficient, a relatively little amount of compaction or fragmentation is produced on the refuse in the narrowed throat. The regulation of the pressures on the refuse in the narrowed throat is provided by controlling the pressure of the refuse in the storage body. When the pressure of the refuse on the ejection panel in the storage body reaches a first particular value, the ejection panel is moved in a direction to relieve such pressure. Such movement of the ejection panel occurs on an incremental basis until the pressure of the refuse against the ejection panel decreases to a second particular value lower than the first particular value.

The ability to regulate the pressure of the refuse in the narrowed throat of the passage by regulating the pressure exerted by the refuse against the ejection panel can be seen from the following. For example, the pressure of the refuse against the ejection panel corresponds to the pressure of the refuse in the enlarged opening in the passage at a position adjacent to the storage body. Furthermore, the pressure in the enlarged opening causes a back pressure to be exerted against the refuse in the narrowed throat to control the pressure of the refuse in the narrowed throat. As a result, the pressure of the refuse in the narrowed throat of the passage is directly related to the pressure of the refuse against the ejection panel. In this way, a servo action is obtained for providing an optimal churning, fragmentation and compaction of the refuse as the refuse is directed through the narrowed throat.

In moving refuse from the loading hopper through the passage into the refuse storage container, a movable retainer panel may be positioned for movement between a first position in which the retainer panel is positioned away from the passage and a second position in which the retainer panel at least partially blocks the passage. When the refuse compacting means is moved away from the passage, the retainer panel may be moved to its second position to impede the movement of the refuse from the passage back into the loading hopper. Additionally, as the retainer panel moves from its first position to its second position, the retainer panel may be shaped and positioned to sweep refuse from the refuse compacting means during this movement with the refuse swept from the refuse compacting means being moved into the passage by the retainer panel.

With the retainer panel in its first position which does not impede the movement of refuse from the loading hopper through the passage into the storage container, the retainer panel may include a surface which merges into and forms an extension of the surface of the passage. The configuration of the retainer panel may, thereby, assist the movement of the refuse into the passage from the loading hopper.

In another aspect of the invention, a refuse compacting apparatus may be provided in which a movable panel is positioned within a storage body for refuse. A support member for the movable panel may have a movable end and a fixed end with the fixed end pivotally connected to the storage body. A link may connect the movable end of the support member to the movable panel such that movement of the panel causes pivotal movement of the support member. Means may be provided to transmit a force to the movable panel from a point on the support member which is positioned intermediate the fixed end and the movable end. As the panel undergoes movement within the support body to cause rotational movement of the support member, the intermediate point on the support member may them move in an arcuate path in the direction of movement of the panel. The means to transmit a force from the support member to the movable panel may comprise a hydraulic cylinder having one end connected to the intermediate point on the support member and the other end connected to the movable panel. The expansion of the hydraulic cylinder may, thus, cause movement of the panel away from the fixed end of the support member while contraction of the hydraulic cylinder may cause movement of the panel toward the fixed end of the support member.

The intermediate point on the support member may be positioned out of alignment with the fixed and movable ends of the support member with the fixed and movable ends lying on a straight line and the movable panel being positioned transverse to the straight line. The intermediate point on the support member may then be positioned transversely with respect to the straight line but in a direction opposite to the position of the panel with respect to the straight line. The support member may have a generally triangular configuration with the fixed end and the movable end of the support member lying at two of the apices of a triangle. The intermediate point on the support member may then lie at the other apex of the triangle. The panel may be positioned transversely to a line through the fixed and movable ends with the intermediate point being positioned transversely to the line but in a direction opposite to the position of the panel with respect to the line.

The refuse storage body may have an open end and a closed end with the movable panel forming a closure for the open end. The generally triangular support member may then be positioned adjacent to the open end with the intermediate-point apex of the support member extending outside of the storage body through said open end. In this manner, the movable panel may be positioned more closely adjacent to the open end with less interference from the position of the means to transmit force from the support member to the panel.

As a further aspect of the invention, a refuse compacting apparatus may be provided in which a loading hopper is in communication with a container for storing refuse under pressure. A refuse compacting means may be positioned to sweep through the loading hopper to compact refuse therein and to move the refuse from the loading hopper into the storage container. A retainer panel may be positioned to move between an opened and a closed position with the retainer panel impeding the flow of refuse from the storage container into the hopper with the retainer panel in its closed position and permitting the flow of refuse from the hopper into the storage container by the refuse compacting means with the retainer panel in its opened position. Control means may be provided to move the retainer panel to an opened position while moving the refuse compacting means through the hopper to move refuse from the hopper into the storage container. The control means may also function to move the retainer panel to a closed position while returning the refuse compacting means to a return position to begin sweeping through the loading hopper.

In providing control of the movement of the retainer panel and the refuse compacting means, a source of pressurized hydraulic fluid may be used to drive a first hydraulic motor means that is operatively connected to the retainer panel and a second hydraulic motor means which is operatively connected to the refuse compacting means. A first valve means may control the flow of hydraulic fluid to the first motor means in moving the retainer panel between an opened and a closed position. A second valve means may control the flow of hydraulic fluid to the second motor means in moving the refuse compacting means through the loading hopper to sweep refuse from the hopper and to then return to a return position to begin sweeping through the hopper. Means may be provided to move the first and second valves in unison to first direct hydraulic fluid to the first motor means before directing hydraulic fluid to the second motor means. In this manner, the retainer panel may undergo movement before movement of the refuse compacting means.

Coupled with the movement of the refuse compacting means and the retainer panel, an ejection panel may be positioned within the storage container. Means may be provided to move the ejection panel in small increments within the storage container in response to the pressure of refuse against the ejection panel. Thus, as refuse is moved into the storage container and packed against the ejection panel, the ejection panel may be incrementally moved to enlarge the available volume for storing refuse within the storage container. A third hydraulic motor means may be connected to the ejection panel and means may be provided to sense the pressure of hydraulic fluid within the second motor means as the refuse compacting means sweeps through the loading hopper. Means may be provided to momentarily dump hydraulic fluid from the third motor means when the sensed pressure within the second motor means exceeds a predetermined pressure level to move the ejection panel a small incremental distance and, thereby, to reduce the pressure of refuse against the ejection panel.

The first valve means and second valve means may be positioned in a series relation with respect to the source of pressurized hydraulic fluid. Further, the first valve means may be positioned between the second valve means and the source of pressurized hydraulic fluid with the first valve means returning to its neutral position after movement of the first and second valve means in unison. The second valve means may then receive hydraulic fluid from the source of pressurized hydraulic fluid such that movement of the retainer panel may precede movement of the packing means within the loading hopper.

In a further aspect of the invention, there is provided a refuse compacting apparatus for storing refuse under pressure, a loading hopper in communication with the storage container and a packing panel mounted for movement through the loading hopper to sweep through the hopper in compacting refuse therein and in moving refuse from the loading hopper into the storage container. The loading hopper may include a curved inner surface with a sill on the loading hopper over which refuse may be inserted into the hopper. The packing panel may have an edge which is positioned adjacent to the curved surface within the loading hopper as the packing panel sweeps through the loading hopper. Means may be provided to maintain a minimum distance between the edge on the packing panel and the curved surface on the hopper at a point which is adjacent to the sill, which minimum distance may be slightly greater than the depth of a human finger.

Additionally, the means to maintain a minimum distance between the edge of the packing panel and the inner curved surface of the hopper may increase the minimum distance slightly as the packing panel sweeps past the sill and through the hopper. The minimum spacing between the edge of the packing panel and the curved inner surface of the loading hopper of the sill may reduce forces applied to the sill during downward movement of the packing panel while also protecting the worker's fingers. The increased minimum spacing between the edge of the packing panel and the curved inner surface of the hopper as the panel sweeps through the loading hopper may provide a gripping force on refuse caught between the edge of the packing panel and the curved inner surface of the hopper which force may pull refuse over the sill and into the hopper as the panel sweeps through the hopper.

A further aspect of the invention concerns a refuse compacting apparatus having a panel positioned for working movement in a first direction, and a relatively large first hydraulic motor for driving the panel in the first direction. The panel may undergo return movement in a second direction and a relatively small second hydraulic motor may drive the panel in said second direction. A source of pressurized hydraulic fluid may drive the first and second hydraulic motors with means mechanically interconnecting the first and second motors such that movement of the first motor to drive the panel in said first direction causes movement of the second motor in a direction opposite to its movement to drive the panel in the second direction. Similarly, movement of the second motor to drive the panel in said second direction may cause movement of the first motor in a direction opposite to its movement in driving the panel in said first direction.

The first motor may have a first opening and a second opening with the second motor also having a first opening and a second opening. Means may be provided for connecting the second opening of the first motor with the second opening of the second motor, sump means to receive hydraulic fluid and means connecting the second opening of the first motor and the second opening of the second motor to the sump means. Valve means may be positioned between the first and second motors and the means to supply pressurized hydraulic fluid with the valve means having a first operative position to direct pressurized hydraulic fluid to the first opening of the first motor to cause movement of the first motor to drive the panel in said first direction. With the valve means in its first operative position, hydraulic fluid may also be transmitted from the first opening of the second motor to the sump as the second motor is moved in a direction opposite to its movement when driving the panel in said second direction. Hydraulic fluid may also flow from the second opening of the first motor into the second opening of the second motor and may also flow into the sump as the first motor moves to drive the panel in said first direction.

The valve means may also have a second operative position to direct hydraulic fluid to the first opening of the second motor to cause movement of the second motor to drive the panel in said second direction and to cause movement of the first motor in a direction opposite to its movement when driving the panel in said first direction. The valve means in its second operative position may transmit hydraulic fluid from the first opening of the first motor to the sump. Means may also be provided to interconnect the first and second openings of the first motor when the pressure of hydraulic fluid supplied to the first opening of the second motor reaches a predetermined pressure level to permit hydraulic fluid to flow from the first opening of the first motor into the second opening of the first motor. In this manner, the second motor may act as an accumulator for hydraulic fluid from the first motor when the first motor is driving the panel in its first direction and the second motor is moving in a direction opposite to its movement when driving the panel in said second direction.

Additionally, the first motor may act as its own accumulator of hydraulic fluid when the second motor is driving the panel in said second direction and the first motor is moving in a direction opposite to its movement when driving the panel in its first direction. The first motor, in acting as its own accumulator, may discharge hydraulic fluid through the first opening which may be conveyed back into the second opening in the first motor. In the refuse compacting apparatus, the first motor may be a relatively large hydraulic cylinder having a first piston which separates the first and second openings within the first motor. The second motor may be a relatively small hydraulic cylinder which includes a second piston that separates the first and second openings in the second motor.

A further aspect of the invention concerns a refuse compaction apparatus having a refuse container, a loading hopper and a passage from the loading hopper into the refuse container. A packing panel may be positioned within the loading hopper for rotational movement from a rest position in a working direction in sweeping through the loading hopper to compact refuse therein and to move the refuse through the passage into the refuse container. Means may be provided for driving the packing panel which include a drive shaft rotatably supporting the packing panel and a drive member connected to the panel. The drive member may include a drive surface with a drive lever connected to the drive member.

A flexible drive member having a driving end and a fixed end may be connected to the drive lever through said fixed end while a motor is connected to the driving end. The flexible drive member may be positioned to contact the drive surface in driving the packing panel during movement of the packing panel in a working direction from its rest position during the initial portion of its movement through the hopper. The flexible drive member may then move out of contact with the drive surface to drive the packing panel through the connection between the fixed end of the flexible drive member and the drive lever during the latter portion of the movement of the packing panel in a working direction through said hopper.

The drive surface may have a constant radius such that contact of the flexible drive member with the drive surface drives the packing panel with a force which is applied through a constant moment arm whose distance is determined by the radius. During movement of the packing panel through the loading hopper, the flexible drive member may contact the drive surface during rotation of the drive member through an angle of about 158° with the flexible drive member then moving out of contact with the drive surface to drive the panel directly through the drive lever and to apply a progressive force to the panel during rotation of the drive lever through an angle of about 90°.

The packing panel may be rotatable in a return direction towards its rest position after sweeping through the hopper in a working direction. A second flexible drive member having a driving end and a fixed end may have its fixed end connected to the drive surface and its driven end connected to a second motor. The second flexible drive member may, thereby, impart rotational movement of the packing panel in moving the panel in a return direction to said rest position. In driving the packing panel in a working direction and in a return direction with the flexible drive member and the second flexible drive member, the connection of the fixed end of the flexible drive member to the drive lever and connection of the fixed end of the second flexible drive member to a point on the drive surface with the connections of the fixed ends of the flexible drive member and the second flexible drive member being displaced a sufficient distance relative to the drive surface to concurrently permit unwinding of the flexible drive member from the drive surface and winding of the second flexible drive member onto the drive surface as the packing panel is moved in a working direction. Also, the said displacement may concurrently permit unwinding of the second flexible drive member from the drive surface and winding of the flexible drive member onto the drive surface as the packing panel is moved in a return direction toward its rest position.

A further aspect of the invention concerns a refuse compaction apparatus which includes a hopper and a panel which is rotatably positioned for movement through the hopper. The panel may have a body with a generally elliptical configuration, and a high torque-transmitting capability. Drive means for the panel may be connected to only one end of the panel such that a rotational force may be applied to the panel at said one end with the rotational force being transmitted throughout the panel by the elliptical body.

A further aspect of the invention concerns a refuse container for storing refuse under pressure, a loading hopper, a passage leading from the loading hopper into the container, and a packing panel rotatably positioned within the hopper to move from a rest position in a working direction to sweep through the hopper to compact refuse within the hopper and to move the refuse from the hopper through the passage and into the container. The packing panel may be movable in a return direction to return the panel to its rest position with motor means connected to the panel for providing movement thereof. Control means may be operatively connected to the motor means to provide movement of the panel in a working direction and movement of the panel in a return direction.

The control means may have a neutral position in which the motor means is inactivated with the control means being movable to a first position in which the motor means is activated to move the packing panel in a working direction. The control means may also be movable to a second position in which the motor means is activated to move the packing panel in a return direction. Actuating means may be provided to return the control means from its first position or its second position to its neutral position with the actuating means being operably connected to the packing panel. The actuating means may have a third position when the panel is in its rest position and a fourth position when the panel has moved completely through the hopper in a working direction. The panel may occupy a pinch-point position with respect to the hopper with the panel moved into close proximity with the hopper during movement of the hopper in a working direction.

The actuating means may have a fifth position when the panel is in its pinch-point position with the control means having a manually actuable override to disengage the control means and actuating means when the actuating means is in its fifth position. The actuating means may move the control means from its first position to its neutral position to stop the panel at its pinch-point position when the actuating means is in its fifth position and the override is unactuated. Additionally, the actuating means may move the control means from its first position to its neutral position when the actuating means is in its fourth position and the packing panel has completed its movement in a working direction. Also, the actuating means may move the control means from its second position to its neutral position when the actuating means is in its third position and the panel has completed its movement in a return direction.

A further aspect of the invention concerns a refuse compaction apparatus having a container for storing refuse under pressure and means for pressurizing refuse within the container. A first rigid frame may be positioned at one end of the container with a second rigid frame positioned at the other end of the container. A plurality of longitudinal rigid members may interconnect the first and second frames. A plurality of flexible metal sheet members may enclose the container with the sheet members being supported by the first and second frames and the longitudinal rigid members. The flexible sheet members may each be bowed outwardly at their points of support. In this manner, the sheet members may be placed in tension in resisting pressures within the container.

A further aspect of the invention concerns a refuse compaction apparatus which may include a container for storing refuse under pressure and a tailgate rotatably mounted on the container for movement between an opened and a closed position. With the tailgate in its opened position, refuse may be discharged from the container and with the tailgate in its closed position, a closure may be formed between the tailgate and the storage container. In fixing the position of the tailgate with respect to the refuse container with the tailgate in its closed position, a latch member may engage a keeper member. Means may be provided to impart rotational movement to the latch member to position the latch member at a location where it may make contact with the keeper member. Additionally, means may be provided to impart translational movement to the latch member after its rotational movement to move the latch member into contact with the keeper member and to maintain the tailgate in a closed position.

A further aspect of the invention concerns a refuse compaction apparatus including a container for storing refuse under pressure, a tailgate rotatably mounted on the container for movement between an opened and a closed position and the tailgate including a hopper to receive refuse. A packing means may be positioned within the loading hopper to move the refuse from the hopper into the storage container with the tailgate in its closed position. Drive means may be provided to drive the packing means in moving refuse from the hopper into the storage container. The tailgate in its closed position may be in abutting relation with the refuse storage container to form a closure therewith and the tailgate in its opened position may be rotated upwardly to expose the storage container for discharge of refuse therefrom.

The drive means may be positioned on one side of the tailgate to drive the packing means from said one side. The weight of said one side of the tailgate may then be greater than the weight of the other side of the tailgate. An upper beam may be provided within the tailgate with the tailgate being rotatably connected to the storage container through said upper beam. The upper beam may include a stiffener assembly positioned adjacent to the rotatable connection of the heavier one side of the tailgate to the storage container. The stiffener assembly may have a configuration which provides a high resistance to torque. Thus, when a lifting force is applied to the tailgate for raising the tailgate to its opened position, the force may be transmitted through the upper beam with the twisting forces applied to the upper beam by weight of the heavier one side of the tailgate being resisted by the stiffener assembly.

THE DRAWINGS

To illustrate a preferred embodiment of the invention, reference is made to the accompanying drawings in which:

FIG. 6 is a sectional view taken along line 6—6 of FIG. 4;

FIG. 7 is a sectional view taken along line 7—7 of FIG. 4;

FIG. 8 is a sectional view taken along line 8—8 of FIG. 4;

FIG. 9 is a side elevational view of a retainer panel and retainer panel cylinder illustrating the movement of the retainer panel between an opened and a closed position;

Figure 1:
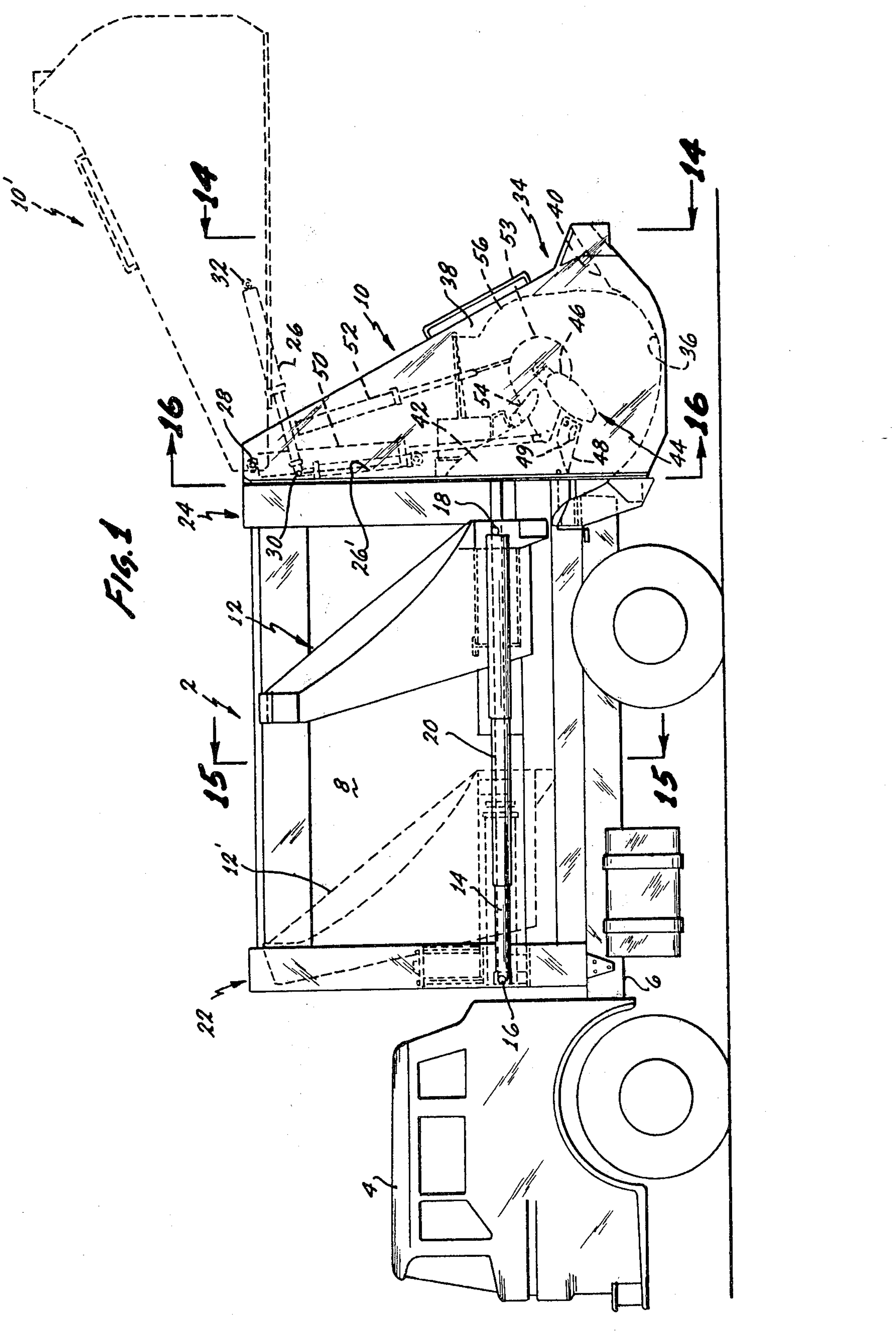
FIG. 1 is a side elevational view of a garbage truck utilizing a refuse compacting apparatus of the invention.
Figure 14:
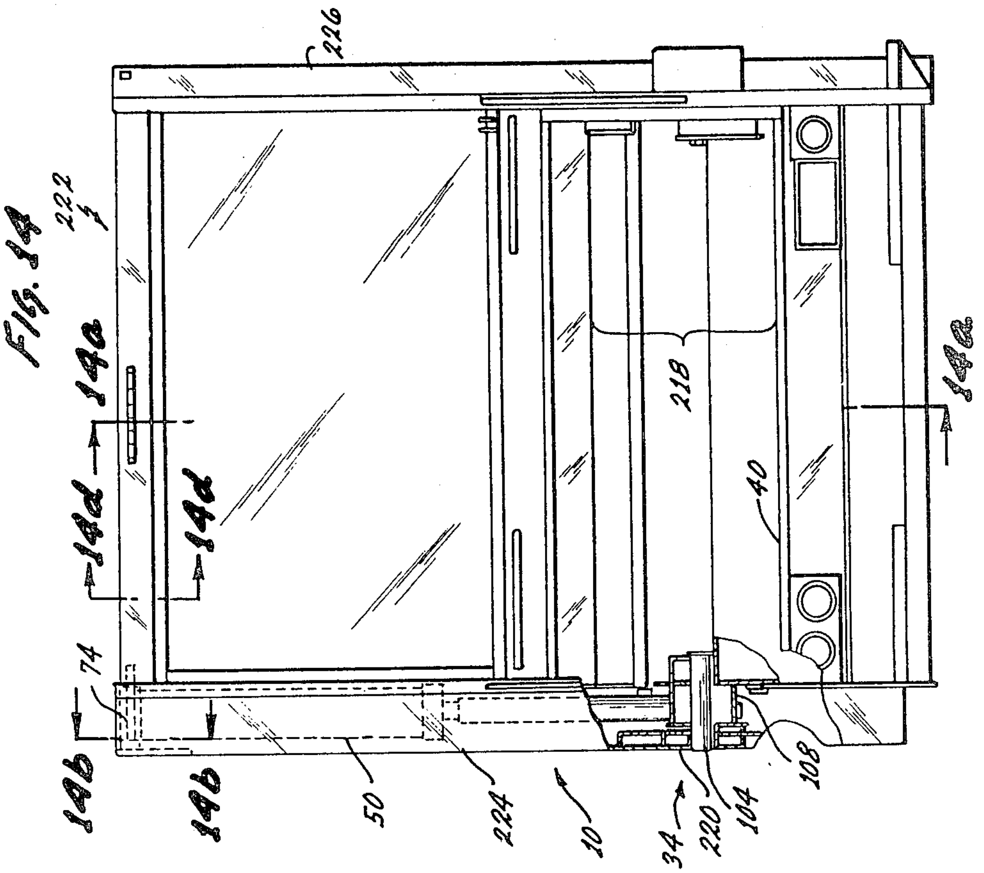
FIG. 14 is an elevational view taken along line 14—14 of FIG. 1 illustrating the appearance of the tailgate as viewed from the rear.
Figure 15:
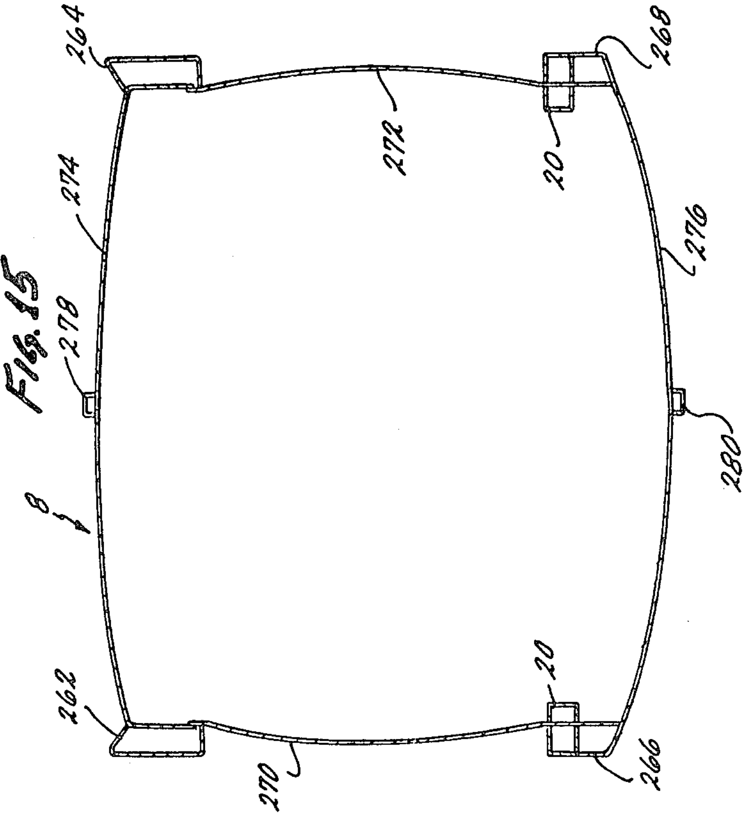
Figures 14A, 14B:
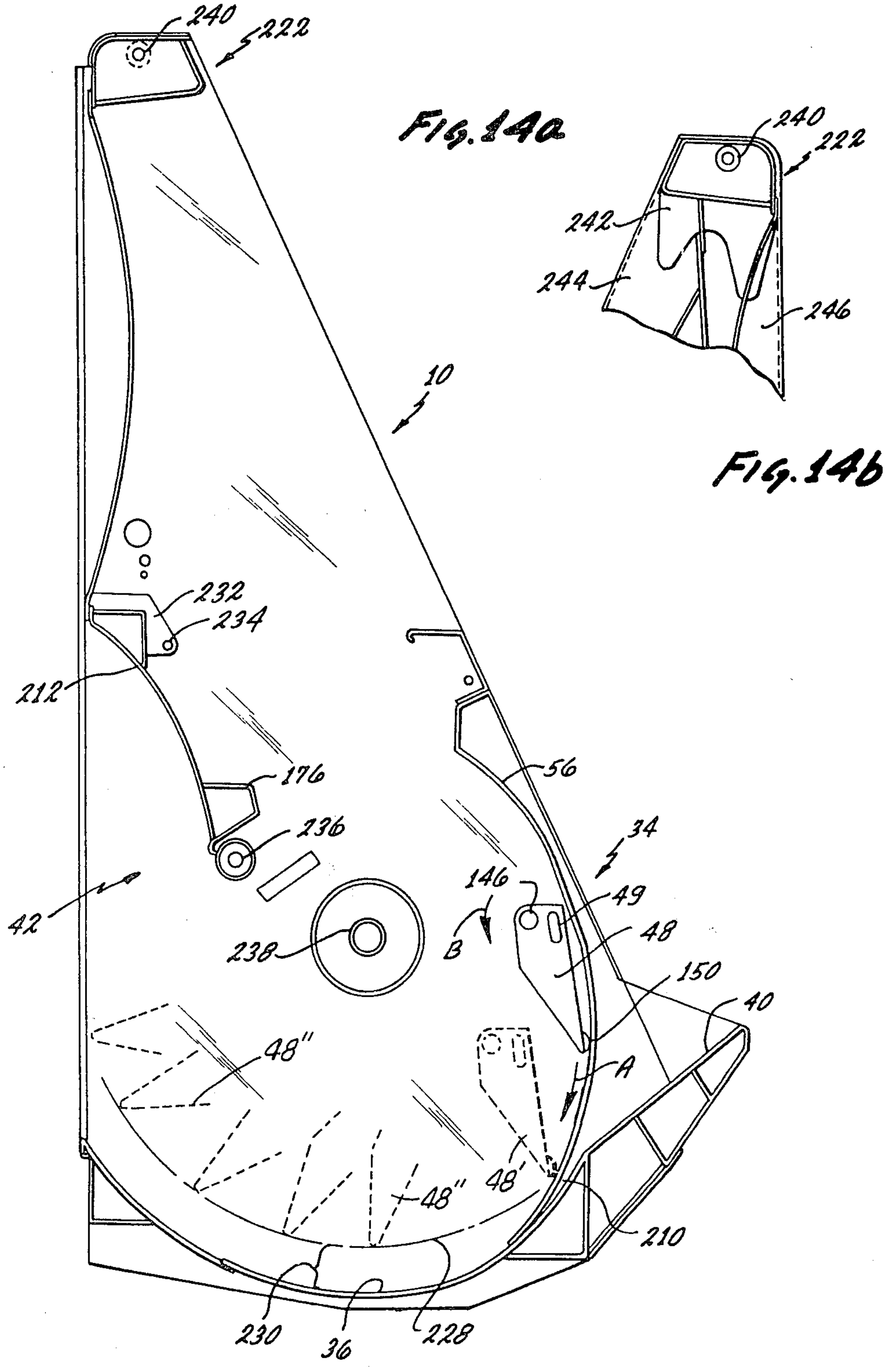
Figure 24:
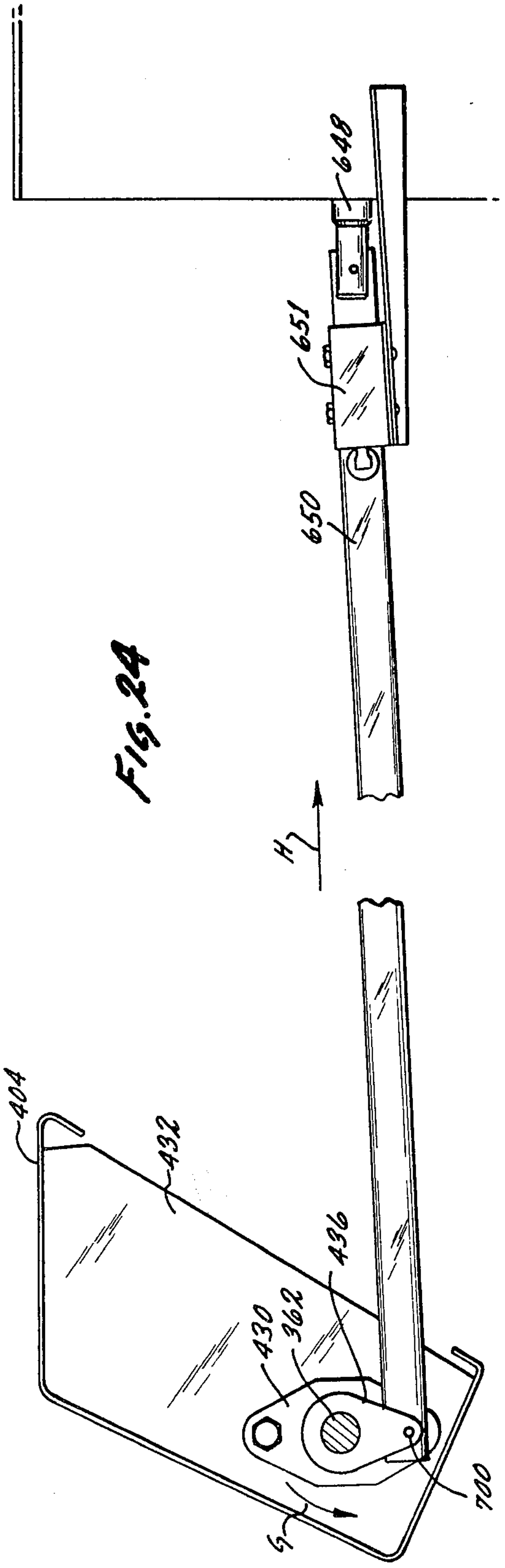
Figure 14D:
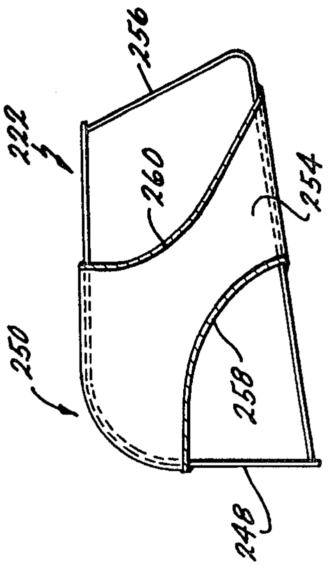
Figure 14C:
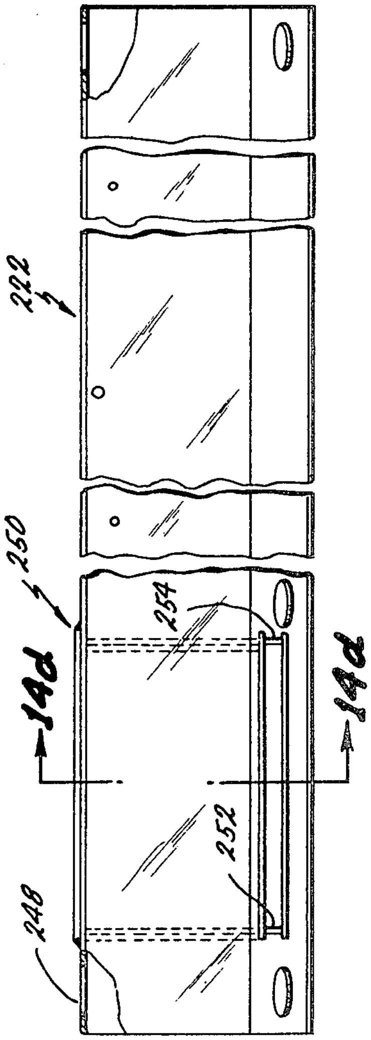
Figure 16A:
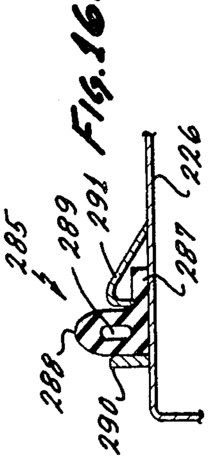
Figure 16:
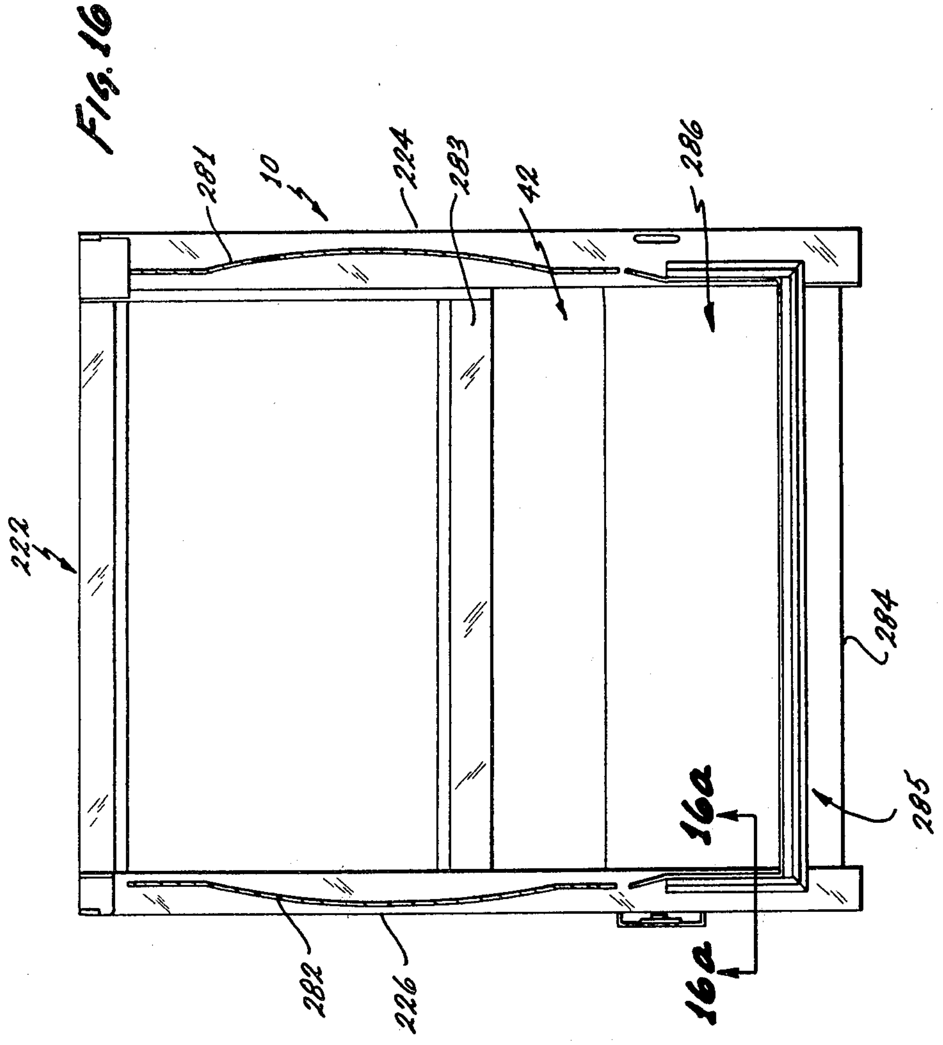
Figures 17, 17A, 18A:
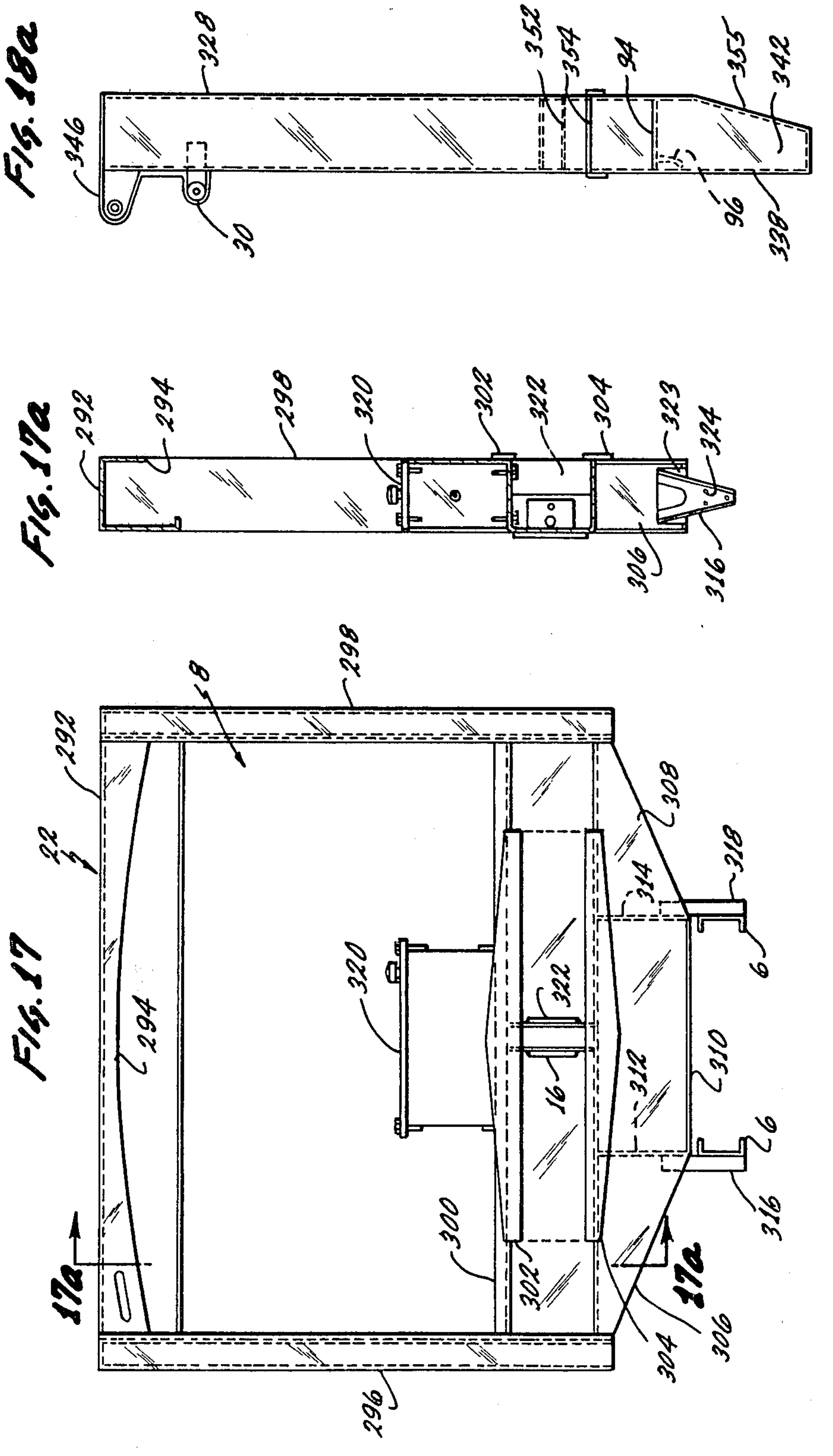
Figure 18:
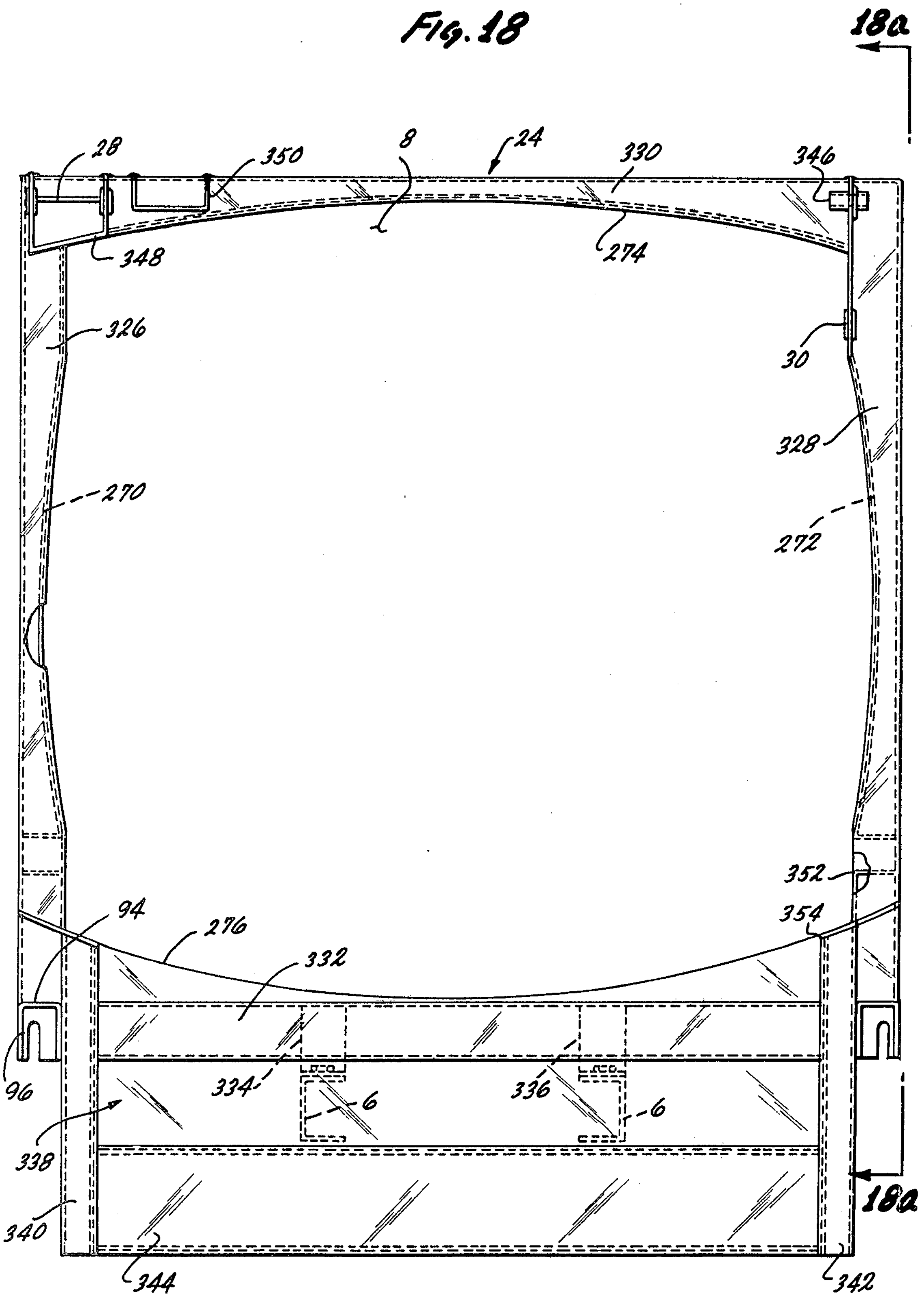
Figure 20:
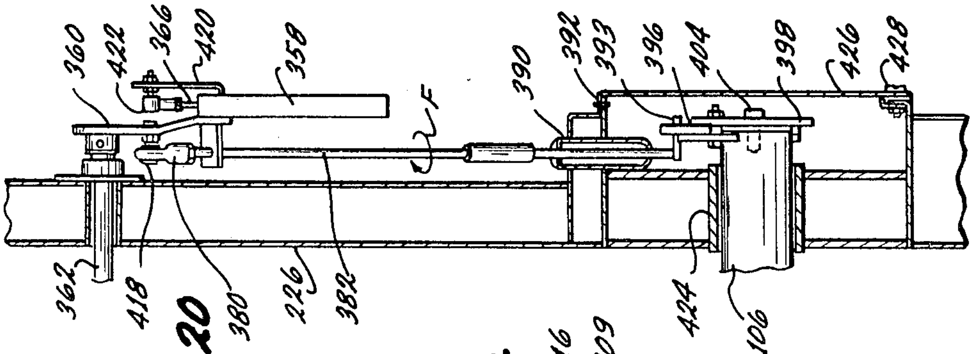
Figure 19A:
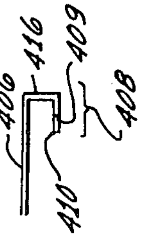
Figure 19:
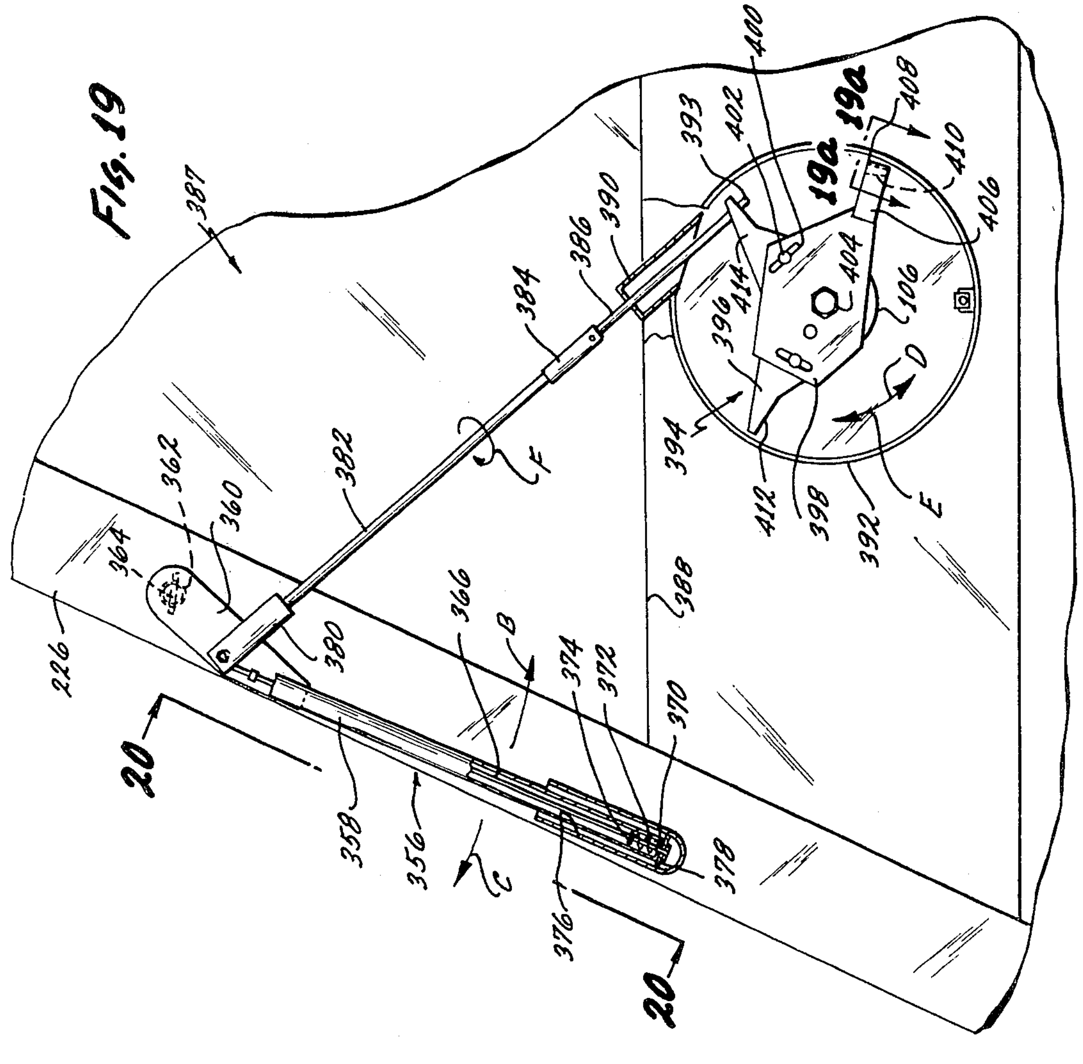
Figure 21:
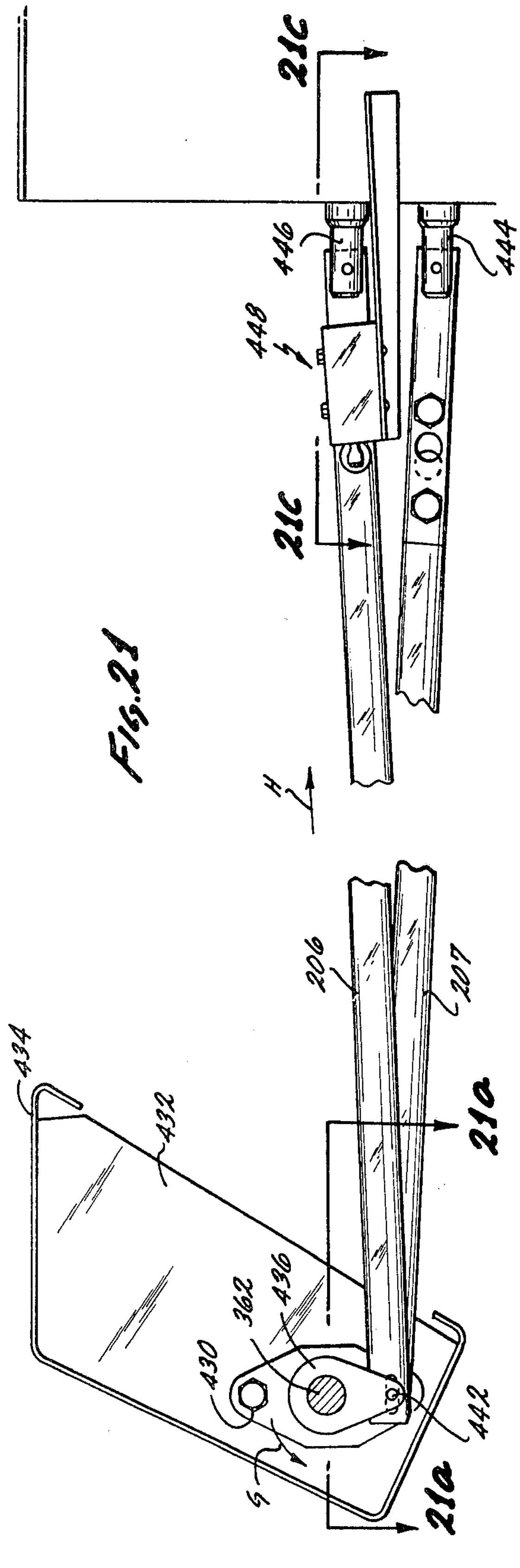
Figure 21C:
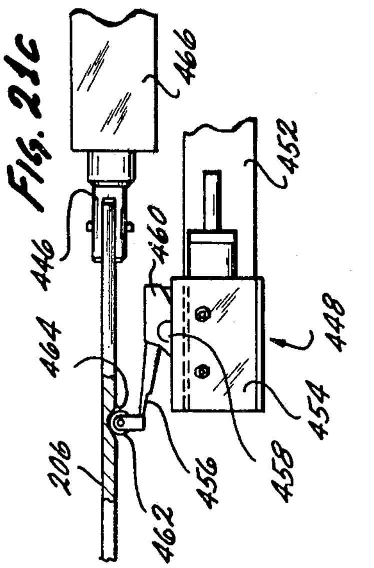
Figure 21B:
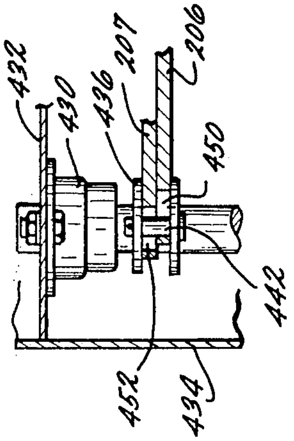
Figure 21A:
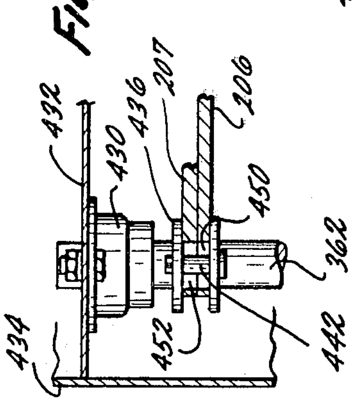
Figure 22:
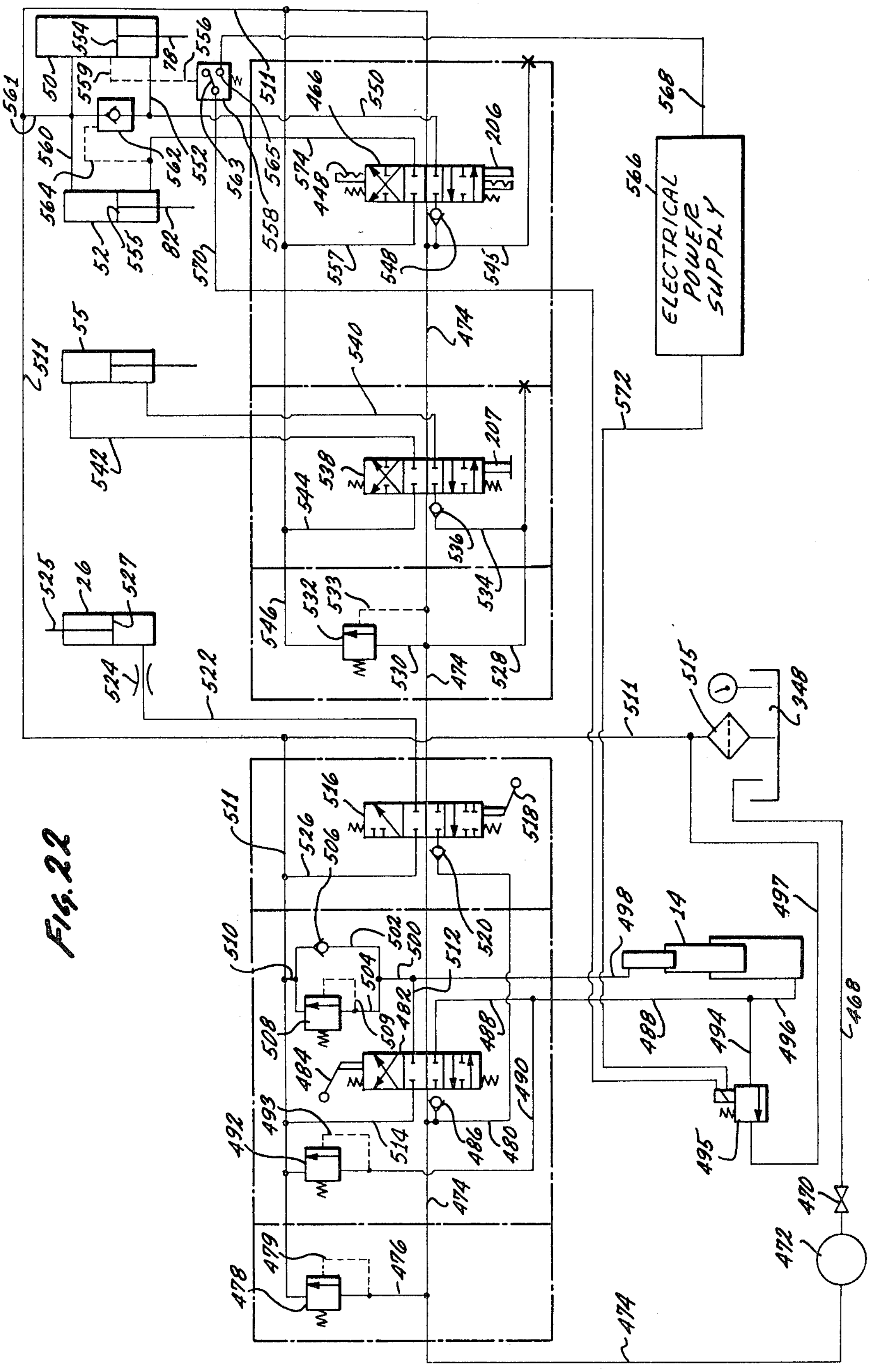
Figure 23:
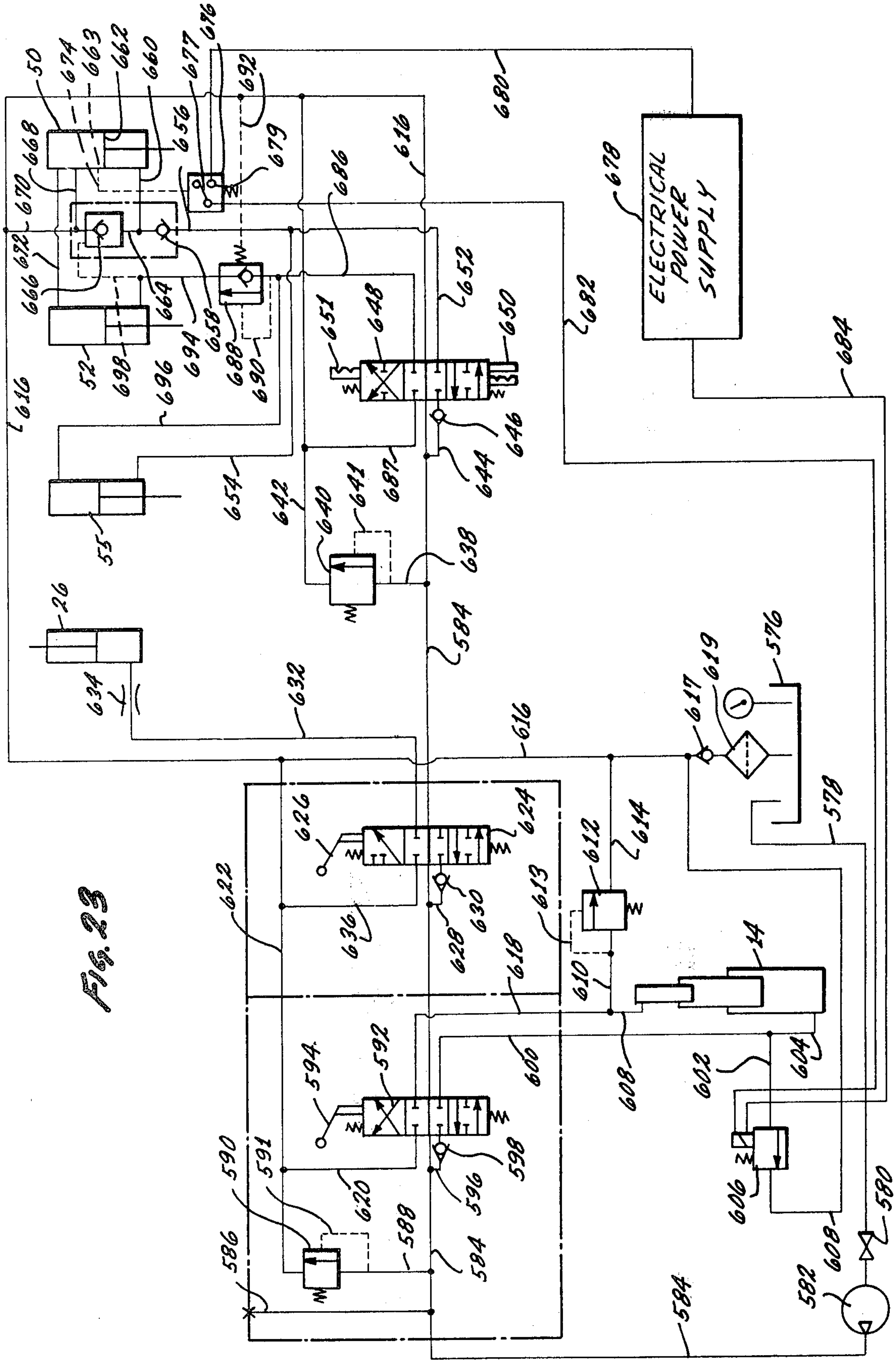

FIG. 14*a* is a sectional view taken along line 14*a*—14*a* of FIG. 14;

FIG. 14*b* is a detailed sectional view taken along line 14*b*—14*b* of FIG. 14;

FIG. 14*c* is a detailed view, partially in section, of the top beam for the tailgate illustrating a stiffening assembly incorporated into the beam for resisting twisting forces imparted to the beam by the weight of the relatively heavy driving mechanism for the packing panel illustrated at the left in FIG. 14;

FIG. 14*d* is a sectional view taken along line 14*d*—14*d* of FIG. 14*c* to illustrate the structure of the stiffening assembly within the top beam;

FIG. 15 is a sectional view taken along line 15—15 of FIG. 1 to illustrate the structure of the refuse storage container and the manner in which flexible plates may be utilized in forming walls of the container with the plates being bowed outwardly to be placed in tension as pressures are applied to the interior of the refuse container;

FIG. 16 is a view taken along line 16—16 of FIG. 1 to illustrate the inner appearance of the tailgate;

FIG. 16*a* is a sectional view taken along line 16*a*—16*a* of FIG. 16 to illustrate the configuration of a seal utilized in sealing the tailgate to the refuse storage container when the tailgate is lowered to a closed position;

FIG. 17 is an elevational view of the refuse storage container as viewed from inside the storage body;

FIG. 17*a* is a sectional view taken along line 17*a*—17*a* of FIG. 17;

FIG. 18 is a rear view of the refuse storage body, as viewed from the right in FIG. 1, with the tailgate removed for clarity of illustration;

FIG. 18*a* is a sectional view taken along line 18*a*—18*a* of FIG. 18;

FIG. 19 is a partial elevational view of the tailgate as viewed from the right side in FIG. 14 to illustrate a control mechanism for causing movement of the packing panel, coupled with a stop mechanism connected to the packing panel for returning the control mechanism to a neutral position;

FIG. 19*a* is a partial detailed view taken along line 19*a*—19*a* of FIG. 19;

FIG. 20 is an elevation view taken along line 20—20 of FIG. 19;

FIG. 21 is an elevational view of control rods positioned within the tailgate whose movement is controlled by movement of the control mechanism of FIG. 19;

FIG. 21*a* is a sectional view taken along line 21*a*—21*a* of FIG. 21;

FIG. 21*b* is an elevational view, similar to FIG. 21*a*, illustrating the positioning of the control rods after one of the control rods has returned to its neutral position, with the other control rod remaining in an activated position;

FIG. 21*c* is a partial sectional view taken along line 21*c*—21*c* of FIG. 21 illustrating the functioning of a detent mechanism in holding one of the control rods in an activated position while the other control rod may be returned to its neutral position;

FIG. 22 is a schematic hydraulic circuit diagram illustrating one embodiment of a hydraulic circuit for controlling movement of the refuse compaction mechanism;

FIG. 23 is a schematic hydraulic circuit diagram, similar to FIG. 22, illustrating a second embodiment of a hydraulic circuit for controlling movement of the refuse compaction mechanism, and, FIG. 24 is an elevational view, similar to FIG. 21, illustrating the use of a single control rod for actuating a portion of the elements in the hydraulic circuit illustrated in FIG. 23.

DETAILED DESCRIPTION

FIG. 1 illustrates the invention embodied in a garbage truck 2 having a cab 4 and a frame 6. A storage body 8 for holding refuse under pressure is positioned on the truck frame 6 with a tailgate 10 being rotatably supported at the rear of the storage body. The tailgate in its closed position is indicated in solid line drawing as 10 and is illustrated in phantom line drawing in a raised position as 10′. During the packing of storage body 8 with refuse under pressure, the tailgate is maintained in its lowered position 10 and is fixedly positioned against the storage body. However, when the storage body 8 is filled with refuse, the tailgate is then raised to its position 10′ and refuse within the storage body may be ejected through the exposed opening at the rear of the storage body.

An ejection panel 12 may be slidably positioned within the storage body 8 with movement of the ejection panel serving to vary the volume within the storage body which is available for storing refuse. To fill the storage body 8 with the maximum amount of refuse, it is important that refuse within the storage body be packed at a relatively uniform pressure. To accomplish this result, the ejection panel may be positioned as shown in solid line drawing 12 at a point adjacent the rear of the storage body 8 during the initial stage of packing refuse within the storage body.

As refuse is introduced into the storage body 8 from tailgate 10, the refuse may exert pressure against the ejection panel 12. When the pressure exerted by refuse in the passage 42 exceeds a predetermined pressure level, the ejection panel may then be moved a small incremental distance toward the front of the storage body 8. This reduces the pressure exerted by refuse against the ejection panel 12 and the packing of refuse into the storage body 8 may then continue until the pressure exerted by refuse in the passage 42 again exceeds the predetermined pressure level with the ejection panel then being again moved a small incremental distance, etc. Progressive filling of the storage body 8 with refuse may then be accomplished in a uniform manner with the refuse being packed within the storage body at a relatively uniform pressure. This results in filling the storage body 8 with the maximum amount of refuse which is beneficial in reducing the time which is lost in trips to a landfill or refuse transfer center to discharge refuse.

When the storage body 8 is full of refuse, the ejection panel may occupy the position shown in phantom line drawing as 12′ adjacent to the forward end of the storage body. To move the ejection panel 12 within the storage body 8, a telescopic cylinder 14 may be connected to a pivot 16 at the forward end of the storage body with the other end of the cylinder connected to a pivot 18 on the frame for the ejection panel. With the ejection panel in its forward position 12′, the telescopic cylinder 14 may be completely contracted and with the ejection panel in its rearward position 12, the cylinder may be completely extended. Slide rails 20 may be positioned along either side of the storage body 8 with slots in the frame for the ejection panel 12 engaging the slide rails. The upright position of the ejection panel 12 within the storage body 8 may, thus, be maintained during movement of the ejection panel.

As indicated, the storage body 8 may include a front frame 22 positioned adjacent to the cab 4 and a rear frame 24 which supports the tailgate 10 and engages the tailgate in its closed position. The construction of the storage body 8, as will be described, is strong and also surprisingly light as compared with prior constructions. Thus, the storage body 8 does not require support at points intermediate its ends. Only the front and rear frames 22 and 24 may be connected to the truck frame 6 in providing a lighter construction with savings in the energy required to power the truck 2 and a reduction in the wear and tear on the highways during usage of the truck.

A tailgate cylinder 26 may be employed for raising and lowering of the tailgate 10. The tailgate 10 may be connected to the rear frame 24 through pivots 28 positioned on either side of the rear frame. The tailgate cylinder 26 may be connected to the rear frame 24 through a pivot 30 with the other end of the tailgate cylinder being connected to the tailgate 10 through a pivot 32. The cylinder is illustrated in solid line drawing in an extended condition as 26 with the tailgate in its raised position 10′. With the tailgate in its lowered position 10, the tailgate cylinder is shown in phantom line drawing in its contracted condition as 26′. A hopper generally indicated as 34 may be formed in the lower portion of the tailgate 10 with the hopper including a curved bottom surface 36, a loading opening 38 to receive refuse, and a loading sill 40 beneath the loading opening. A passage shown in phantom line drawing as 42 may lead from the hopper 34 into the storage body 8 and a packing panel, generally indicated as 44, may be positioned within the hopper to move refuse from the hopper through the passage into the storage body.

The packing panel 44 may include a main panel indicated in phantom line drawing as 46 and a foldable panel in phantom line drawing as 48. As will be described, the foldable panel 48 may undergo limited rotational movement with respect to the main panel 46 with the foldable panel in an extended position adjacent the surface 36 as the packing panel 44 sweeps through the hopper 34 in a working direction to move refuse through the passage 42 into the storage body 8. However, when the packing panel 44 then moves in a return direction to return to its rest position adjacent the rear of the hopper 34, the foldable panel 48 may undergo rotational movement with respect to the main panel 46 to pass over refuse within the hopper.

In discussing the various positions of the packing panel 44, the packing panel will be referred to in its extended condition when the foldable panel 48 is extended to a position adjacent the bottom surface 36 during movement of the packing panel in a working direction. The packing panel 44 will be referred to in its collapsed or partially collapsed condition as the packing panel moves in a return direction to its rest position. To provide movement of the foldable panel 48 with respect to the main panel 46, friction pads indicated in phantom line drawing as 49 may be provided in either end of the foldable panel. The friction pads 49 may have an outer surface formed of plastic with the friction pads being spring biased in an outward direction into contact with the sidewalls of the hopper 34. The friction pads 49 may, thus, cause rotational movement of the foldable panel 48 to an extended condition as the panel sweeps through the hopper 34 in a working direction. However, on movement of the packing panel 44 in a return direction to its rest position, the frictional contact of the friction pads 49 with the sidewalls of the hopper 34 may cause rotational movement of the foldable panel 48 to a collapsed or partially collapsed position such that the foldable panel 48 may ride over refuse within the hopper.

In providing movement of the packing panel 44 within the hopper 34, a relatively large hydraulic drive cylinder 50 may be used to drive the packing panel in a working direction while a smaller hydraulic return cylinder 52 may be used to move the packing panel in a return direction to its rest position. As indicated, the drive cylinder 50 may transmit rotational movement to the packing panel 44 through a drive plate 53 which is operatively connected to the packing panel and functions as a lever in providing a mechanical advantage in transmitting power to the packing panel.

A retainer panel indicated in phantom line drawing as 54 may be rotatably positioned adjacent the entrance into the passage 42 from the hopper 34. During movement of the packing panel 44 in a working direction through the hopper 34, the retainer panel 54 may positioned in its opened position as indicated in FIG. 1 to permit movement of refuse from the hopper into the passage. With the retainer panel 54 in its opened position as indicated in FIG. 1, the lower surface of the retainer panel, in effect, forms a continuation of the upper surface of the passage 42. This is advantageous in assisting the movement of refuse from the hopper 34 through the passage 42. However, on movement of the packing panel 44 in a return direction away from the passage 42, as will be described, the retainer panel may be rotated to its closed position to at least partially block the opening between the passage and the hopper 34. With the retainer panel 54 in its closed position, the flow of refuse from the passage 42 into the hopper 34 is impeded, which improves the overall efficiency of the packing mechanism in moving refuse from the loading hopper into the storage body 8.

With the packing panel 44 in its rest position in a raised location at the rear of the hopper 34, the packing panel may be in its collapsed condition. During movement of the packing panel 44 from its rest position in a working direction, contact of the friction pads 49 against the sidewalls of the hopper 34 cause the foldable panel 48 to undergo rotational movement with respect to the main panel 46. During this movement of the packing panel 44 in a working direction, it is desirable that the foldable panel 48 should not extend out of the hopper 34 through the loading opening 38 since this could present a safety hazard. Guide rails shown in phantom line drawing as 56 may be formed on the side walls of the hopper 34. The guide rails 56 may extend inwardly to engage the foldable panel 48 and to maintain the foldable panel within the confines of the hopper as the packing panel 44 moves from its rest position to a position adjacent the hopper sill 40.

As indicated in FIG. 1, the telescopic cylinder 14 may be used in moving the ejection panel 12 within the storage body 8. A telescopic cylinder, such as cylinder 14, is a relatively complex hydraulic device with internal passages within the cylinder to supply hydraulic fluid to the various cylinder sections which vary in size. Due to the difference in size between the pressure areas within the telescopic cylinder, problems may be encountered in its use. For example, when there is an increase in the ambient temperature and the telescopic cylinder is full of hydraulic fluid, the expansion of hydraulic fluid at the large area end of the cylinder may produce undesirably high pressures at the small area end of the cylinder. If the ratio between the areas at the large and small ends of the cylinder is, for example, 10 to 1, a one hundred pounds per square inch increase due to expansion of fluid at the large end may produce a thousand pounds per sequare inch increase at the small end. It would, thus, be desirable if some means could be provided for providing movement to the ejection panel 12 without requiring the use of a telescopic cylinder, such as cylinder 14. However, due to the large distance through which a hydraulic cylinder must move in providing movement to the ejection panel 12, there has previously been no alternative except to use a telescopic hydraulic cylinder.

Figure 2:
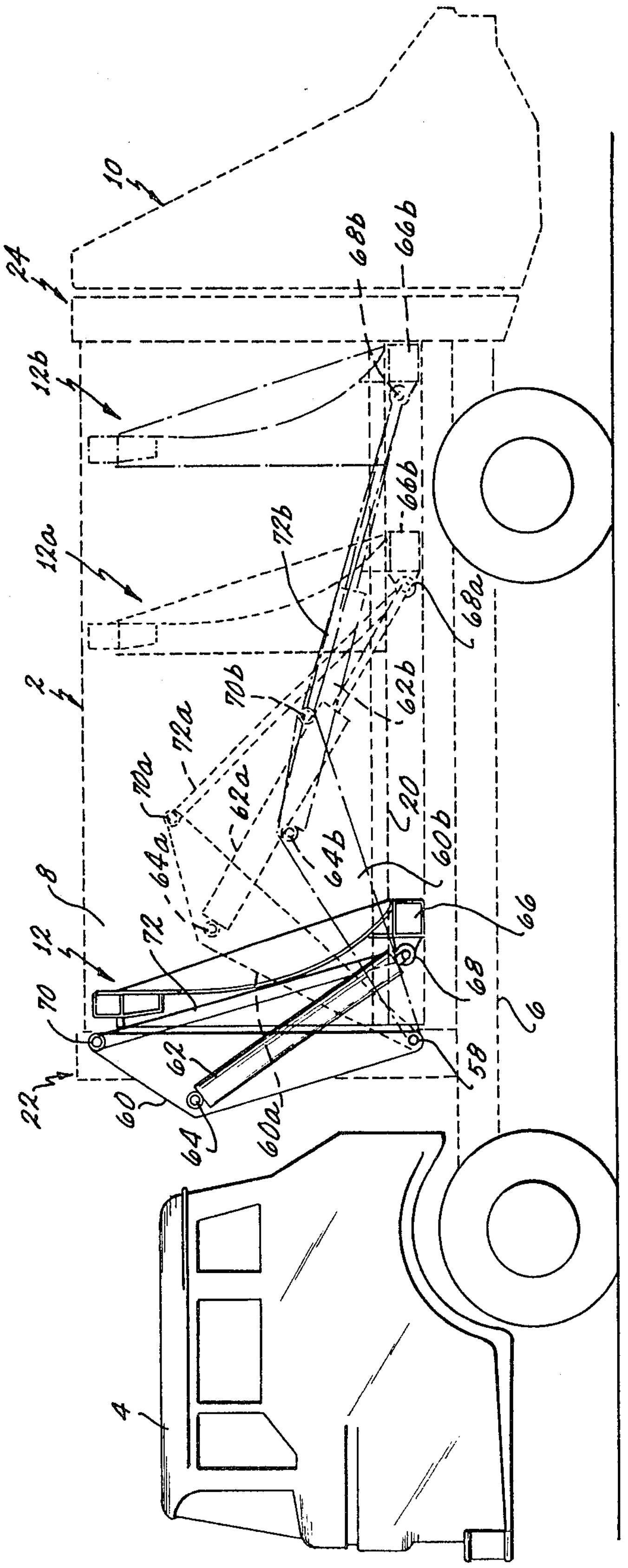
FIG. 2 is a side elevational view of a garbage truck illustrating the movement of an ejection panel within the storage container by a conventional hydraulic cylinder that is supported by a pivotal mounting which imparts translational movement to the cylinder that is in the same direction as the movement of the ejection panel.

FIG. 2 illustrates an embodiment of the invention in which a means is provided to produce movement of the ejection panel 12 through use of a conventional hydraulic cylinder. For simplicity in illustration, like reference numerals have been used in referring to structural elements in FIG. 2 which are the same as those described in FIG. 1. As indicated, a pivot 58 may be provided at the forward end of the storage body 8, with a preferably triangular support member 60 rotatably supported by the pivot. A conventional hydraulic cylinder 62 may be rotatably secured to a pivot 64 on the support member 60 positioned at a point intermediate its ends. As indicated, with the ejection panel 12 at its forward position within the storage body 8, the generally triangular configuration of support member 60 may be advantageous in permitting the hydraulic cylinder 62 to extend in a forward direction beyond the front frame 22. This permits the storage body 8 to be made shorter since there does not need to be additional length provided simply to accommodate the hydraulic cylinder 62.

The ejection panel 12 may include a transverse frame member 66 with a pivot 68 on the frame member rotatably engaging the rod of the piston 62. A link member 72 may rotatably engage a pivot 70 on the support member 60 with the link member also engaging the pivot 68 on transverse frame member 66. The link member 72, thus, fixes the distance between the pivot 70 on support member 60 and the pivot 68 on the transverse frame member 66. As will be described, this permits translation of the hydraulic cylinder 62 during its expansion and contraction which results from rotational movement of the support member 60 with respect to the pivot 58.

On expansion of the hydraulic cylinder from its position indicated as 62 to a new position indicated as *62a*, the support member 60 undergoes rotational movement to position *60a*. This produces movement of the pivot *64a* to a new position 64' such that the hydraulic cylinder in position *62a* has undergone translational movement to follow the movement of the ejection panel to its new position *12a*.

On further expansion of the hydraulic cylinder to position *62b*, the ejection panel has been moved to position *12b* where it is positioned immediately adjacent to the rear end of the storage body 8. Also, the support member has undergone further rotational movement to position *60b* with further movement of the pivot 64 to position *64b*. Thus, the translational movement provided to hydraulic cylinder 62 has permitted the use of the cylinder in providing a movement of the ejection panel 12 which is much greater than the total expansion of the hydraulic cylinder. A conventional hydraulic cylinder 62 may, therefore, now function in a manner which is the equivalent of the function of a more complex and more expensive telescopic hydraulic cylinder. During contraction of the hydraulic cylinder 62, the above sequence of movements is reversed, with the cylinder moving from position *62b* to position *62a* and then to position 62 as the support member moves from position *60b* to position *60a* and then to position 60.

Figure 3:
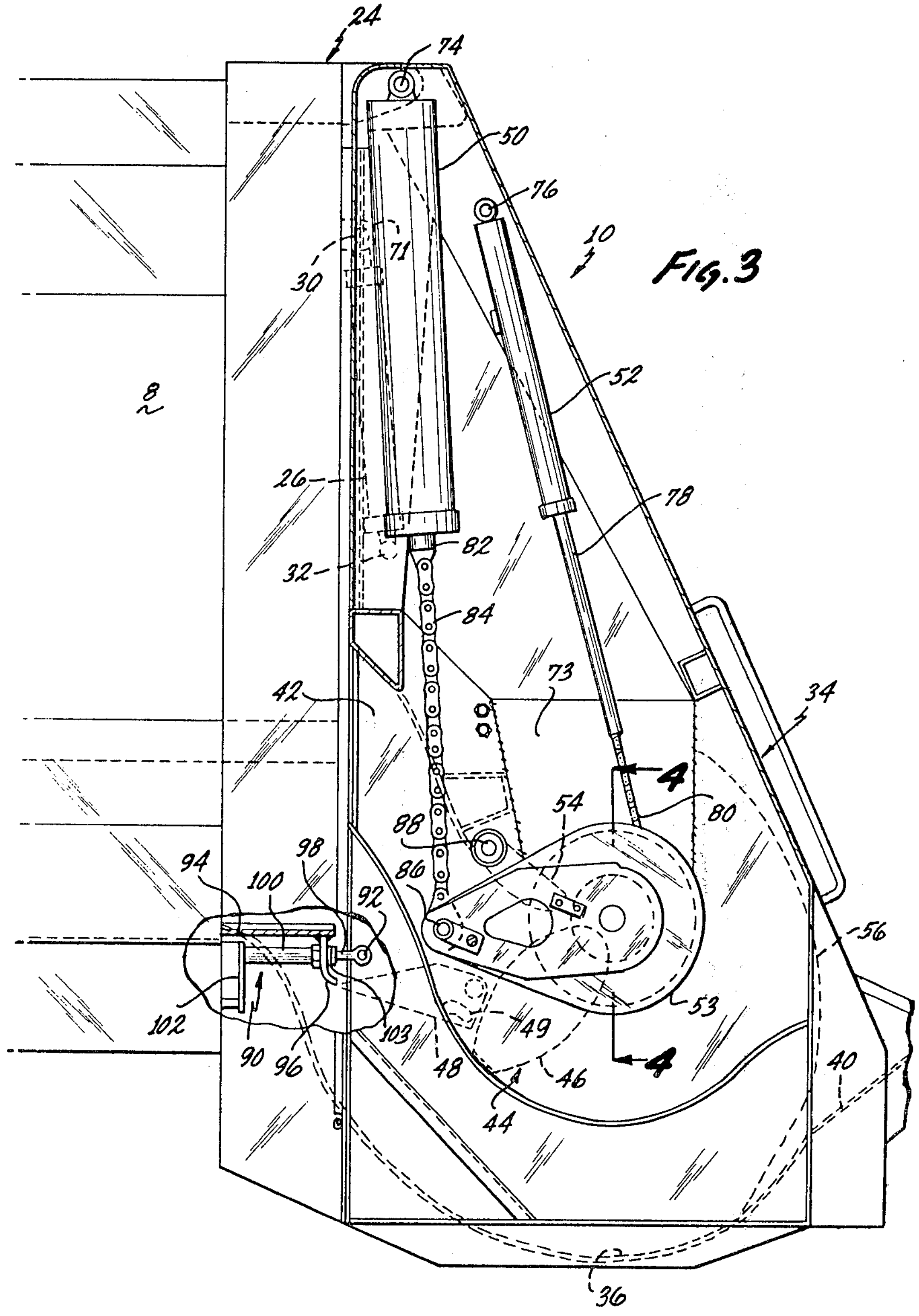
FIG. 3 is a side sectional view of the tailgate structure positioned at the rear of the storage container as shown in FIG. 1 with a side plate for the tailgate removed to illustrate the position of hydraulic cylinders therein for moving a packing panel through a loading hopper.

FIG. 3 is a side sectional view through the tailgate 10 to illustrate the mechanism for packing refuse and moving the refuse from the hopper 34 into the storage body 8. The pivot 30 for the tailgate cylinder 26, as illustrated, may be formed within a mounting ear 71 which is affixed to the rear frame 24. The hopper 34, as viewed from the left in FIG. 3, may include a sidewall 73 which may be formed from several plates connected together in any suitable fashion, such as by welding. The sidewall 73 may be positioned between the packing panel 44 and the drive mechanism for the packing panel itself such that the drive mechanism is shielded from contact with refuse. The drive cylinder 50 may be rotatably connected at its upper end to a pivot 74 that is secured to the tailgate 10. Similarly, the relatively small return cylinder 52 may be connected at its upper end to a pivot 76 secured to the tailgate 10. The packing panel 44, as illustrated, has completed its movement in a working direction through the hopper 34 to move refuse from the hopper into the passage 42. At this point, the return cylinder 52 is completely extended, as indicated by the position of the piston rod 78. Piston rod 78 may be connected to a drive chain 80 for transmitting movement to the packing panel 44 during its movement in a return direction to its rest position.

With the packing panel 44 positioned as illustrated, the drive cylinder 50 is completely contracted as indicated by the retracted position of piston rod 82. The piston rod 82 may be connected to a drive chain 84 whose lower end is secured to a connection 86 on the drive plate 53. As described, the drive cylinder 50 and the return cylinder 52 may work together in unison because of their connection to the drive mechanism for the packing panel 44. Thus, as the drive cylinder 50 contracts, the return cylinder 52 expands during the movement of the packing panel 44 in a working direction through the hopper 34. Similarly, during movement of the packing panel 44 in a return direction to its rest position, the return cylinder 52 contracts while the drive cylinder 50 expands.

The retainer panel 54 may be rotatably secured to a pivot 88 for movement between its open and closed positions. The retainer panel 54 is illustrated in its opened position in FIG. 3 as the packing panel is moved in a working direction through the hopper 34 to move refuse from the hopper into passage 42 and into the storage body 8.

With the tailgate 10 in its lowered position, the tailgate may be fixed with respect to the storage body 8 by a tailgate latch generally referred to as 90. The tailgate latch 90 may be rotatably connected to the tailgate 10 through a pivot 92 while a support member 94 on the rear frame 24 supports a keeper 96 which is engaged by the tailgate latch 90. The tailgate latch 90 may include a threaded rod 98 with a correspondingly threaded sleeve 100 being positioned about the rod. A handle 102 may be formed at the outer end of the sleeve 100 such that turning of the handle either threads or unthreads the sleeve with respect to the threaded rod 98. An enlargement 103 on the rod 98 may engage one side of the keeper 96 while the other side of the keeper may be engaged by the inner end of the sleeve 100 with the keeper, thereby, being tightly gripped between the enlargement and the end of the threaded sleeve. The tailgate 10 may then be securely latched to the storage body 8.

Figure 4:
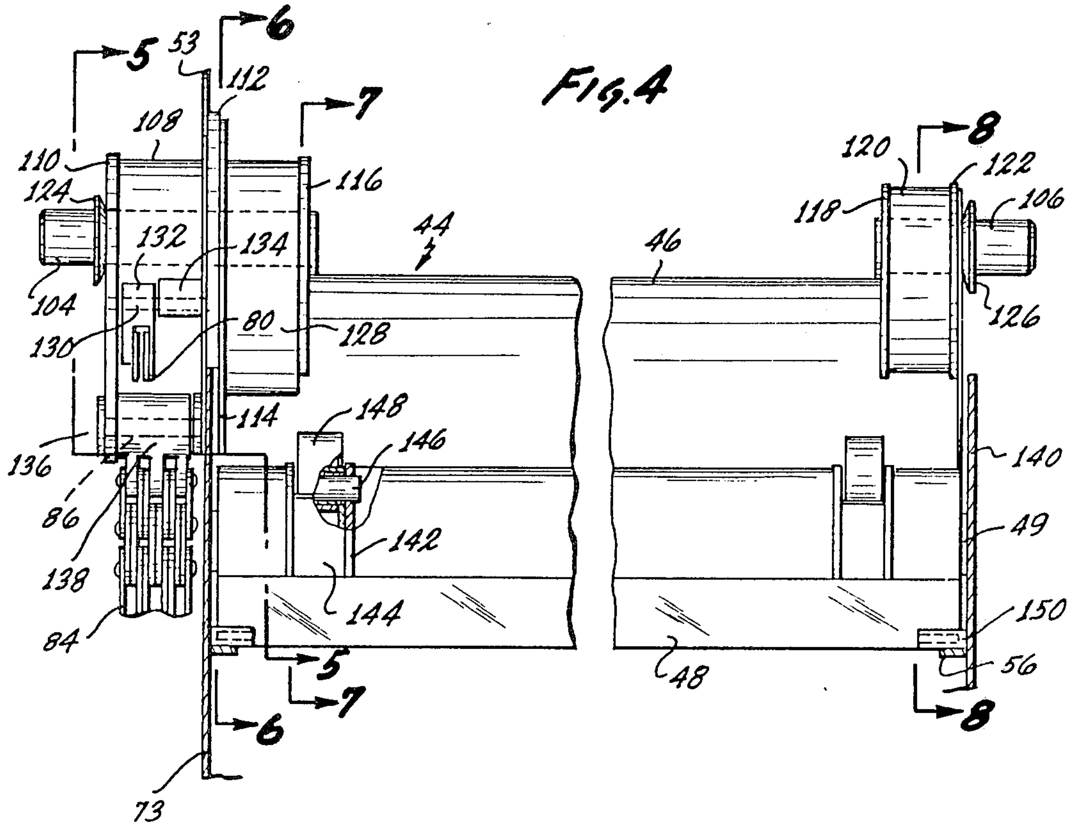
FIG. 4 is an elevation detailed view of a packing panel and a portion of the drive mechanism for the panel, viewed from the rear of the tailgate as illustrated in FIG. 1.

Turning to FIG. 4, which is a sectional view taken along line 4—4 of FIG. 3, the packing panel 44 may be rotatably mounted on a pair of shafts 104 and 106. In driving the packing panel 44, a torque tube 108 may be secured to the shaft 104 with a drive plate 110 being rigidly secured to the outer end of the torque tube. As illustrated, the shaft 104, the torque tube 108, the drive plate 110 and the drive plate 53 move together in unison in imparting rotational movement to the packing panel 44. Moving inwardly along the shaft 104, a separator plate 112 is joined to the drive plate 53 and a stiffening plate 114 is joined to the plate 112 and to the torque tube 108. A stiffening plate 116 may then be joined to the inner end of the torque tube 108, to the shaft 104 and to the main panel 46.

At its undriven end, the main panel 46 may be connected to the shaft 106 by a stiffening plate 118 which is joined to the shaft and also to the main panel. A support member 120 may surround the shaft 106 and be connected to the main panel 46 with a stiffening plate 122 being joined to the other end of the support member, to the shaft and also to the main panel. A collar 124 may be positioned about the shaft 104 with the collar engaging the exterior surface of the drive plate 110 and a collar 126 may be positioned about the shaft 106 with the collar engaging the exterior surface of stiffening plate 122.

To provide a strong and rigid connection between the torque tube 108, the shaft 104 and the main panel 46, a pair of side plates 128 may be secured to the torque tube and also to the main panel. The side plates 128 with the stiffening plates 114 and 116, joined to the end surfaces of the side plates, form a very rigid structure through which torque is transmitted from the torque tube 108 to the main panel 46.

As illustrated, the drive chains 80 and 84 may each be connected to the drive plates 53 and 110 through which torque is imparted to the torque tube 108 and to the packing panel 44. In connecting the drive chain 80 to plates 53 and 110, a pin 130 may be secured to the drive plates through apertures therein with a clevis 132 positioned on the pin and having secured thereto the drive chain 80. A spacer element 134 may also be positioned on the pin 130 to maintain the position of the clevis 132 relative to the pin 130.

In securing the drive chain 84 to the drive plates 110 and 53, the pivot 86 may be secured to the drive plates through apertures therein with a mounting plate 136 secured to plate 110 to retain the outer end of the pivot relative to the plate 110. A clevis 138 may be rotatably positioned on the pivot 86 with the clevis secured to the drive chain 84. As indicated, the connection between the drive chain 84 and clevis 138 is positioned a greater distance from the axes of the shafts 104 and 106 than the connection between drive chain 80 and the clevis 132. Thus, forces transmitted to packing panel 44 through the drive chain 84 may act through a greater moment arm than the forces transmitted to the packing panel by the drive chain 80. This is advantageous in providing a mechanical advantage during movement of the packing panel 44 in a working direction by the drive chain 84.

The side wall 73 of the hopper 34, as illustrated in FIG. 4, may extend into a space between the plates 53 and 114 such that the drive mechanism for the packig panel 44 is isolated from refuse within the loading hopper 34. A second sidewall 140 of loading hopper 34 may also be positioned in close proximity to the other end of the packing panel 44. The foldable panel 48 may be rotatably mounted with respect to the main panel 46 within slots 142 formed in the main panel. Tongue members 144 joined to the foldable panel 48 may be positioned within the slots 142 with the tongue members each being rotatably secured to pins 146 which extend between the sidewalls of the slots to engage apertures formed in the tongue members. Stop members 148 may be secured to the main panel 46 to permit limited rotational movement of the foldable panel 48 with respect to the main panel 46.

The rotational movement of panel 48, as discussed previously, may be provided by friction pads 49 positioned at either end of the foldable panel 48 in contact with the sidewalls 73 and 140. As the main panel 46 is moved, the frictional engagement of pads 49 with the sidewalls 73 and 140 causes rotational movement of the foldable panel 48 with respect to the main panel 46. Additionally, the movement of the foldable panel 48 is controlled to some extent by the guide rails 56 which may extend inwardly a short distance from the sidewalls 73 and 140 to engage guide members 150 on the foldable panel 48.

Figure 5:
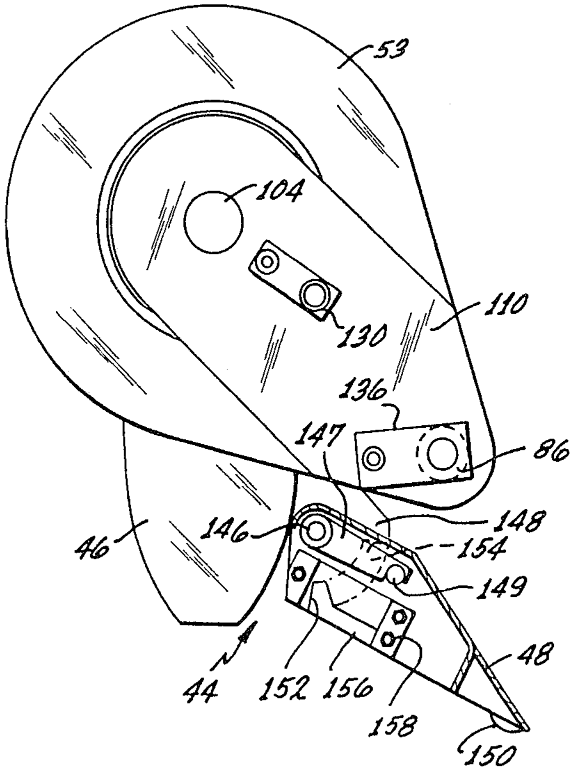
FIG. 5 is an end elevational view, partly in section, of the packing panel taken along line 5—5 of FIG. 4.

FIG. 5 is a sectional view taken along line 5—5 of FIG. 4 which illustrates the position of foldable panel 48 with respect to main panel 46 and the manner in which rotational movement of the foldable panel is limited with respect to the main panel. As indicated, support brackets 147 secured within the foldable panel 48 by bolts 149 may rotatably engage the pins 146 mounted to the main panel 46. The support brackets 147 may be secured to the foldable panel 48 by bolts 149. Stop members 148 secured to the main panel 46 may each provide stop surfaces 152 and 154 which are engagable by a stop member 156 secured to the foldable panel 48 by a support bracket 158. As indicated, contact between the stop member 156 and stop surfaces 152 and 154 effectively limits the rotational movement of the foldable panel between the limiting positions provided by the stop surfaces.

FIG. 5 illustrates the foldable panel 48 in its extended condition after rotation of the foldable panel in a clockwise direction with respect to the pin 146 to engage the stop member 156 with the stop surface 152. This is the position of the foldable panel 48 when the packing panel 44 rotates in a counter-clockwise direction from its direction shown in FIG. 5 in moving in a working direction through the hopper 34 as shown in FIG. 3. During rotational movement of the packing panel 44 in a return direction, i.e., clockwise from its position shown in FIG. 5, the foldable panel 48 may undergo rotational movement in a counter-clockwise direction until the stop member 156 contacts the stop surface 154. At this point, the packing panel 44 is in a collapsed position such that the foldable panel 48 may pass over refuse within the hopper 34 during movement of the packing panel in its return direction.

FIG. 6 is a sectional view taken along the line 6—6 of FIG. 4 to illustrate the construction of the main panel 46 and that of the stop members 148 which control the degree of rotational movement of the foldable panel 48. As indicated, the torque tube 108 may be directly connected to the main panel 46 which may be displaced from the axis of the torque tube. Additionally, the side plates 128 may extend from the exterior surface of the torque tube 108 to the exterior surface of the main panel 46 to provide a very strong and rigid connection between the torque tube and main panel. In previous refuse compaction apparatus, it has been necessary to drive the packing mechanism through hydraulic cylinders positioned at either end of the packing panel. However, in the present apparatus, the main panel 46 may be driven from only one of its ends. This permits a great reduction in the weight of the drive mechanism and also simplification of the drive mechanism. To achieve these beneficial results, the main panel 46 has a generally elliptical cross-sectional configuration which has great strength in resisting twisting moments and in transmitting torque. The cross-sectional configuration of the main panel 46 together with the strong and rigid connection between the torque tube 108 and the main panel permits driving the main panel from only one of its ends with the torque which is imparted to the main panel then being transmitted throughout the main panel.

As indicated in FIG. 6, an aperture 160 may be formed in each of the stop members 148 to rotatably support the foldable panel 48 with respect to the main panel 46. Additionally, an aperture 162 may be formed in the stiffening plate 114 to engage the support shaft 104 as shown in FIG. 4.

FIG. 7 is a sectional view taken along the line 7—7 of FIG. 4 which illustrates the internal construction of the main panel 46 through which the foldable panel 48 is supported. To provide strength within the main panel 46 to support the foldable panel 48, transverse baffle plates 164 may be positioned within the interior of the main panel with the baffle plates being secured to the inner surface of the main panel through any suitable means such as welding. Additionally, the baffle plates 164 may then extend through the exterior surface of the main panel 46 to be integrally connected to the stop members 148. A channel 166 (shown in phantom line drawing) may then be rigidly secured to the baffle plate and an angle 168 may be connected to the stop member 148 in providing additional strength for the stop members.

FIG. 8 is a sectional view taken along the line 8—8 of FIG. 4 which illustrates the cross-sectional configuration of the main panel 46 at its undriven end. In securing the main panel 46 to the shaft 106, an aperture 170 may be formed in the stiffening plate 122 to engage the exterior surface of the shaft. During movement of refuse from the loading hopper 34 through the passage 42 into the storage body 8, as discussed in regard to FIGS. 1 and 3, the movement of the packing panel 44 and the retainer panel 54 may be precisely coordinated. Thus, as the packing panel 44 is driven in a working direction through the hopper 34, the retainer panel 54 may be positioned in an opened position so that there is unimpeded flow of refuse from the hopper 34 into the passage 42 and then into the storage body 8. However, with movement of the packing panel 44 in a return direction to return the packing panel to its rest position, the retainer panel 54 is moved to a closed position with the retainer panel at least partially blocking the opening between the loading hopper 34 and the passage 42. In its closed position, the retainer panel 54, thus, functions to impede the flow of refuse from the passage 42 into the hopper 34.

When the packing panel 44 has completed its movement in a working direction with the retainer panel 54 in an opened position (see FIG. 3), the retainer panel is positioned closely adjacent to the exterior surface of the main panel 46. When the movement of the packing panel 44 is then reversed in moving the packing panel in a return direction, the retainer panel 54 may then be immediately moved to its closed position. During this movement of the retainer panel to a closed position, the retainer panel may move very close to the surface of the main panel to sweep refuse from the main panel which is forced into the passage 42 by the retainer panel 54. Returning to FIG. 8, the main panel 46 may include an inwardly curved surface 172 which is expressly designed to accommodate the movement of the retainer panel 54 relative to the main panel 46 as the retainer panel is moved from its opened to its closed position. The retainer panel 54 may, thus, move along the inwardly curved surface 172 in sweeping refuse from the main panel 46 which is, thereby, forced from the main panel 46 into the passage 42.

FIG. 9 is a detailed view of the retainer panel, as shown in FIGS. 1 and 3, with the panel in its opened position indicated in solid line drawing as 54 and the panel in its closed position indicated in phantom line drawing as 54'. With the retainer panel in its opened position 54, the lower panel surface 173, in effect, forms a continuation of the wall 174 of passage 42. Thus, with the retainer panel in its opened position 54, the configuration of the panel assists in the movement of refuse into the passage 42. A cross brace 176 provides strengthening of the wall 174 adjacent to the retainer panel 54 with the retainer panel cylinder 55 having a piston rod 180 which extends through an opening 182 formed in the cross brace. A link 184 is joined at one end to the piston rod 180 with the other end being rotatably connected to a pin 186. An eccentric 188 has its upper end rotatably connected to the pin 186 with the eccentric passing through an opening 190 in the cross brace 176 to connect through a pin 194 to the pivot 88 for the retainer panel 54. Support members 196 and 198 may be joined to either end of retainer panel 54 to provide additional strengthening thereof.

During movement of the retainer panel to its closed position 54', the cylinder 55 undergoes extension to cause a downward movement of the piston rod 180 and link 182 and rotational movement of the eccentric 188. This, in turn, causes rotational movement of the retainer panel to its closed position 54'. During this rotational movement, the retainer panel may sweep along the inwardly curved surface 172 of the main panel 46 as illustrated in FIG. 8. To assist in holding refuse within the passage 42, the retainer panel 54 may include a lip 200. With the retainer panel in its closed position 54', the lip indicated as 200' opposes the movement of refuse along the curved surface 173 which is directed inwardly toward the passage 42, to assist in preventing the flow of refuse from the passage back into the loading hopper 34.

Figure 10:
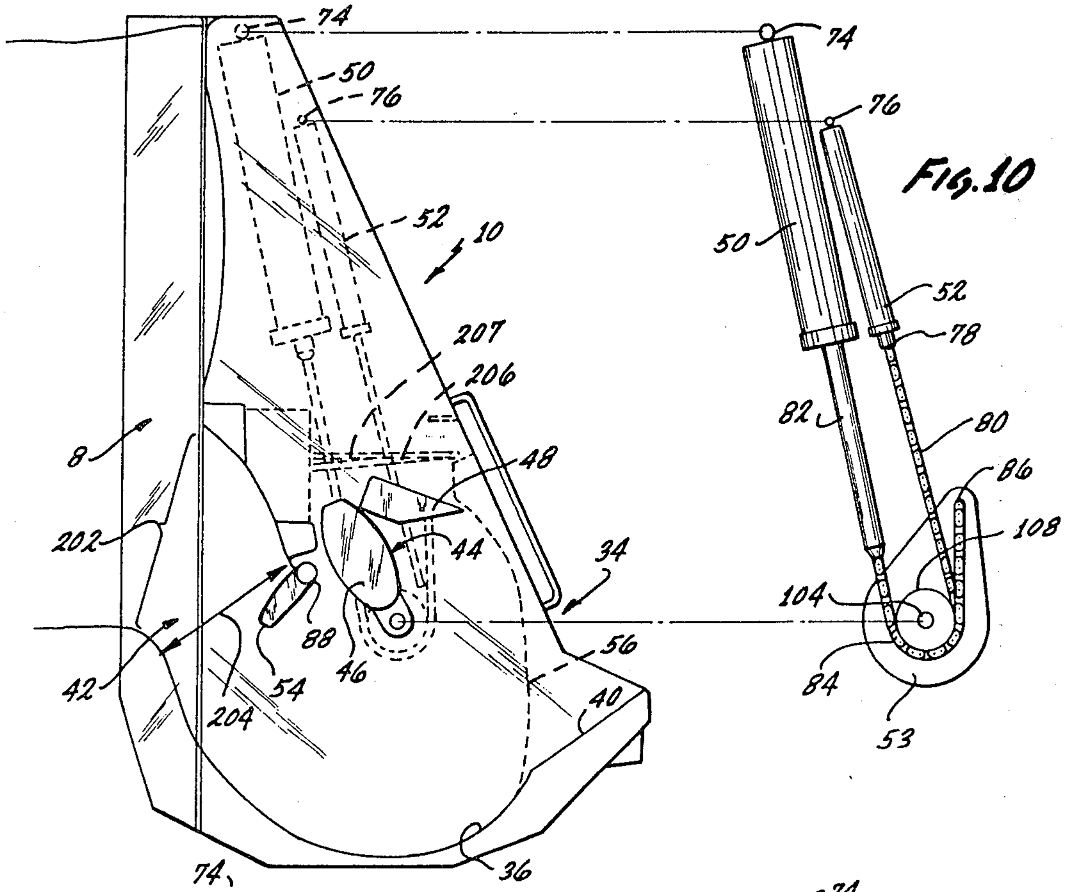
FIG. 10 is a side elevational view of the tailgate and drive mechanism, similar to FIG. 3, with the packing panel in a rest position and the retainer panel in a closed position.

FIG. 10 is the first in a series of figures which illustrate the movement of the main panel 46 and the foldable panel 48 during their movements within the loading hopper 34. As illustrated, the passage 42 includes an enlarged opening 202 which leads into the storage body 8. The passage 42 also includes a narrowed throat 204 where the walls of the passage are converged. The narrowed throat 204 serves a very unique and important function in compacting refuse in a new and improved manner as compared with refuse compacting apparatus of the prior art. In previous refuse compacting apparatus, the refuse was compacted under high pressure by packing panels which squeezed the refuse between the surfaces of the packing panels and the surface of an ejection panel such as the panel 12 illustrated in FIGS. 1 and 2. With the ejection panel being mounted within a refuse storage body, such as storage body 8, high compaction pressures were generated by squeezing the refuse between the packing panels and the ejection panel to create large internal pressures which had to be absorbed by the structure of the refuse storage body. This required that the refuse storage body had to be formed of heavy structural members, which results in increased weight of the refuse compaction apparatus. This was, of course, undesirable, since the increased weight of the refuse compaction apparatus increased the energy requirements for movement of the apparatus, Also, the increased weight of the refuse compaction apparatus caused increased wear and tear to the road surfaces used by the apparatus and increased the cost of the apparatus.

By using a passage 42 in the present apparatus with a narrowed throat 204, extremely high pressures may be generated as the refuse passes through the converging surfaces of the passage 42 within the narrowed throat 204. These locally high pressures result in squeezing the refuse within the narrowed throat 204 at pressures which may far exceed the pressures within the refuse storage body 8. For example, in the use of a refuse compaction apparatus of the invention having a narrowed throat 204, the ratio of the pressures exerted on the refuse at the narrowed throat with respect to the pressures imposed by the refuse against the ejection panel 12 within the storage body 8 (see FIGS. 1 and 2) may be in the order of 35 to 7. That is to say, when the refuse is subjected to a pressure of 35 psi in passing through the narrowed throat 204, the pressure within the storage body 8 may only be in the order of 7 psi. This, then, permits constructing the storage body 8 of relatively light materials while still uniformly packing the refuse within the storage body at the very high pressures generated within the narrowed throat 204. In this manner, the cost of the refuse compaction apparatus may be reduced by the savings in the metal used for construction of the storage body 8 and also the overall weight of the refuse compaction apparatus may be greatly reduced.

In its position shown in FIG. 10, the packing panel 44 is in its collapsed rest position with the foldable panel 48 folded with respect to the main panel 46 and the packing panel in an elevated location adjacent the rear of the hopper 34. Additionally, the retainer panel 54 is in its closed position to impede the flow of refuse from the passage 42 into the hopper 34. With the packing panel 44 in its rest position, the drive cylinder 50 is completely extended and the return cylinder 52 is completely contracted. To begin the movement of the packing panel 44 in a working direction from its rest position, control rods indicated in phantom line drawing as 206 and 207 may then be moved to initiate the flow of hydraulic fluid for contraction of the drive cylinder 50, extension of the return cylinder 52 and rotational movement of the retainer panel 54 from its closed position to its opened position.

Figure 11:
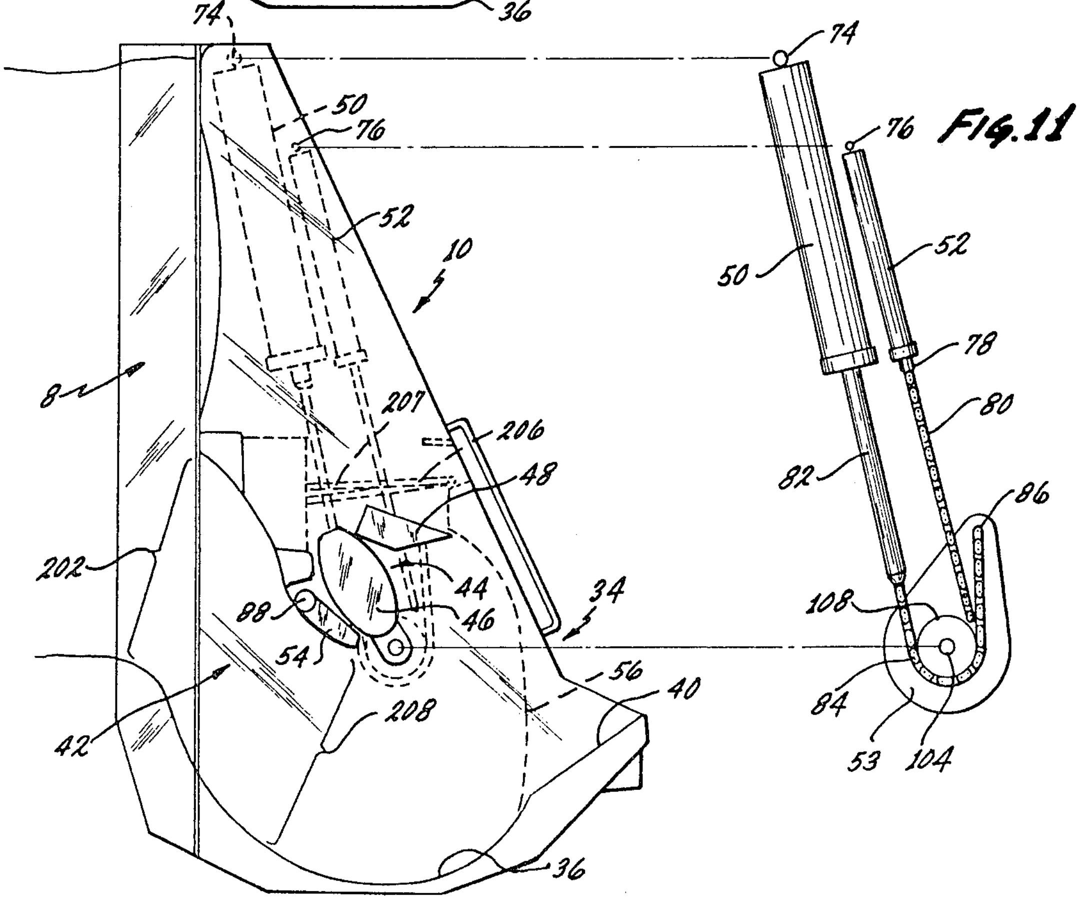
FIG. 11 is a side elevational view, similar to FIG. 10, illustrating the movement of the retainer panel in a working direction through the loading hopper.

Turning to FIG. 11, with movement of the control rods 206 and 207 to initiate movement of the packing panel 44 in a working direction, the first event to take place is the rotational movement of the retainer panel 54 from its closed position indicated in FIG. 10 to its opened position shown in FIG. 11. This provides an enlarged opening 208 from the hopper 34 into the passage 42. Moreover, as illustrated, the lower surface of the retainer panel 54 with the retainer panel in its opened position forms an extension of the adjacent surface of the passage 42 to cooperate in promoting the flow of refuse from the hopper 34 into the passage and in providing high localized pressures within the passage at the narrowed throat 204.

Figure 12:
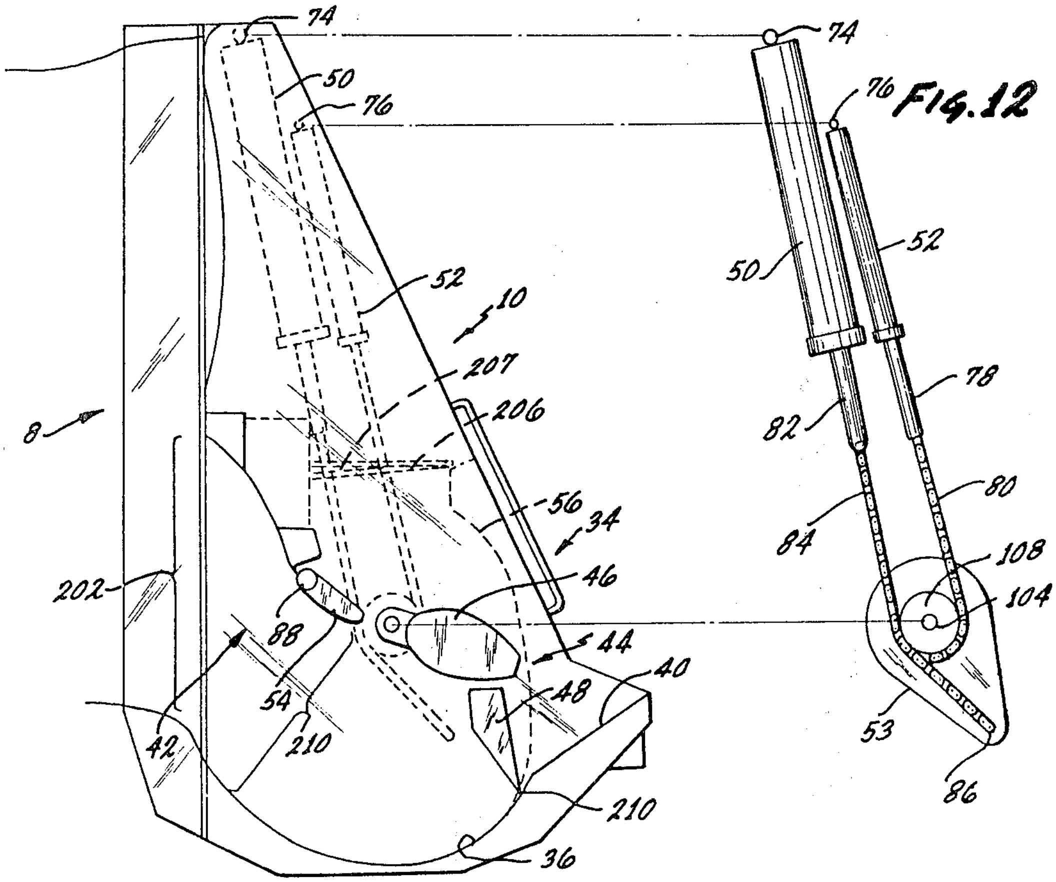
FIG. 12 is a side elevational view, similar to FIGS. 10 and 11, illustrating the position of the packing panel at its pinch-point location after movement of the panel in a working direction until the lower edge of the packing panel is positioned closely adjacent to a curved inner surface of the loading hopper at a point adjacent to the sill of the loading hopper.

Proceeding to FIG. 12, after movement of the retainer panel 54 to its opened position shown in FIG. 11, the packing panel 44 moves downwardly from its rest position within the hopper 34. During downward movement of the packing panel 44, the foldable panel 48 undergoes rotational movement with respect to the main panel 46 to move the packing panel from its collapsed condition to its extended condition. As previously described, this takes place because of the frictional engagement of the friction pads 49 (see FIGS. 1, 3 and 4) with the sidewalls of the hopper 34. During movement of the packing panel from its collapsed to its extended position, the lower edge of the foldable panel 48 is guided through contact with the side rails 56 which may maintain the foldable panel 48 within the confines of the hopper 34.

With the packing panel 44 positioned as shown in FIG. 12, the lower edge of the foldable panel 48 is brought into relatively close proximity with the curved bottom 36 at a point adjacent to sill 40, which is termed the "pinch point" 210. At the pinch point 210, there is a spacing between the lower edge of the foldable panel 48 and the inner surface 36 which is sufficiently large to accommodate a worker's fingers. Thus, if the worker were careless and placed his fingers at the pinch point 210 as the packing panel was descending, the spacing at the pinch point would be sufficiently great to prevent the loss of the worker's fingers. Also, as indicated, a considerable distance is provided between the outer end of the sill 40 and the pinch point 210 (generally in the order of a foot-and-a-half to two feet) which is a safety feature, since this distance would make it difficult for the worker to have his fingers at the pinch point.

In addition to the safety reasons for maintaining the distance between the panel 44 and the surface 36 at the pinch point 210, the distance at the pinch point reduces the impact forces exerted on the metal at the sill 40 by the descending force of the packing panel against refuse at the pinch point. In previous refuse compaction apparatus, the packing panel was brought extremely close to the inner surface of the hopper at a point adjacent to the hopper sill. The refuse was then subjected to very high shearing forces exerted thereon by the downward edge of the packing panel. To resist these high shearing forces, it was generally necessary to provide heavy reinforcement within the tailgate structure at the sill at a point approximating the location of the pinch point 210. This had the effect of increasing the overall weight of the refuse compaction apparatus. However, by providing the present distance between the foldable panel 48 and the curved inner surface 36 at the pinch point 210, it is possible to reduce the weight of the structural members in the tailgate 10 in the vicinity of the pinch point 210. This results in making the overall apparatus lighter and cheaper.

During downward movement of the packing panel 44 from its rest position, shown in FIG. 11, to its position shown in FIG. 12, the drive cylinder 50 may contract, with force being transmitted from the piston rod 82 to the drive chain 84 and to the drive plate 53 and torque tube 108. As illustrated, with this movement of the packing panel 44, the drive chain 84 may contact the exterior surface of the torque tube 108. Thus, torque which is transmitted to the packing panel 44 may be supplied through a constant moment arm determined by the radius of the torque tube 108. During this movement of the packing panel 44, the packing panel may be moved relatively rapidly and the force applied to the packing panel by the drive chain 84 may be relatively low. Also, during this movement of the packing panel 44, the panel does not encounter great resistance from refuse within the hopper 34 since the panel is merely moving from its collapsed rest position to a position where the foldable panel 48 is in an extended condition adjacent to curved inner surface 36 at the pinch point 210.

During movement of the packing panel 44 from its collapsed rest condition in FIG. 11 to its extended condition shown in FIG. 12, the return cylinder 52 may undergo expansion with the piston rod 78 being extended and the drive chain 80 being wrapped about the exterior surface of the torque tube 108. As indicated, the positioning of the drive chains 80 and 84 with respect to the torque tube 108 permits unwinding of the chain 84 from the torque tube while the drive chain 80 is being wound about the torque tube without interference between the two drive chains. Further, as illustrated, the movement of the cylinders 50 and 52 may be precisely coordinated due to their mechanical interconnection through drive chains 80 and 84 with the torque tube 108. In previous refuse compaction apparatus using several cylinders for driving a packing panel, it has been difficult to coordinate the movements of the various cylinders. This has resulted from the fact that the only interconnection between the various cylinders may have been a hydraulic interconnection which, through failure of some element in the hydraulic system, could permit the various cylinders to get out of balance. This cannot occur in the functioning of the present apparatus, since the mechanical interconnection of cylinders 50 and 52 insures that these cylinders must work in unison. Additionally, as will be described, the cylinders 50 and 52 are hydraulically interconnected. However, the hydraulic interconnection of cylinders 50 and 52 is augmented by their mechanical interconnection which prevents the cylinders from being out of balance in moving the packing panel 44 within the hopper 34.

As discussed, during movement of the packing panel 44 from its position in FIG. 11 to its position in FIG. 12, the rotational force applied to the packing panel by the drive chain 84 may be applied through a constant moment arm determined by the radius of the torque tube 108. However, on continued rotational movement of the torque tube 108 and drive plate 53 from their position shown at the right of FIG. 12, the connection point 86 moves to a point positioned to the left of the shaft 104. During this movement, the drive chain 84 is moved out of contact with the exterior surface of the torque tube 108 and the driving force from the cylinder 50 through drive chain 84 is applied directly to drive plate 53 at the connection point 86. This results in progressively increasing the moment arm through which the drive chain 84 acts in providing torque for rotational movement of the packing panel 44 with the applied force to the packing panel being progressively increased as the packing panel continues its movement through the hopper 34 in a working direction. During this movement of the packing panel 44, the resistance of refuse within the hopper is greatly increased as the refuse is compacted and forced into the passage 42 and through the narrowed throat 204. Accordingly, during this movement of the packing panel 44, it is essential that a large driving force be applied to the packing panel. Also, during this movement of the packing panel 44, the rotational speed of movement of the packing panel is progressively decreased as the moment arm between the drive chain and the axis of rotation of the panel is progressively increased.

Figure 13:
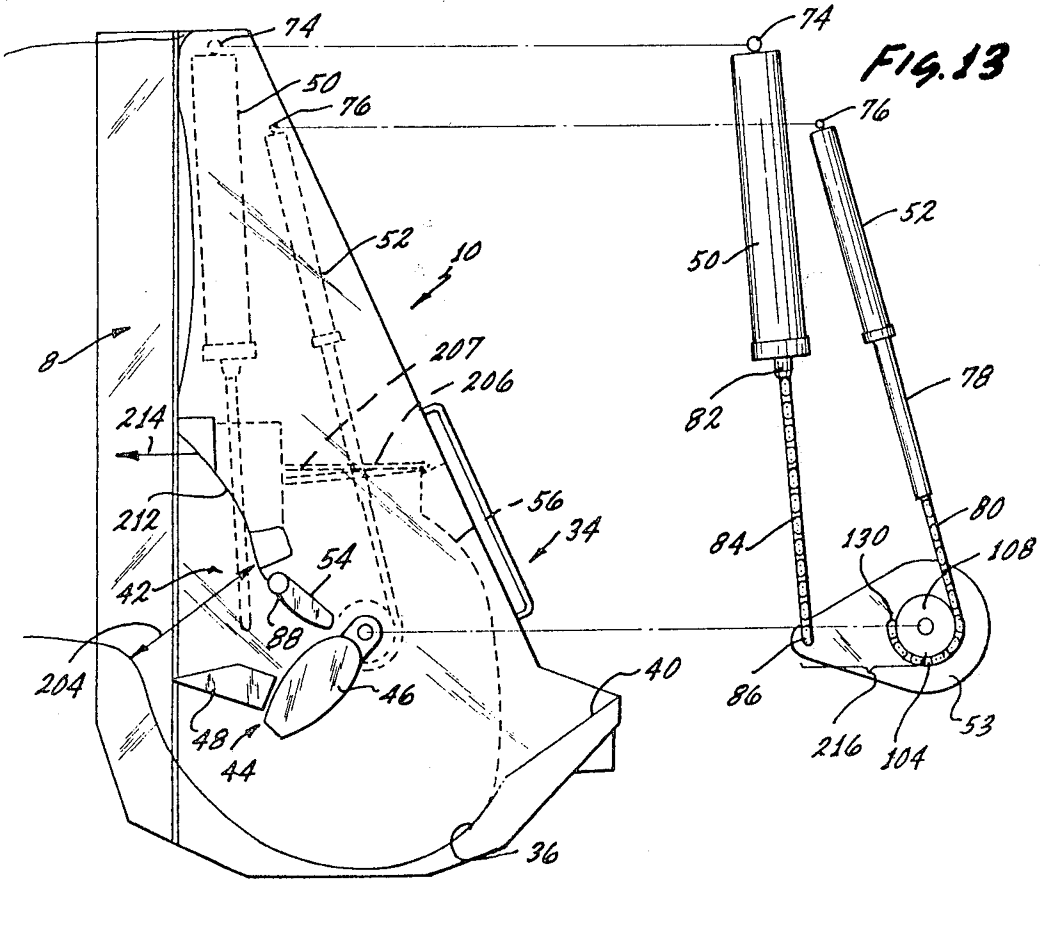
FIG. 13 is a side elevational view, similar to FIGS. 10–12, illustrating the position of the packing panel after movement of the packing panel in a working direction through the loading hopper to force refuse through a passage having a narrowed throat and then into the refuse storing container with very high pressures being exerted on the refuse as it passes through the throat.

FIG. 13, which is similar to FIGS. 10 through 12, illustrates the position of the packing panel 44 after completion of its movement in a working direction through hopper 34. During movement of the packing panel 44 from its position in FIG. 12 to that shown in FIG. 13, the connection point 86 between the drive chain 84 and drive plate 53 is moved further and further away from the axis of the shaft 104. This progressively increases the torque applied to the packing panel 44 through contraction of the relatively large hydraulic drive cylinder 50. This progressive increase in torque provides a progressively increasing force to refuse within the loading hopper 34 as the refuse is forced into the passage 42 and through the narrowed throat 204 to exert very high localized pressures on the refuse. Also, during this movement of the packing panel 44, the drive chain 80 is wound about the outer surface of torque tube 108 as the return cylinder 52 continues its expansion.

As indicated, the inner surface of passage 42 includes a curved surface portion 212, whose curvature is directed toward the interior of the storage body 8, to exert a horizontal flow direction to refuse, indicated as 214, which is directed into the storage body. Thus, after subjecting the refuse to very high localized pressures within the narrowed throat 204, the refuse is discharged from passage 42 into storage body 8 with the movement of the refuse directed toward the ejection panel 12 as described in FIGS. 1 and 2. The force exerted on the ejection panel 12 by refuse in the passage 42, even though much less than the pressures exerted on refuse at the narrowed throat 204, may be used in providing movement of the ejection panel away from the passage 42 as the storage body 8 becomes progressively filled with refuse. This permits uniform filling of the storage body 8 with refuse which has previously been uniformly compacted at relatively high pressures within the narrowed throat 204 with the refuse being stored at the lower pressures determined by the pressure of refuse against the ejection panel 12. The increased moment arm produced by the connection of the drive chain to the connection point 86 on the drive plate 53 is indicated as 216 at the right of FIG. 13.

The various members effectively operate in a servo relationship to provide an optimum compaction of the refuse in the hopper 34, and particularly in the passage or opening 42. This will be seen from the discussion immediately below.

As will be appreciated, the main panel 46 and the foldable panel 48 compact the refuse during their movement forwardly from their respective positions shown in FIG. 13. As the refuse becomes compacted, it is directed upwardly and forwardly into the narrowed throat 204 of the passage or opening 42.

The distance of movement of the refuse in the narrowed throat 204 is relatively long. Furthermore, the narrowed throat 204 has a progressive constriction with progressive distances along the passage or opening 42. This causes the refuse to become compacted as it is directed through the passage or opening 42. It also causes the refuse to become fragmented during the movement of the refuse through the passage, partly because of the venturi effect on the refuse in the passage 42 and partly because of the interaction between the different pieces of refuse with the progressive constriction in the passage.

Since the passage 42 is fairly long, the refuse does not move completely through the passage in a single cycle of movement of the main panel 46 and the foldable panel 48. Thus, the refuse introduced into the passage 42 in previous cycles of operation of the panels 46 and 48 is stuffed further into the passage by refuse introduced into the passage in subsequent cycles of operations of the panels. As the refuse is stuffed deeper into the passage in the subsequent cycles, it produces some churning of the refuse introduced into the passage in the previous cycles and also produces compaction and fragmentation of such refuse as a result of such stuffing and churning.

As previously described, the pressure against the refuse in the most constricted area of the passage or opening 42 is quite large. This pressure is then relieved to a large extent in the enlarged opening 202 because the enlarged opening 202 flares outwardly with progressive positions toward the storage body 8. Thus, the pressure of the refuse is relatively low as it enters the storage body 8.

The servo effect results in part from the control exerted on the positioning of the ejection panel 12 to maintain the pressure of the refuse in the passage 42 within precisely controlled limits. Thus, when the pressure of the refuse in the passage 42 exceeds a first particular limit, the ejection panel is moved through an incremental distance in a direction away from the passage 42 to reduce the pressure of the refuse against the ejection panel. This incremental movement continues until the pressure of the refuse against the ejection panel decreases to a second particular value less than the first particular value. As will be described subsequently in detail, the response to pressures of the refuse in the passage above the first particular value occurs instantaneously. Furthermore, the incremental movement of the ejection panel is provided instantaneously through booster arrangements. In this way, the ejection panel 12 is moved incrementally through small distances before the movements are interrupted by pressures below the second particular value of the refuse against the ejection panel.

A precise control over the pressure of the refuse in the passage 42 is important in insuring that an optimum action of fragmenting and compacting the refuse occurs in the passage 42. This results from the fact that the pressure of the refuse in the storage body 8 corresponds to the reduced pressure of the refuse in the enlarged opening 202 of the passage 42.

For example, if the pressure of the refuse in the passage 42 should increase above the first particular value, the pressure of the refuse in the narrowed throat 204 tends to increase. This inhibits the ability of the refuse in the narrowed throat 204 of the passage 42 to become stuffed into the passage by the direction of refuse into the passage in subsequent cycles and to become churned and compacted as it is stuffed into the passage. In effect, the refuse in the narrowed throat 204 of the passage 42 becomes constipated because of the excessive pressure of the refuse in the passage 42. Such constipation tends to block further flow of refuse through the passage 42.

Similarly, if the ejection panel 12 becomes moved incrementally when the pressure of the refuse in the passage 42 is below the second particular value, an efficient action of compacting and fragmenting the refuse in the narrowed throat 204 of the passage 42 cannot be obtained. This results from the fact that there is not a sufficient pressure of the refuse in the narrowed throat 204 of the passage 42 to cause the refuse in the narrowed throat to become stuffed and accordingly to become fragmented and compacted. In effect, because of the insufficient pressure of the refuse in the passage 42, the refuse is moved loosely, or at least too easily, through the passage 42 without being subjected to the forces which normally cause such refuse to be fragmented and compacted.

FIG. 14 is a rear view of the truck with the tailgate 10 in a closed position as indicated by the arrows 14—14 in FIG. 1. The hopper opening is indicated by the distance of the bracket indicated as 218 with a portion of the figure being broken away at the left to illustrate the support structure 220 for the shaft 104. As indicated, the drive mechanism, including the relatively large drive cylinder 50 may be positioned at the left side of tailgate 10 with the packing panel 44 being driven from only one side to provide a lighter and less complex drive mechanism. By providing the drive mechanism on only one side of the tailgate 10, there may be a weight imbalance, since the side of the tailgate 10 which houses the drive mechanism may be heavier than the other side. Also, reaction forces which are transmitted from the drive members into the support structure of the tailgate 10 will be greater on the side of the tailgate which supports the drive mechanism. For these reasons, the construction of the tailgate 10 may be strengthened, as will be indicated, to absorb the greater weight and the greater reaction forces which may be imposed on the side which houses the drive mechanism.

The tailgate 10 may include an upper beam 222, an enlarged side beam 224 and a smaller side beam 226. Turning to FIG. 14*a,* which is a sectional view taken along lines 14*a*—14*a* of FIG. 14, the movement of the foldable panel 48 is illustrated in various states within the hopper 34. In moving from its rest position to its position at the pinch point 210, the lower end of the foldable panel 48 may move along a curved path indicated by the arrow A with the guide members 150 contacting the guide rails 56. During this movement, contact of the friction pads 49 on foldable panel 48 with the sidewalls of the hopper causes rotational movement of the foldable panel about the pin 146 in the direction indicated by the arrow B. In moving in the direction of arrow B, the panel 48, thus, moves from a folded position relative to the main panel 46 to an extended condition relative to the main panel. During the movement of the foldable panel 48 in a reverse direction within the hopper 34 with the panel undergoing movement in a return direction, the frictional contact between friction pads 49 and the sidewalls of the hopper 34 produces rotational movement of the panel with respect to pin 146 which is opposite to that indicated by the arrow B. Thus, during return movement of the foldable panel 48, the panel is moved from its extended condition to its collapsed or folded condition.

As described, when the panel 48 is moved downwardly to a point adjacent the pinch point 210, there is a distance between the lower edge of the panel 48 and the inner curved surface 36 which may be in the order of 1 to 2 inches. This distance provides a margin of safety for the worker who may inadvertently place his fingers within the pinch point 210. Also, this distance reduces impact forces which may be transmitted from the panel 48 to the structure of the tailgate 10 at the pinch point 210.

In its position indicated as 48′, the foldable panel is positioned adjacent to the pinch point 210 and this may be the closest point of approach of the panel to the curved inner surface 36 of hopper 34. After passing beyond the pinch point 210, the panel 48 has a path of movement indicated by the line 228. As illustrated, the line 228 is positioned further away from inner surface 36 than the distance between the foldable panel 48 and the curved inner surface at the pinch point 210. This increased distance, as indicated by the bracket 230, may be in the order of two and a half to four inches, which represents a distinct difference between the present apparatus as compared with compaction apparatus of the prior art. In previous refuse compaction apparatus, it has been customary for the packing panel to pass in very close proximity to the wall of the loading hopper during packing of refuse within the loading hopper. By having the packing panel move in very close proximity to the curved surface of the hopper, as has been done previously, the power requirements for driving the packing panel through the loading hopper may be greatly increased. With the panel positioned very close to the wall of the hopper, there is no provision for slippage through which refuse may be permitted to slip by the panel during its movement through the hopper.

However, with the path of movement of panel 48 as indicated by line 228 in FIG. 14*a,* there is provision for slippage such that refuse may be permitted to remain in the hopper 34 by slipping by the foldable panel 48 as it is moved through the hopper 34. By providing this degree of slippage, the power requirements for movement of the panel 48 through hopper 34 may be reduced.

Additionally, the spacing 230 between the path of movement 228 and the curved inner surface 36 provides a further advantage which has been lacking in refuse compaction apparatus of the prior art. For example, in loading refuse into a hopper, such as hopper 34, the refuse may frequently be of a bulky nature such as, for example, a large cardboard box. Due to the size of the object being placed within the hopper, only a small portion of the object may be capable of insertion into the hopper with the balance of the article extending out of the opening of the hopper and over the sill 40. In previous refuse compaction apparatus, the downward movement of the packing panel blade into close proximity to the surface of the loading hopper would provide a shearing force which would sever a large bulky article so that the severed portion would be packed within the hopper as the balance of the bulky article fell to the ground by reason of the weight of the article extending over the loading sill. This would make it necessary to again lift the article and to feed the remainder of the article sequentially into the hopper as each working movement of the packing panel would, in effect, take another bit out of the article.

By providing a distance between the edge of the packing panel, such as the distance 230 between the folding panel 48 and the curved inner surface 36, the panel may not completely shear bulky articles inserted into the hopper. Thus, the article, if it were a cardboard box, would merely be gripped between the lower edge of the panel 48 and the inner curved surface 36. As the panel 48 continues its movement through the hopper 34, the bulky article may then be dragged into the hopper by the gripping force applied to the article by the movable panel. Following movement of the panel 48 through the hopper, the movement of the panel in its collapsed position during return movement through the hopper may permit the panel to pass over the refuse which has been dragged into the hopper. In this manner, instead of the panel 48 taking bites out of bulky articles as they are inserted into the hopper 34, the panel may not only pack the bulky article within the hopper in a series of packing motions, but may also lighten the job of the worker by pulling the bulky article into the hopper with each succeeding movement of the foldable panel in a working direction. The movement of the panel 48 through various positions within the hopper 34, as shown in phantom line drawing, is indicated as 48″.

To provide support for the retainer panel cylinder 55 (see FIG. 9) a support plate 232 may be provided on the interior of the tailgate 10 with an aperture 234 to pivotally support the retainer panel cylinder. Also, a pivot support 236 may be provided for rotatably supporting the retainer panel 54 at a point adjacent to passage 42. Additionally, a support member 238 may be provided for supporting the shaft 106 (see FIG. 4) and a pivot support 240 may be provided for the pivot 74 (see FIG. 3) for support of the cylinder 50.

As discussed in regard to FIG. 14, the structure of the tailgate 10 may be designed to compensate for the additional weight and reaction forces which are borne by the tailgate as a result of housing the drive mechanism for the packing panels at only one side of the tailgate. FIG. 14*b* is a sectional view taken along the line indicated by the arrows 14*b*—14*b* of FIG. 14. As indicated, irregularly shaped stiffening plates 242 may be positioned at either side of the side beam 224 to engage the beams 244 and 246 which may converge at the pivot support 240. This provides a strong base of support to absorb large reaction forces which may be transmitted to the pivot support 240 by the relatively large hydraulic drive cylinder 50.

Returning to FIG. 14, an enlarged side elevational view of the upper beam 222 is shown in FIG. 14*c*. As illustrated in FIG. 14*c*, the upper beam 222 may include an outer surface member 248 having a stiffener assembly 250 integrally formed within the upper beam at a position adjacent its left side as indicated by the location of the arrows 14*d*—14*d* in FIG. 14. The function of the stiffener assembly may be to effectively isolate the high forces generated in the lefthand portion of beam 222 such that these forces are not allowed to twist or bend the upper beam. As indicated, the stiffener assembly 250 may include a transverse stiffener plate 252 positioned at one end and a transverse stiffener plate 254 positioned at the other end of the assembly.

Turning to FIG. 14*d*, which is a sectional view taken along the line 14*d*—14*d* of FIG. 14*c*, the transverse stiffener plates 252 and 254 may each have an irregular configuration with enlarged enas joined to the outer surface member 248 and to an outer surface member 256 which is joined to outer surface member 248. Additionally, longitudinal stiffeners 258 and 256, which may each have a curved configuration corresponding to the shape of the plates 252 and 254, may join the stiffener plates together. The closed configuration of the stiffener assembly 250 which may be provided by the interconnection of the transverse plates 252 and 254 with the longitudinal stiffener plates 258 and 260 may provide a very stiff and strong structure having a high resistance to twisting and bending. In this manner, large forces which may be generated in the left portion of the upper beam 222 (see FIG. 14) due to mounting of the drive mechanism on the left side of the tailgate 10 are successfully resisted by the upper beam 222.

FIG. 15 is a sectional view through the storage body 8 taken along line 15—15 of FIG. 1. As indicated, the storage body 8 may be supported by upper longitudinal stiffeners 262 and 264 and lower longitudinal stiffeners 266 and 268. The slide rails 20 may be formed integrally with the lower stiffeners 266 and 268 to extend inwardly into the storage body 8. As described previously in regard to FIGS. 1 and 2, the ejection panel 12 may slidingly engage the rails 20 with the slide rails engaging grooves formed in the lower portion of the frame for the ejection panel.

As discussed, the present apparatus may be lighter than previous refuse compaction apparatus. To provide a strong and yet light construction for the storage body 8, the sidewalls of the storage body may be formed of flexible metal sheets, indicated as 270, 272, 274 and 276. The flexible sheets 270, 272, 274 and 276 may be bowed outwardly from their points of connection to the longitudinal stiffeners 262, 264, 266 and 268. This insures that the flexible metal sheets 270, 272, 274 and 276 may be placed in tension by pressures generated within the storage body 8. Since the metal sheets may have a high tensile strength as compared to their strength in compression, this may permit the relatively thin and lightweight sheets 270, 272, 274 and 276 to be used in forming the storage body 8. The storage body 8 may, thus, be made lighter. Also, as discussed previously, by subjecting the refuse to high pressures within the narrowed throat 204 of passage 42 prior to introduction of the refuse into the storage body 8, the storage body may be designated to function at lower pressures. This also may reduce the need for relatively heavy structural members in the construction of the storage body 8.

As indicated in FIG. 15, a conduit passage 278 may be formed on the surface of the upper sheet member 274 and a corresponding conduit passage 280 may be formed on the surface of the lower sheet member 276. The conduit passages 278 and 280 may be used for running hydraulic or electrical lines between the front and rear portions of the storage body 8.

FIG. 16 is a front view of the tailgate 10 in its lowered position as indicated by line 16—16 of FIG. 1. As indicated, seal members 281 and 282 may be positioned on the side beams 224 and 226 for contact with the rear of the storage body 8 with the tailgate 10 in its lowered position. A transverse brace 283 may provide support for the upper wall of the passage 42 and a lower frame member 284 may be positioned between the side beams 224 and 226.

A flat surface 286 may be formed below the portion of the passage 42 with the flat surface positioned in close proximity to a corresponding flat surface on the storage body 8 with the tailgate in its lowered position as illustrated in FIGS. 1 and 3. A seal 285 may be positioned about a portion of the flat surface 286, which seal may engage the storage body 8 with the tailgate 10 in its lowered position to form a fluid-tight barrier. As refuse is compacted within the loading hopper, fluid may be expressed from the refuse with the fluid collecting in the region bounded by the seal 285. The seal 285, thus, functions to prevent a leakage of fluid from the joint between the lowered tailgate 10 and the storage body 8.

FIG. 16*a* is a sectional view taken along the line 16*a*—16*a* of FIG. 16 to illustrate the configuration of the seal member 285. As indicated, the seal member 285 may include a base portion 287 that may be positioned against the side beams 224 and 226 and the lower frame member 284 with a curved upstanding portion 288 positioned at a generally right angle with respect to the base portion 287. The curved upstanding portion 288 may include a hollow region 289 that permits deformation of the curved upstanding portion during usage in forming a liquid-tight barrier between the storage body 8 and the tailgate 10.

In supporting the seal 285, a support member 290 may extend outwardly in a generally perpendicular direction with respect to the surface of the side beams 224 and 226 and the lower frame member 284 and a support clamp member 291 may extend in an angular relation to the seal to engage the upper surface of base portion 287. For ease in replacement of seal member 285, the support clamp 291 may be somewhat flexible such that the clamp member can be pulled outwardly away from contact with the base member 287. This permits the removal of the seal member 285 with the clamp member 291 being pulled outwardly as a new seal member is inserted. Following this, the clamp member 291 may be released to clamp the replacement seal member 285 firmly in place.

FIG. 17 is a front elevational view of the forward support frame 22 as viewed from inside the storage body 8. As indicated, the forward frame 22 may include a top frame member 292 having a curved lower surface 294 for engagement with the curved sheet member 274 (see FIG. 15). Additionally, side frame members 296 and 298 may be joined to the top frame member 292 and a cross channel 300 may interconnect the side frame members. This provides the forward frame 22 with a structure which is both rigid and strong. A pair of generally triangular shaped plates 302 and 304 may be positioned against the channel 300 and generally triangular shaped support channels 306 and 308 may be positioned beneath the cross channel 300 to provide a support between the structure of the refuse storage body 8 and the truck frame 6.

A plate 310 may extend between the inner ends of the channels 306 and 308 with plates 312 and 314 being affixed to the inner ends of the channels 306 and 308 and also with the cross channel 300. Downwardly extending connecting members 316 and 318 may be affixed respectively to the plates 312 and 314 with are connecting members being joined at their lower ends to the truck frame 6. A hydraulic fluid reservoir 320 may be positioned on the upper surface of the cross channel 300 and a pivot support 322 for the ejection panel 12 (see FIG. 1) may be formed between the legs of the cross channel 300.

FIG. **17*a* is a side sectional view taken along the lines 17*a*—17*a* of FIG. 17. As indicated in FIG. 17*a*, the connecting members 316 and 318 may each be joined to the respective plates 312 and 314 with the connecting members extending through openings in the lower surface of the support channels 306 and 308. Connecting member 316, for example, extends through opening 323 in the channel 306 to engage plate 312. Additionally, the connecting members 316 and 318 may each include a plurality of apertures 324 within which bolts may be placed in securing the connecting members to the vehicle frame 6**.

FIG. 18 is an elevational view of the storage body 8 as seen from the rear of the truck 2 with the tailgate removed (see FIG. 1). As indicated, the rear frame 24 of the storage body 8 may include rigid side members 326 and 328 joined at their upper ends by a top member 330. The lower portions of side members 326 and 328 may be connected by a cross beam 332 with the cross beam being joined to the truck frame 6 through angle braces 334 and 336. One leg of each of the angle braces 334 and 336 may be positioned in contact with the upper surface of the longitudinal members of the truck frame 6 with the angle braces being secured to the frame through any convenient means such as connecting bolts or welding. Additionally, the angle braces 334 and 336 may include upstanding legs which may bear against the cross beam 332 and may be secured thereto, by example, by welding.

A rear plate 338 may be joined to cross beam 332 with the rear plate forming a flat downwardly extending surface at the rear of storage body 8 which surface may be positioned in close proximity to the flat surface 286 of tailgate 10 (see FIG. 16) when the tailgate is in its lowered position at the rear of the storage body. The upper edge of the rear plate 338 may be curved to correspond with the curvature of the flexible metal sheet 276 of the storage body 8. Similarly, the side members 326 and 328 ma be suitably curved to support the flexible metal sheets 270 and 272 forming the sides of the storage body 8 while the top member 330 may also be curved to support the flexible sheet 274.

Plate support members 340 and 342 may be joined to the cross beam 332 with the plate support members extending downwardly from the cross beam to provide support for the downwardly extending rear plate 338. A cross brace 344 may be joined to the plate support members 340 and 342 with the cross brace being secured to the lower extremity of the flat plate 338. Plate support members 340 and 342, together with the cross brace 344 may, thus, form a rigid frame for support of the downwardly extending rear plate 338 which may bear against the tailgate 10 in its lowered position.

A pivot member 346 may be formed at the upper extremity of side member 328 with the pivot member rotatably supporting one side of the tailgate 10 with respect to the storage body 8 (see FIG. 1). The other side of the tailgate 10 may be supported by the pivot 28 which may be supported by a channel brace 348 connected to the top member 330. As described previously in FIG. 14, hydraulic cylinders within the tailgate 10 may be mounted at one side thereof such that the packing panel 44 may be driven from only one side, as described in FIGS. 4 and 5. This positioning of the hydraulic cylinders may produce a weight imbalance within the tailgate 10 such that one side of the tailgate is heavier than the other side. The heavier side of the tailgate 10, which contains the hydraulic cylinders, may be pivotally connected to the pivot 28 with the channel brace 348 providing additional strength in rotatably supporting the heavier side of the tailgate. In addition, a support channel 350 may be joined to the top member 330 to further strengthen the top member at the region adjacent to the pivot 28 in rotatably supporting the heavier side of the tailgate 10.

As indicated, support beams 352 may be positioned along either side of the storage body 8 at the lower extremities thereof to provide strengthening of the storage body at these regions. Also, curved plates 354 may be joined to the support beams 352 with the curved plates being connected to the upper ends of support members 340 and 342. The curved configuration of plates 354, as illustrated, may merge smoothly into the curvature of the flexible metal sheet 276. The connection of the plates 354 to the flexible metal sheet 276 may, therefore, serve to fix the curvature of the metal sheet at its extremities, while also providing strengthening of the lower portions of the storage body 8.

FIG. **18*a* is an elevational view taken along the line 18*a*–18*a* of FIG. 18, which illustrates the configuration of side member 328. The pivot 346 formed at the upper extremity of side member 328 may extend rearwardly from the storage body 8 with the pivot 30 for the tailgate lifting cylinder 26 (see FIG. 1) likewise extending rearwardly and being positioned below the pivot 346. The plate support member 342 may include a rearwardly inclined surface 355. Additionally, the other plate support member 340 (see FIG. 18) may also include an inclined surface similar to surface 355. The effect of inclined surface 355 is to reduce the weight of the support member 342 while still providing support for the rear plate 338**.

FIG. 19 is a fragmentary side elevational view taken from the right side of the tailgate 10 shown in FIG. 14 to illustrate the operation of the control mechanism. A control member 356 which may be grasped by the operator may include an outer tube 358 which is secured to a plate 360. The plate 360 may be connected to a rotatable rod 362 through a pin 364. With the control member 356 positioned as shown in FIG. 19, the control member is in its neutral position and there is no movement of the packing panel 44. With the packing panel 44 in its rest position as shown in FIG. 10, movement of the control member 356 in the direction of the arrow B initiates the movement of the packing panel in a working direction and movement of the retainer panel 54 from a closed to an opened position. Conversely, with the packing panel 44 and retainer panel 54 positioned as shown in FIG. 13, movement of the control member 356 in the direction of the arrow C initiates movement of the retainer panel 54 from an opened to a closed position and movement of the packing panel 44 in a return direction from its position in FIG. 13 to that in FIG. 10.

A rod 366 may be positioned within the tube 358 with the rod extending through an aperture in the closed bottom 370 of the tube. A spring 372 may be positioned about the rod 366 at its lower end with one end of the spring engaging the bottom 370 and the other end of the spring engaging a spring stop 374 positioned about the rod. A handle 376 may be positioned about the outer tube 358 at its lower end with the handle including a cross member 378 which engages the lower end of the rod 366. With the rod 366 connected to a connector 380, as will be described, the connector 380 may, in turn, be joined to a rod 382, then to a connector 384 and to a rod 386. The rod 386 may be positioned adjacent to a tailgate sidewall 387 and extend through a transverse wall 388 extending from the tailgate sidewall and through a passage 390. The passage 390 may extend into a housing 392 with a tab 393 being formed at the lower end of the rod 386.

A rotatable stop mechanism generally indicated as 394 may be rotatably positioned within the housing 392 with the rotational position of the stop mechanism being coordinated with the rotational movement of the packing panel 44 as illustrated in FIGS. 10-13.

The stop mechanism 394 may include a first plate 396 in abutting relation to a second plate 398. To adjust the angular relationship between the first plate 396 and second plate 398, slots 400 may be formed in the second plate with bolts 402 extending through the slots and threadably engaging apertures in the first plate. Thus, when the bolts 402 are tightened, the rotational position of the second plate 398 may be fixed with respect to the rotational position of the first plate 396. A bolt 404 may extend through both the first plate 396 and second plate 398 to engage the shaft 106 which supports the undriven end of the packing panel 44 (see FIG. 4).

On movement of the control member 356 in the direction of the arrow B, the shaft 106 rotates in the direction of the arrow denoted D as the packing panel 44 moves in a working direction through the hopper 34 as illustrated in FIGS. 10-13. However, on movement of the control member 356 in the direction of the arrow C, the shaft 106 rotates in the direction of the arrow E as the packing panel 44 moves in a return direction to its rest position shown in FIG. 10.

On rotation of the shaft 106 in the direction of arrow D, with the control member 356 moved in the direction of arrow B, a stop member 406 may be rotated into engagement with the tab 393. The stop member 406 may include a stop surface 408 which engages the tab 393 to exert a force through the connecting members 386, 384, 382 and 380 that may exert a rotational force on plate 360 to return the control member 356 to its neutral position. When the stop surface 408 encounters tab 393, the packing panel 44 may be generally positioned adjacent to the pinch point 210 as illustrated in FIG. 12. Thus, through contact of the stop surface 408 with tab 393, the packing panel 44 may not proceed beyond this point in a working direction unless some action is taken by the operator to move the tab 393 so that the tab does not contact the stop surface 408. This may provide an additional factor of safety by insuring that the operator consciously move the tab 393 out of contact with the stop surface 408 to have a continuation of the movement of the packing panel 44 through the hopper 34.

To move the tab 393 out of contact with the stop surface 408, the operator may pull downwardly on the handle 376 which may cause movement of the rod 366 in a downward direction relative to the tube 358 against the force of the biasing spring 372. This, in turn, may provide a rotational movement of the rod 382, as will be described, in the direction of the arrow F to rotate the tab 393 out of contact with the stop surface 408. As the operator pushes the control member 356 in the direction of arrow B to initiate movement of the packing panel 44 in a working direction, the operator may then keep his hand on the handle 376 until the packing panel approaches the pinch point 210 as shown in FIG. 12. At this point, the operator may then pull downwardly upon the handle 376 such that the packing panel 44 moves past the pinch point 210 in a continuous movement in a working direction through the hopper 34.

During movement of the packing panel 44 in a return direction from its position shown in FIG. 13, it is desirable that the movement of the packing panel not be stopped when the packing panel reaches the general location of the pinch point 210. Thus, a slide surface 410 may be formed on the stop member 406 with the slide surface being shaped and positioned to slide over the tab 393 during movement of the packing panel in a return direction and to not interrupt the movement of the packing panel at the pinch point 210.

With the packing panel 44 moving in a working direction and the shaft 106 rotating in the direction of the arrow D, when the stop 406 has rotated beyond the tab 393 as described, the rotation of the shaft may continue until stop member 412 on the first plate 396 encounters the tab 393. At this point, the plate 360 and control member 356 may be rotated in a direction counter to that shown by arrow B to return the plate and control member to the neutral position indicated in FIG. 19. At this point, the movement of the packing panel 44 may cease. With the packing panel 44 occupying the position shown in FIG. 13, the member 356 and plate 360 may then be moved in the direction indicated by arrow C. This may cause rotation of the shaft 106 in the direction indicated by arrow E in which the slide surface 410 of stop member 406 rides over the tab 393. Rotational movement of the shaft 106 may, thus, continue in the direction of the arrow E until a stop member 414 on first plate 396 contacts the tab member 393. At this point, the plate 360 and the control member 356 may be rotated in a direction counter to that indicated by the arrow C to return the plate and operating member to their neutral positions shown in FIG. 19. At this point, the movement of the packing panel 44 may cease and the packing panel may be positioned at its rest position shown in FIG. 10.

As described, the angular position of the second plate 398 with respect to first plate 396 may be varied by loosening bolts 402 and 404, rotating the second plate with respect to the first plate, and re-tightening the bolts. The position of the stop member 406 may, thus, be varied with respect to the positions of the stop members 412 and 414. This, in turn, may vary the point at which the stop surface 408 encounters the tab 393 such that the packing panel 44 may be stopped at the pinch point 210 as shown in FIG. 12 or at a point in advance of the pinch point, as desired.

FIG. 19*a* is a detailed view taken along the line 19*a*—19*a* of FIG. 19 to illustrate the construction of the stop member 406 and its function of sliding over the tab 393, during rotational movement of the stop member in the direction of the arrow E. As indicated, the stop member 406 may include a transverse portion 416 from which may depend the stop surface 408. The slide surface 410, which lies behind the stop surface 408 in FIG. 19*a* may be inclined upwardly from the stop surface toward a surface 409 whose length is less than that of surface 408 as indicated by the brackets identifying the surfaces and their length. In usage, the tab 393 does not contact the surface 409 due to its decreased length as the stop member 406 moves in the direction of the arrow E. Rather, the tab 393 then encounters the inclined slide surface 410 with the surface 410 then riding over the tab 393 due to the resiliency of the transverse portion 416. However, when the stop member 406 encounters the tab 393 during movement of the packing panel 44 in a working direction with rotation of the shaft 106 in the direction of the arrow D, the longer stop surface 408 may directly contact the tab 393. As described, this may move the control member 356 to its neutral position unless the operator has rotated the tab 393 out of contact with the stop member 406 by pulling downwardly on handle 376.

FIG. 20 is a view taken along the line 20—20 of FIG. 19 which further illustrates the functioning of the control mechanism. As indicated, the rod 382 may connect at its upper end through a universal joint 418 to the plate 360. Additionally, the rod 382 may be fixedly connected to an L-shaped bracket 420 which may, in turn, be connected through a universal joint 422 to the rod 366. Thus, when the rod 366 is pulled downwardly by handle 376, as discussed in regard to FIG. 19, the downward movement of the rod 366 may have no effect upon the position of the tube 358 which is fixedly connected to plate 360. The downward movement of the rod 366 does, however, exert a downward force upon the L-shaped bracket 420 whose position is angled outwardly away from the plane of the paper as it is shown in FIG. 20. The downward force exerted upon L-shaped bracket 420, thus, may exert a turning moment on the rod 382 which may rotate the rod in the direction indicated by arrow F to move the tab 393 out of engagement with the stop member 406. Due to the presence of the universal joints 418 and 422, the rotational movement of the L-shaped bracket 420 and the rod 382 does not disturb the position of the plate 360 and tube 358. Thus, the control handle 356 remains in its position even though the rod 382 is rotated. The universal joint 418, while permitting rotational movement of the rod 380 with respect to plate 360 does not, however, permit translational movement of the rod 382 with respect to the plate 360. Thus, when the tab 393 is engaged by any of the stops 412, 414, 416 to produce translational movement of the rod 382, this translational movement causes movement of the plate 360 and tube 358 as described previously.

As indicated, in the lower portion of FIG. 20, a support bearing 424 may be provided for the shaft 106 with the first and second plates 396 and 398 being secured to the shaft at a mounting location which is positioned outboard from the support bearing. Further, a closure plate 426 may be positioned over the housing 392 with the closure plate being secured to the housing in any conventional manner, such as the use of bolts 428.

FIG. 21 is a detailed view illustrating the movement of control rods 206 and 207 in transmitting movement from the rotatable rod 362 shown in FIG. 19 to valves for controlling the hydraulic mechanism. As indicated, the rotatable rod 362 may extend from the right rear side of the tailgate 10 where the control mechanism may be located to the left rear side of the tailgate where the drive mechanism may be located (see FIG. 14).

At the terminus of the rotatable rod 362 at the left rear side of the tailgate 10, the rod may be supported by a bearing plate 430 secured to a support plate 432. A partial closure 434 may extend about the rotatable rod 362 as it crosses the back of the tailgate 10 to protect the rod. An eccentric 436 may be secured to the rotatable rod 362 at a position which is inboard from the bearing plate 430. The control rods 206 and 207 may be connected to a pin 442 joined to the eccentric 436 such that rotational movement of the rod 362 in the direction indicated by arrow G may cause simultaneous movement of the control rods in the direction indicated by arrow H. The control rod 207 may be connected to a valve actuation member 444 while the control rod 206 is connected to a valve actuation member 446. As will be described, a detent mechanism 448 may be positioned adjacent to the valve actuation member 446 to hold the valve actuation member in a desired position after movement of the rod 206.

FIG. 21*a* is a sectional view taken along the lines 21*a*—21*a* of FIG. 21 to demonstrate the manner in which the rods 206 and 207 may be connected to the eccentric 436. The rod 206 may include a slot 450 formed at its outer end with the rod 207 including a slot 452 formed at its outer end. With rotation of the rod 362 in the direction of arrow G as shown in FIG. 21, the pin 442 may move to the right hand ends of the two slots 450 and 452. This contact may, then, move both the rods 206 and 207 in the direction of arrow H as shown in FIG. 20.

As will be described, rod 207 may be used to actuate the movement of the retainer panel 54 from a closed to an opened position (see FIGS. 10 and 11) or to actuate movement of the retainer panel from its opened to its closed position. As described previously with regard to FIGS. 10–13, movement of the retainer panel 54 may precede the movement of the packing panel 44. For example, the retainer panel 54 may move from a closed to an opened position before movement of the packing panel 44 in a working direction through the hopper 34 (see FIGS. 10 and 11). Similarly, the movement of the retainer panel 54 from an opened to a closed position may precede the movement of the packing panel 44 from its position shown in FIG. 13 in a return direction to its rest position shown in FIG. 10. To provide this result, a spring centered valve may be used for providing movement of the retainer panel 54 which valve may be actuated by movement of the rod 207. The spring centered valve may be biased to a neutral position in which no hydraulic fluid flows to the retainer panel cylinder 55 (see FIG. 9). On movement of the pin 442 to the right from its position shown in FIG. 21*a*, the rod 207 may be held in position by the operator with control member 356 held in the direction of arrow B until the retainer panel 54 (see FIGS. 10–13) has completed its movement from a closed to an opened position. At this point, the operator may then return the control member 356 to its neutral position shown in FIG. 19 which may cause the pin 442 to occupy the position shown in FIG. 21*b*.

The spring centered valve may then automatically return the rod 207 to its centered position shown in FIG. 21*b*. However, the rod 206 may remain held in the direction of the arrow H shown in FIG. 21 by the detent mechanism 448. The rod 206 may, thus, occupy the position shown in FIG. 21*b* with the pin 442 positioned closely adjacent to the left end of the slot 450. With reference to FIG. 19, the rod 206 may continue to occupy the position as shown in FIG. 21*b* until the tab 393 is contacted by the stop member 406 or 412 to move the pin 442 slightly to the left from its position shown in FIG. 21*b* and into contact with the left end of slot 450. At this point, the rod 206 may become disengaged from the detent mechanism 448 with a biasing spring of the valve returning the rod 206 to its neutral position. At this point, both the rods 206 and 207 may occupy the positions shown in FIG. 21*a* in which the pin 442 is centered within slots 450 and 452.

Again, referring to FIG. 19, when the control member 356 is moved in the direction of arrow C, the rod 362 shown in FIG. 21 may be rotated in a direction opposite to that indicated by arrow G. This may cause the pin 442 to move to the left from its position shown in FIG. 21*a* into contact with the left ends of the slots 450 and 452. As a result, the rods 206 and 207 may then be moved in a direction opposite to that indicated by arrow H in FIG. 21. The control member 356 shown in FIG. 19 may then be held in the direction of arrow C until the retainer panel 54 has completed its movement from an opened to a closed position (see FIG. 1) with the control member then being returned to its neutral position and with the rod 207 returning to its neutral position to occupy the position shown in FIG. 21*b*. However, the rod 206 may remain in a held position opposite to that indicated by the arrow H in FIG. 21 under the influence of the detent mechanism 448 with the right end of the slot 450 as shown in FIG. 21*b* being positioned closely adjacent to the pin 442. The rod 206 may remain held in this position by the detent mechanism 448 until the tab 393 (see FIG. 19) is contacted by the stop member 414 as the shaft 106 rotates in the direction of the arrow E. At this point, the pin 442 (see FIG. 21*b*) may be moved slightly to the right into contact with the right end of slot 450. This may disengage the detent mechanism 448 from the rod 206 such that the rod returns to its neutral position with rods 206 and 207 and pin 442 occupying the position shown in FIG. 21*a*.

FIG. 21*c* is a detailed side elevation view, partly in section, taken along line 21*c*—21*c* as shown in FIG. 21 to indicate the functioning of the detent mechanism 448 in holding the rod 206. As indicated, the detent mechanism 448 may include a base member 454 with a rotatable arm 456 mounted thereon through a pivot 458 and an arm support member 460 that supports the pivot for engagement with the rotatable arm. The arm 456 may be biased in any convenient manner, such as by a spring, for rotation in a clockwise direction from its position shown in FIG. 21*c* with a roller 462 at the outer end of the arm being forced into contact with the rod 206. Notches 464 may be formed in the rod 206 with the position of the notches corresponding to the position of the rod when it is moved in the direction of the arrow H shown in FIG. 21 to actuate the packing panel 44 in a working direction (see FIGS. 10–13), or when the rod 206 is moved in a direction opposite that of arrow H to actuate movement of the packing panel in a return direction.

As indicated, when the roller 462 engages one of the notches 464, the upward force of the roller against the notch may hold the rod 206 in a given position. A valve 466, which may be actuated by movement of the rod 206, may be a spring-centered valve. Thus, when either the right or left end of the slot 450 in rod 206 is contacted by the pin 442 (see FIG. 21*b*) the rod may undergo sufficient movement to disengage the roller 462 from one of the notches 464. At this point, the spring-centering action of valve 466 may return the rod 206 to its neutral position as indicated in FIG. 21*a* with the valve 446 then being in a neutral position such that the movement of the packing panel 44 ceases (see FIGS. 10–13).

FIG. 22 is a schematic representation of a hydraulic circuit which may be used in actuating the present apparatus. As indicated, hydraulic fluid from the reservoir 348 may be transported through a supply line 468 and a valve 470 to a pump 472. From the pump 472 the hydraulic fluid may be supplied under pressure through a line 474 which is joined to a branch line 476. Branch line 476 leads to a pilot-operated relief valve 478 that may be conveniently set at a pressure such as 2950 psi psi. When the pressure in the line 474 and the branch line 476 reaches the predetermined pressure, the pressure transmitted through a pressure line 479 may cause the valve 478 to open to permit fluid to pass through the valve to a return line 511 leading to the reservoir 348. In permitting fluid to pass through the valve 478 at a predetermined pressure of about 2950 psi, the relief valve 478 acts as a safety valve for the entire hydraulic system to insure that pressures within the system do not exceed the predetermined pressure level.

The line 474, after passing the branch line 476, leads to a branch line 480 and to a spring-centered valve 482. With the spring-centered valve 482 in its neutral position as shown in FIG. 22, hydraulic fluid in line 474 may flow through the valve. The valve 482 may include a control handle 484 through which the valve may be moved to a raised or a lowered position from its neutral position shown in FIG. 22. On movement of the handle 484 to move the valve upwardly from its position shown in FIG. 22, hydraulic fluid from line 474 may flow through a check valve 486 and through the valve 482 to a line 488. The line 488 may lead to a branch line 490 which leads to a pilot-operated relief valve 492. The relief valve 492 may be set to open at a predetermined pressure of about 3100 psi which may be transmitted through a pressure line 493 to open the relief valve such that hydraulic fluid from line 490 may flow to return line 511 and to the reservoir 348. The relief valve 492 which may be set at a pressure tless than the opening pressure for relief valve 478 may, thus, function to permit the release of hydraulic fluid from line 490 when the telescopic ejection cylinder 14 encounters an undesirable pressure buildup during, for example, movement of the ejection panel 12 from the front to the rear of the storage body 8 during the ejection of refuse from the storage body (see FIG. 1).

The line 488, after passing the branch line 490, may lead to two lines 494 and 496. Line 494 may lead to a solenoid valve 495 which, when actuated, as will be described, will permit hydraulic fluid to flow to a return line 497 and to the reservoir 348. The line 496 may lead to the large end of the telescope hydraulic cylinder 14 which may have, for example, a pressure area in the order of ten times the pressure area at the small end of the telescopic cylinder. A line 498 may lead from the small end of the telscopic cylinder 14 to a line 512 directed to the valve 482. With valve 482 in its raised position, hydraulic fluid may, thus, flow through the valve to lines 488 and 496 to expand the telescopic cylinder 14 while fluid from the small end of the telescopic cylinder may flow through lines 498 and 512 through the valve to a line 514 to return line 511 and to the pump 348. A strainer 515 may be positioned between the return line 511 and the reservoir 348 to remove particles from the hydraulic fluid to prevent clogging of the valves in the hydraulic system by the particles.

When the handle 484 is actuated to move the valve 482 in a downward direction from that shown in FIG. 22, pressurized hydraulic fluid may flow through the check valve 486 and the valve 482 into the lines 512 and 498. This may introduce pressurized hydraulic fluid into the small end of the telescopic cylinder 14 with fluid from the large end of the cylinder being returned through lines 496 and 498 to the valve 482. The returned fluid from the large end of telescopic cylinder 14 may then be conveyed through through the valve 482 to line 514 to the return line 511 and the sump 348. As this occurs, the telescopic cylinder may undergo contraction to move the ejection panel 12 from the rear to the front of the storage body 8 (see FIG. 1).

When valve 482 is in its neutral position as shown in FIG. 22 with the telescopic cylinder 14 being filled with hydraulic fluid, a problem may arise if there is, for example, an increase in the ambient temperature. Due to the substantial difference between the pressure area at the large end of the telescopic cylinder 14 as compared with the pressure area at the small end of the cylinder, a pressure increase at the large end due to thermal expansion of fluid at the large end may produce a tenfold pressure increase at the small end of the telescopic cylinder. To protect against undesirable pressure buildup at the small end of telescopic cylinder 14, the line 498 from the small end of the cylinder may lead to a branch line 500 leading to two lines 502 and 504. A check valve 506 may be positioned in line 502 to prevent the flow of hydraulic fluid from line 502 to a line 510 and to the return line 511.

However, line 504 may lead to a pilot-operated relief valve 508 which may be set to open at a pressure of about 3100 psi. When the pressure in line 504 reaches this pressure level, pressure may be transmitted to the valve 508 through a pressure line 509 to open the relief valve such that fluid may flow to line 510 to the return line 511 and to the reservoir 348.

After passing the valve 482, the line 474 may lead to a spring-centered valve 516 which may be used to actuate the tailgate lifting cylinder 26. With valve 516 in its neutral position as shown in FIG. 22, hydraulic fluid may flow directly through the valve. A handle 518 connected to the valve 516 may be used in moving the valve to a raised or a lowered position from that shown in FIG. 22. When valve 516 is moved to a lowered position, hydraulic fluid may flow from line 480 through a check valve 520 and through the valve 516 to a line 522. The line 522 may lead to a hydraulic choke 524 with hydraulic fluid expanding the cylinder 26 during movement of the tailgate 10 to its raised position shown in FIG. 1. When the cylinder 26 is expanded to a desired extent, the valve 516 may be moved to its neutral position shown in FIG. 22 to isolate the cylinder 26 and to insure that the cylinder remains in its expanded condition.

When it is then desired to lower the tailgate 10 (see FIG. 1), the valve 516 may be moved to its raised position from that shown in FIG. 22. At this point, the weight of the tailgate structure 10 may be exerted against the fluid within the cylinder 26 through a piston rod 525. The weight of the tailgate 10 may, thus, force a piston 527 downwardly within the cylinder 26 with fluid flowing from the cylinder through choke 524, line 522 and the valve 516. After flowing through valve 516, the fluid may be conveyed through a line 526 to the return line 511 and to the sump 348. The choke 524 may function to reduce the flow rate of hydraulic fluid through line 522 to a relatively low flow rate. This may insure that the tailgate descends slowly in moving from its raised position 10' to its lowered position 10 as shown in FIG. 1.

After passing beyond the valve 516, the line 474 may reach two branch lines 528 and 530. The branch line 530 may lead to a pilot-operated relief valve 532 having a pressure line 533 connected to the line 474. When the pressure within line 474 reaches a predetermined value of about 3100 psi, the pressure transmitted through line 533 may open the valve 532 to permit pressurized fluid to flow through the valve to a return line 546 which leads to line 511 and to the reservoir 348. The relief valve 532 may, thus, control the pressure of hydraulic fluid which is fed to the cylinder 55 for actuation of the retainer panel 54 and which is fed to the cylinders 52 and 50 for actuation of the packing panel 44 as illustrated in FIGS. 10–13.

As described in FIGS. 21, **21*a*, 21*b* and 21*c*, the control rods 206 and 207 may be moved together in unison. With the rods 206 and 207 moved together in unison in the direction of arrow H as shown in FIG. 21, a spring-centered valve 538 may be moved upwardly from its neutral position as shown in FIG. 22 and the spring-centered valve 466 may also be moved upwardly. Hydraulic fluid may then flow from the line 474 through a line 528 to a line 534 and through a check valve 536. After flowing through check valve 536, pressurized hydraulic fluid may then flow through the valve 538 and through a line 540 to the cylinder 55. This may cause the cylinder 55 to contract with fluid from the head end of the cylinder flowing through a line 542, through valve 538 and through a line 544 to the return line 546**.

Since the volume of the hydraulic cylinder 55 may be relatively small, the contraction of the cylinder may be relatively rapid to provide rapid movement of the retainer panel 54 from its closed position shown in FIG. 10 to its opened position shown in FIG. 11. At this point, the control handle 356, after first being moved in the direction of arrow B, may be moved in a direction opposite that of arrow B to its neutral position as shown in FIG. 19. This may permit the spring-centered valve 538 to return to its neutral position to cause the rod 207 to return to its neutral position shown in FIG. 21*b* with the pin 442 centered within the slot 452 in rod 207. The rod 206 may, however, remain in the direction of arrow H through the action of the detent mechanism 448 as described in FIGS. 21*b* and 21*c*. With the valve 538 returned to its neutral position, and the valve 466 in its raised position from that shown in FIG. 22, hydraulic fluid may flow from line 474 through the valve 538 and to a branch line 545, through a check valve 548 and the valve 466 and to a line 550. Line 550 may lead to a line 552 to the rod end of the relatively large drive cylinder 50 which may be used in moving the packing panel 44 in a working direction, as described in FIGS. 10–13.

On the introduction of pressurized hydraulic fluid into cylinder 50 through line 552, a piston 554 may be moved upwardly from its position shown in FIG. 22 to contract the cylinder in moving the packing panel 44 in a working direction as described in FIGS. 10–13. As described in regard to FIG. 3, the relatively large hydraulic drive cylinder 50 may be mechanically coupled with the relatively small hydraulic return cylinder 52. Thus, as the piston 554 of cylinder 50 is moved moved upwardly to contract the cylinder 50, a piston 555 of return cylinder 52 may be moved downwardly to expand the return cylinder. On downward movement of piston 555, hydraulic fluid within the rod end of cylinder 52 may be exhausted through a line 574 and through the valve 466 to a line 557 to line 546 and to line 511 and reservoir 348.

As hydraulic fluid is fed to the rod end of the drive cylinder 50, through line 552, a pilot-operated check valve 562 may prevent the flow of hydraulic fluid from the line 550 past the check valve. A line 560 connected to the head end of the drive cylinder 50 may lead to the head end of the return cylinder 52. Thus, as the piston 554 is moved upwardly with the piston 555 moving downwardly, hydraulic fluid which is exhausted from the head end of drive cylinder 50 may pass through the line 560 into the head end of the return cylinder 52. In this manner, the return cylinder 52 may act as an accumulator of the hydraulic fluid which is discharged from the head end of cylinder 50. Additionally, a line 561 may interconnect line 560 with the return line 511 to the reservoir 348. Hydraulic fluid which is discharged from the head end of the cylinder 50 may, thus, also flow from line 560 into line 561 and to the return line 511. However, to encourage flow of hydraulic fluid between the cylinders 50 and 52, the line 560 may be relatively large to offer less resistance to flow than the line 561.

As the piston 554 is moved upwardly within drive cylinder 50, a pressure port 559 in the wall of the cylinder 50 may be uncovered to receive pressure from fluid on the underside of piston 554. The port 559 may, for example, be uncovered when the packing panel 44 moves beyond the pinch point 210 during its movement in a working direction as illustrated in FIGS. 12 and 13. As the packing panel 44 passes beyond the pinch point 210, greater resistance may be encountered by the panel from refuse within the hopper 34 which may result in higher pressures at the rod end of the drive cylinder 50. As also discussed in regard to FIGS. 10–13, during movement of the packing panel 44 in a working direction through the hopper 34, refuse within the hopper is subjected to high pressures as the refuse passes through the narrowed throat 204 in passage 42 leading to the storage body 8. Thus, the pressure of refuse within the storage body 8 which is exerted against the ejection panel 12 may be of a relatively low magnitude even though high pressures are experienced by the refuse within the narrowed throat 204 and high pressure hydraulic fluid is supplied through line 552 to the rod end of the cylinder 50.

Since the pressure of refuse within the storage body 8 exerted against the ejection panel 12 may be relatively low, in comparison to previous refuse compacting apparatus, the pressure which is experienced at the large end of the telescopic cylinder 14 by refuse bearing against the ejection panel may also be relatively low. If the means for dumping hydraulic fluid from the large end of the cylinder 14 were a purely hydraulic mechanism, the speed of actuation of the mechanism might not be sufficiently rapid. To provide a more rapid and more controlled dumping of hydraulic fluid from the large end of the telescopic cylinder 14 when the ejection panel 12 moves in small incremental steps from its rearward position 12 to its forward position 12′ (see FIG. 1), an electrical system may be used to control the dumping of hydraulic fluid from the telescopic cylinder 14. The pressure port 559 in the drive cylinder 50, as described, may lead to a pressure sensing line 556 to a pressure actuated switch 558. The switch 558 is opened in its position shown in FIG. 22. However, when the pressure at the rod end of drive cylinder 50 reaches a predetermined level, such as 2400 psi, a switch member 563 may be moved downwardly by the pressure in line 556 into contact with a pole 565 to complete a circuit between an electrical power source 566 and the solenoid valve 495 through wires 568, 570 and 572.

With the switch 558 closed, the solenoid valve 495 may, therefore, be actuated to quickly dump fluid from the large end of telescopic cylinder 14 through line 494 to line 497 and to the reservoir 348. This permits movement of the ejection panel through a small incremental distance as described in regard to FIG. 1 to reduce the pressure of refuse against the packing panel 44 and, in turn, to reduce the hydraulic pressures at the rod end of the drive cylinder 50. When the pressure of hydraulic fluid at the rod end of the cylinder 50 then drops to a predetermined level such as 2150 psi, the switch 558 may return to an opened position as shown in FIG. 22 to return the solenoid valve 495 to its closed position. The packing of refuse may then continue until the pressure at the rod end of the cylinder 50 again reaches the predetermined level required to close switch 558 and the whole operation may be completed again, etc., to move the ejection panel 12 in small incremental steps from its rearward position 12 to its forward position 12′ (see FIG. 1) as the storage body 8 is progressively filled with refuse.

When the packing panel 44 has completed its movement in a working direction as shown in FIG. 13, the rod 206 may then be returned to a neutral position by contact of the pin 442 with the end of the slot 450 in the rod 206 as described in regard to FIGS. 21, 21*a*, 21*b* and 21*c*. This may, then, overcome the detent mechanism 448 such that the spring-centered valve 466 may be returned to its neutral position shown in FIG. 22.

With the packing panel positioned as shown in FIG. 13, the rods 206 and 207 may then be moved downwardly from their positions shown in FIG. 22 to actuate movement of the panel 44 in a return direction to its rest position shown in FIG. 10. The simultaneous movement of the rods 206 and 207 may move the valves 538 and 466 to their lowered positions from that shown in FIG. 22 with hydraulic fluid passing from line 534 through check valve 536 and valve 538 into line 542 to the head end of the retainer panel cylinder 55. This may cause the retainer panel cylinder 55 to expand with hydraulic fluid exhausted from the rod end of the retainer panel cylinder passing through line 540, valve 538 and into line 544 to the reservoir 348. With the volume of the retainer cylinder 55 being relatively small, the expansion of the retainer cylinder to return the retainer panel 54 to its closed position shown in FIG. 10 may occur relatively quickly.

The control member 356 (see FIG. 19) may then be returned to its neutral position by moving the control member in a direction opposite to that indicated by arrow C. This may permit the spring-centered valve 538 and the control rod 207 to return to their neutral positions as described in FIGS. 21, 21*a*, 21*b* and 21*c* with the rod 206 being retained in a direction opposite that of arrow H through the detent mechanism 448. Hydraulic fluid may then pass through valve 538 in its neutral position to line 545, through check valve 548, and valve 466 into line 574 to the rod end of the relatively small return cylinder 52. As described previously, cylinders 52 and 50 may be mechanically interconnected. Thus, as cylinder 52 is contracted, the relatively large drive cylinder 50 may be expanded. Hydraulic fluid which is exhausted from the rod end of the cylinder 50 during its expansion may be conducted through lines 552 and 550 to valve 466 and into line 557 to the reservoir 348. However, due to the relatively large volume of hydraulic fluid which may be contained at the rod end of cylinder 50, the resistance to fluid flow encountered by the fluid within lines 552, 550, etc., may oppose the expansion of hydraulic cylinder 50. This may increase the resistance to contraction of the return cylinder 52 which may increase the pressure of hydraulic fluid fed to the rod end of the return cylinder through line 574.

A pilot line 564 leading from line 574 to the pilot-operated check valve 562 may transmit pressure to the check valve which may be set to open at a relatively low pressure of about 500 psi. On opening of the check valve 562, fluid which is exhausted from the rod end of cylinder 50 may then flow from line 552 through the check valve 562 into the line 560 for return to the head end of cylinder 50. In this manner, the relatively large drive cylinder 50 may act as its own accumulator during expansion of the cylinder. Hydraulic fluid which is exhausted from the head end of the return cylinder 52 during its contraction may also flow through the line 560 into the head end of the drive cylinder 50 with the drive cylinder, therefore, also acting as an accumulator for the return cylinder 52. Additionally, hydraulic fluid may flow through line 561 into the return line 511 to the reservoir 348. However, as stated, the size of line 560 may be larger than that of line 561 to encourage the flow of hydraulic fluid between the cylinders 52 and 50 through the line 560.

FIG. 23 illustrates an alternative hydraulic circuit which may be used in controlling the present apparatus. While the hydraulic circuit of FIG. 23 is similar to that of FIG. 22, it also differs in a number of important respects. As indicated, a reservoir 576 may supply hydraulic fluid through a supply line 578 to a valve 580 and then to a pump 582. Leading from the pump 582 is a line 584 which is joined to an auxiliary line 586, may be used for operating conventional auxiliary equipment. The supply line 584 may then lead to a branch line 588 joined to a pressure-operated pilot valve 590. The valve 590 may be set to open at a given pressure level such as 2950 psi and a pressure line 591 may be used to transmit pressure from the line 588 to open the valve when the predetermined pressure level is reached. Valve 590 may, thereby, function as a safety valve for the entire hydraulic system with the pressure for opening the valve being the maximum system pressure.

After passing branch line 588, the line 584 may then lead to a spring-centered valve 592 which may be operated by movement of a handle 594. With the valve 592 in its neutral position, as shown in FIG. 23, hydraulic fluid may flow through the valve. However, when valve 592 is moved to a raised position from that shown in FIG. 22, pressurized fluid may then flow through a line 596, a check valve 598, and then through valve 592 into a line 600. The line 600 may lead to a branch line 602 which is directed to a solenoid valve 606 and also to a line 604 which is directed to the large area end of the telescopic hydraulic cylinder 14 as shown in FIG. 1. With pressurized hydraulic fluid being fed through line 604 to the large area end of telescopic cylinder 14 the telescopic cylinder may be expanded to provide movement of the ejection panel 12. Hydraulic fluid which may be exhausted from the small area end of the telescopic cylinder 14 may flow through a line 608 to a line 618 and through the valve 592 to a return line 620. The line 620 may lead to a return line 622 which may, in turn, lead to a line 616 through a check valve 617 and strainer 619 and into the reservoir 576.

When the valve 592 is moved to its lowered position from that shown in FIG. 23, hydraulic fluid may flow from line 596 through check valve 598 and valve 592 into lines 618 and 608 to the small area end of telescopic cylinder 14. This may produce contraction of the telescopic cylinder 14 with hydraulic fluid being exhausted from the large area end of the telescopic cylinder through lines 604 and 600, valve 592 and into line 620 to return line 622.

When valve 592 is in its neutral position shown in FIG. 23, the telescopic cylinder 14 is isolated from line 584 and pressure buildup may occur at the small area end of the telescopic cylinder because of an increase in the ambient temperature. If a pressure buildup occurs in the large area end of the cylinder 14, this may, for example, cause a tenfold pressure buildup in the small area end of the cylinder because of the area ratio between the pressure area at the large area end and the pressure area at the small area end. To relieve such a pressure buildup, a branch line 610 from line 608 may lead to the pilot-operated valve 612 with a pressure transmitting line 613 from line 610 to the valve to control its operation. The valve 612 may be set, for example, to open at a pressure of about 3100 psi to permit the exhaust of hydraulic fluid from line 610 through the valve and into a line 614 which leads to return line 616.

After passing beyond valve 592 in its neutral position, the supply line 584 may lead to a spring-centered valve 624 which is shown in its neutral position in FIG. 23. The valve 624 may include an operating handle 626 which may be actuated to move the valve to its lowered position from that shown. With the valve 624 in its lowered position, pressurized hydraulic fluid may then pass from line 584 to line 628, through a check valve 630, and valve 624 and into a line 632. The line 632 may lead through a pressure choke 634 to the hydraulic cylinder 26 which may be used for lifting of the tailgate 10 as illustrated in FIG. 1.

As hydraulic fluid is fed through line 632 to the head end of the cylinder 26, the cylinder may be expanded to raise the tailgate to its position 10′ shown in FIG. 1. The valve 624 may then be returned to its neutral position to isolate the cylinder 26 and insure that the tailgate remains in its raised position 10′. When it is desired to lower the tailgate to its position 10 shown in FIG. 1, the valve 624 may then be moved to its raised position from that shown in FIG. 23 with hydraulic fluid passing from the cylinder 26 through the choke 634, the line 632 and valve 624 and into a return line 636. As described in regard to FIG. 22, the weight of the tailgate 10 (FIG. 1) may be used to advantage in contracting the hydraulic cylinder 26 during lowering of the tailgate. Since the weight of the tailgate 10 may be borne by the cylinder 26, the weight of the tailgate may force fluid from the head end of the cylinder when the valve 624 is in its raised condition. However, because of the presence of the hydraulic choke 634, fluid flow through the line 632 may be maintained at a relatively slow rate to insure that the tailgate is not lowered too rapidly.

Proceeding beyond valve 624 in its neutral position, the supply line 584 may lead to a branch line 638 to a pilot-operated valve 640 controlled through a pressure line 641. The pilot-operated valve 640 may be set to open at a pressure of about 3100 psi to permit exhaust of hydraulic fluid through the valve to a line 642 leading to return line 616 to the reservoir 576. The pilot-operated valve 640 may, thus, be set to determine the maximum pressure of hydraulic fluid which is supplied to the retainer panel cylinder 55, the return cylinder 52 and the drive cylinder 50 during movement of the packing panel 44 as illustrated in FIGS. 10–13.

The supply line 584 may then lead to a spring-centered detent valve 648 which may control the flow of hydraulic fluid to cylinders 55, 52 and 50. In this respect, valve 648 may perform the functions of both the valves 538 and 466, as discussed in FIG. 22. The use of a single spring-centered detent valve 648 in the circuit of FIG. 23, thus, represents an improvement over the hydraulic circuit of FIG. 22. With valve 648 in its neutral position shown in FIG. 23, hydraulic fluid may flow through the valve from line 584 to line 616. However, when valve 648 is moved to its raised position from that shown, hydraulic fluid may flow from line 584 through a line 644 and a check valve 646. Valve 648 may be moved to its raised position by an operating rod 650 with the rod being held in a raised position by a detent mechanism 651 which is similar in its operation to the detent mechanism 448 described in FIGS. 21 and **21*c* and FIG. 22. That is to say, notches may be formed in operating rod 650 which may be engaged by a roller positioned on a spring biased arm to maintain the operating rod in a desired position with the valve 648 in a raised or a lowered position as compared with its neutral position shown in FIG. 22**.

With valve 648 in its raised position from that shown in FIG. 23, pressurized hydraulic fluid passing through check valve 646 may pass through valve 648 into a line 652. A branch line 654 leading from line 652 may lead to the rod end of the retainer panel cylinder 55. Thus, flow of hydraulic fluid through line 654 may cause the cylinder 55 to contract to move the retainer panel 54 from a closed to an opened position as illustrated in FIGS. 10 and 11. As this is occurring, hydraulic fluid may be exhausted from the head end of cylinder 55 to a line 696 which leads to a line 686, through the valve 648 and to a line 687. Line 687 is joined to return line 642 which conveys the hydraulic fluid to line 616 and to reservoir 576. Since the hydraulic cylinder 55 may be relatively small in comparison with the relatively large drive cylinder 50, the contraction of cylinder 55 may occur prior to contraction of the drive cylinder.

Pressurized hydraulic fluid flowing through line 652 with valve 648 in its raised position may flow into a line 656, through a check valve 658 and into a line 660 leading to the rod end of drive cylinder 50. This may cause the cylinder 50 to contract in moving the packing panel 44 in a working direction as described in FIGS. 10–13. When the packing panel 44 reaches the approximate position shown in FIG. 12, a piston 662 within cylinder 50 may uncover a port 663 leading to a pressure line 674 to a pressure-actuated switch 676. The switch is in its open position as shown in FIG. 23. However, when the pressure at the rod end of cylinder 50 reaches a predetermined level such as 2400 psi, a switch member 677 may be rotated downwardly into contact with a pole 679 to close the switch 676 with the switch remaining closed until the pressure at the rod end falls to a pressure level such as 2150 psi. The switch 676 may be connected through an electrical power source 678 with the solenoid valve 606 through wires 680, 682 and 684. The functioning of the switch 676 in conjunction with the solenoid 606 is the same as described for switch 558 in conjunction with solenoid 495 in regard to FIG. 22. That is, closing of the switch 676 may close the solenoid valve 606 to provide rapid dumping of hydraulic fluid from the large area end of rapid telescopic cylinder 14 in response to pressures at the rod end of drive cylinder 50. This rapid dumping of hydraulic fluid permits controlled incremental movement of the ejection panel from its rearward position 12 to its forward position 12′ as indicated in FIG. 1 during filling of the storage body 8 with refuse.

As described, the relatively large drive cylinder 50 may be mechanically interconnected with the relatively small return cylinder 52. As the drive cylinder 50 undergoes contraction, the return cylinder 52 may, thus, undergo expansion with hydraulic fluid from the rod end of return cylinder 52 being exhausted through a line 694, a check valve 688 and into the line 686. The fluid flow from line 686 may pass through the valve 648 in its raised position and through the line 687 to return lines 642 and 616 leading to the reservoir 576. A line 664 from line 660 to a pilot-operated check valve 666 may remain closed as pressurized hydraulic fluid is fed through line 660 to to the rod end of cylinder 50. A line 672 may interconnect the head ends of the cylinders 50 and 52 such that fluid discharged from the head end of the contracting drive cylinder 50 may flow through line 672 to the expanding head end of the return cylinder 52. In this manner, the cylinder 52 may act as an accumulator for exhausted oil from the head end of cylinder 50 during its contraction.

Additionally, a line 668 may lead from the head end of the cylinder 52 to a line 670 which may be joined to return line 616. Hydraulic fluid may, then, also flow through lines 668 and 670 to the reservoir 576. However, to encourage flow between the cylinders 50 and 52 rather than to the reservoir 576, the line 672 may be relatively large as compared with the size of line 670. After contraction of the drive cylinder 50 is completed, the packing panel 44 may occupy a position as shown in FIG. 13. At this point, as will be described, the operating rod 650 may be moved to disengage the rod from the detent mechanism 651 with the valve 648 being returned to its neutral position.

To cause movement of the packing panel 44 in a return direction from its position shown in FIG. 13 to its rest position shown in FIG. 10, the rod 650 may be moved downwardly to move the valve 648 to a lowered position from that shown in FIG. 23. Hydraulic fluid may then pass from line 644, through check valve 646 and valve 648 and into line 686. Line 686 may lead to a branch line 696 through which hydraulic fluid may be conveyed to the head end of the retainer panel cylinder 55. This may cause expansion of the retainer panel cylinder 55 with hydraulic fluid being exhausted from the rod end of the cylinder through a line 654 leading to line 652 and through the valve 648 to line 687. Line 687 may convey the exhausted fluid through lines 642 and 616 for return to the reservoir 576. As discussed, since the volume of the retainer panel cylinder 55 may be relatively small, its movement may take place relatively rapidly such that the retainer panel 54 will complete its movement from an opened to a closed position (see FIGS. 13 and 10) prior to the movement of the packing panel 44 in a return direction.

Pressurized hydraulic fluid flowing through line 686 may also flow to the pilot-operated check valve 688 which may be connected through a pressure-sensing line 690 to line 686. When the pressure in line 686 reaches a predetermined level, such as 1500 psi, pressure transmitted through line 690 may then open the valve 688. Fluid passing through the line 690 for operation of the valve 688 may then be exhausted through a pressure bleeding line 692 to the return line 616. The function of the pilot-operated check valve 688 may, thus, promote the movement of retainer panel cylinder 55 prior to movement of the return cylinder 52.

With the pilot-operated check valve 688 moved to its closed position, fluid may flow from line 686 through the valve 688 and into line 694. Line 694 may convey the pressurized hydraulic fluid to the rod end of return cylinder 52 to, thereby, contract the return cylinder. As the return cylinder 52 contracts, the drive cylinder 50 may expand due to the mechanical connection between the cylinders as discussed previously. On expansion of the drive cylinder 50, there may be a pressure buildup at the rod end of the drive cylinder since the ourflow of oil from the rod end is blocked by the check valves 658 and 666. However, the check valve 666 may be set to open at a pressure of about 250 psi in the line 694 which may be conveyed to the valve through a pressure sensing line 698. Thus, the check valve 666 may be opened quickly to permit the flow of hydraulic fluid from the rod end of the cylinder 50 through line 664 and check valve 666 into line 668 to the head end of the cylinder 50. Cylinder 50 may, thus, act as its own hydraulic accumulator during its expansion, with hydraulic fluid being circulated from the rod end to the head end of the cylinder. Also, hydraulic fluid discharged from the rod end of drive cylinder 50 may flow through line 670 to return line 616 and the reservoir 576. However, to encourage flow of hydraulic fluid from the rod end to the head end of cylinder 50 during its expansion, the lines 664 and 668 may be relatively large as compared with line 670. Thus, there may be less resistance to flow of fluid from the rod end into the head end of cylinder 50 as compared with resistance to flow through line 670 to the reservoir 576.

As the drive cylinder 50 is expanding, the return cylinder 52 may be contracting due to the mechanical interconnection between the cylinders. During contraction of the return cylinder 52, fluid may be exhausted from the head end of the return cylinder through line 672 and into the head end of the drive cylinder 50. Thus, the drive cylinder 50 may also act as an accumulator for hydraulic fluid discharged from the return cylinder 52 during its contraction. When the return cylinder 52 has completed its contraction in moving the packing panel 44 to its rest position, as shown in FIG. 10, the operating rod 650 may be moved to disengage the detent mechanism 651 from the rod and to return the valve 648 to its neutral position shown in FIG. 22.

FIG. 24 is a detailed view similar to FIG. 21, which illustrates the manner in which the rod 650 may be actuated in controlling the movement of the valve 648 as described in FIG. 23. In view of the similarity between FIGS. 24 and 21, like reference numerals have been used in FIG. 24 for ease of description. As previously described, movement of the control member 356 in the direction of arrow B (FIG. 19) causes rotational movement of the rod 362 in the direction of the arrow G (FIG. 21). This, in turn, causes translational movement of the rod 650 in the direction of the arrow H (FIG. 24) to move the valve 648 to a raised position as compared with its neutral position shown in FIG. 23. In its raised position, the valve 648 functions to provide contraction of the drive cylinder 50 and movement of the packing panel 44 in a working direction through the hopper 34 as described in FIGS. 10–13.

After movement of the control member 356 in the direction of the arrow B, the member may remain in this position with the rod 650 moved in the direction of the arrow H. The member 356 is not returned to its neutral position as in the apparatus of FIGS. 21, 21*a*, 21*b*, 21*c* and 22 where two rods 206 and 207 may be actuated by movement of the member 356. With the member 356 positioned in the direction of the arrow B to cause movement of the rod 650 in the direction of the arrow H, the member may remain in this position until returned to its neutral position through contact of the tab 393 with stop members 406 or 412 as described in FIG. 19. As described in FIG. 19, to avoid contact of the tab 393 with stop member 406, the handle member 376 may be pulled downwardly to cause rotation of the rod 382 in the direction of the arrow F.

When the member 356 is returned to its neutral position by stop member 412 after movement of the packing panel 44 in a working direction through the hopper 34 (see FIGS. 10–13), the rod 650 shown in FIG. 24 may be moved in a direction opposite to that of the arrow H and and the rod 362 may be rotated in a direction opposite to that indicated by arrow G to return the rod 650 to its neutral position as illustrated. As the rod 650 is moved in a direction opposite to arrow H, the detent mechanism 651 may become disengaged from the rod 650.

With reference to FIG. 19, when the control member 356 is moved in the direction of the arrow C, this may cause rotation of the rod 362 from its neutral position in FIG. 24 in a direction opposite to that indicated by arrow G to provide movement of the rod 650 from its neutral position in a direction opposite to that of arrow H. This may move the valve 648 to its lowered position from its neutral position shown in FIG. 23. The valve 648 may then remain in its lowered position until the stop member 414 contacts the tab 393 to return the control member 356 to its neutral position (FIG. 19). As the control member 356 is returned to its neutral position, the rod 650 may also be returned to its neutral position as shown in FIG. 24.

In the foregoing description, the movement of structural elements, such as valves, etc., has been described by referring to the valves as being in a raised position or a lowered position with respect to a neutral position. This terminology has been used in regard to FIGS. 22 and 23. It should be understood that the terms "raised" and "lowered" do not imply that the valves are positioned in a particular manner or that the valves are raised or lowered in the sense of being moved to a higher or lower elevation. The terms "raised" and "lowered" are, therefore, used merely in a relative sense with respect to the way in which the valves are illustrated in the figures of the drawings. The valves may, however, be mounted any desired manner such that movement of the valves need not have any necessary relation to their being raised or lowered.

Similarly, in the drawings, lettered arrows have been used to illustrate movement of various structural elements. It should be understood that the movements illustrated by these arrows are intended merely to demonstrate relative movement of the structural elements. However, depending upon the physical placement of the structural elements, the movement of the elements in a particular direction may vary depending upon the placement of the structural elements with respect to the overall structure of the apparatus.

In FIGS. 22 and 23, reference has been made to the telescopic cylinder 14 as illustrated in FIG. 1 for providing movement of the ejection panel 12. The telescopic cylinder 14 may, however, be replaced with the conventional cylinder 62 mounted on the support member 60 as shown in FIG. 2. With this substitution, the pilot-operated valve 508 (FIG. 22) and pilot-operated valve 612 (FIG. 23) may be eliminated since use of the conventional cylinder 62 may avoid the problem of pressure buildup that can occur in the telescopic cylinder 14 with changes in the ambient temperature.

I claim:

1. In a refuse compaction apparatus for support on a truck frame, the refuse compaction apparatus having a container for storing refuse under pressure and means for pressurizing refuse within said container, the improvement comprising:

a first rigid frame positioned at one end of said container, a second rigid frame positioned at the other end of said container, a plurality of longitudinal rigid members connecting said first and second frames without any additional support between the first and second frames, a plurality of members formed from a thin sheet material and defining the container and supported at their peripheries by said first and second frames and said longitudinal rigid members, said flexible sheet members being bowed outwardly in tension at their peripheries, first means coupled to the first frame and disposed below the first frame for providing a support between the container and the truck frame, second means coupled to the second frame and disposed below the second frame for providing a support between the container and the truck frame, means disposed below the first support means and supported by the first support means at a position below the first frame for providing for a coupling of the container to the truck frame, and means disposed below the second support means and supported by the second support means at a position below the second frame for providing for a coupling of the container to the truck frame.

2. The refuse compaction apparatus of claim 1 wherein the first and second rigid frames respectively extend around the container at the one end and at the other end of the container and wherein means are included for bracing the first and second support means.

3. The combination set forth in claim 1, including, the first rigid frame including first and second rigid side frames, the first support means including a first member disposed between the first and second rigid side frames, means operatively coupled to the first member for bracing the first member at the opposite ends of the first member, the second rigid frame including first and second rigid side frames, the second support means including a second member disposed between the first and second rigid side frames on the second rigid frame, and means operatively coupled to the second member for bracing the second member at the opposite ends of the second member.

4. The combination set forth in claim 3, including the container being open in at least one end, a hopper having a first opening for receiving refuse and having a second opening communicating with the opening in the container for obtaining a transfer of refuse from the hopper into the container, and means disposed in the hopper for obtaining a cyclic transfer of refuse from the hopper into the container through the communicating openings.

5. In combination for storing refuse and for attachment to a truck frame, first, second, third and fourth sheet members having flexible characteristics and disposed in an outwardly bowed relationship and having a high strength in tension as compared to their strengths in compression, the first, second, third and fourth sheet members being disposed to define a storage body with the first and second sheet member defining side panels of the storage body and the third and fourth sheets defining the top and bottom walls of the storage body, a plurality of stiffening means each disposed at one of the corners of the storage body defined by parts of the first, second, third and fourth sheet members, a first rigid frame extending around the storage body at one end of the storage body, a second rigid frame extending around the storage body at the other end of the storage body, means providing rigidity to the first rigid frame, means providing rigidity to the second rigid frame, means disposed below only the first frame for providing a support for the storage body on the truck frame at the first end of the storage body, and means disposed below only the second frame for providing a support for the storage body on the truck frame at the second end of the storage body.

6. The combination set forth in claim 5 wherein the first, second, third and fourth sheet members are made from a thin and lightweight sheet material.

7. The combination set forth in claim 5, including, an ejection panel movable along the storage body to contain the refuse in the storage body, the first, second, third and fourth sheet members being made from a thin and lightweight sheet material, and the stiffening means defining tracks for guiding the movement of the ejection panel along the storage body.

8. The combination set forth in claim 5, including, coupling means disposed below the first support means and extending from the first support means and constructed to provide a coupling of the storage body to the truck frame at the first end of the storage body, and coupling means disposed below the second support means and extending from the second support means and constructed to provide a coupling of the storage body to the truck frame at the other end of the storage body.

9. The combination set forth in claim 5, including, the storage body being open at one end, a hopper having a first opening for receiving refuse and having a second opening communicating with the opening in the storage body, and means disposed in the hopper for compacting the refuse and obtaining a transfer of the refuse into the storage body through the communicating openings in the hopper and the storage body.

10. The combination set forth in claim 8, including, the first rigid frame including rigid side members, a first cross beam disposed between the side members of the first frame, means coupled to the first cross beam for stiffening the first cross beam at the opposite ends of the first cross beam, the second rigid frame including rigid side members, a second cross beam disposed between the side members of the second frame, and means coupled to the second cross beam for stiffening the second cross beam at the opposite ends of the second cross beam.

11. The combination set forth in claim 10, including, the storage body being open at one end, a hopper having a first opening for receiving refuse and having a second opening communicating with the opening in the storage body, and packer panel means disposed in the hopper and movable cyclically through the hopper for compacting the refuse and obtaining a transfer of the refuse into the storage body through the communicating openings in the hopper and the storage body.

12. The combination set forth in claim 11, including, means disposed below the first supporting means for coupling the storage body to the truck body at the position of the first frame, and means disposed below the second supporting means for coupling the storage body to the truck body at the position of the second frame.

* * * * *